(12) United States Patent
Kitagawa et al.

(10) Patent No.: US 8,748,520 B2
(45) Date of Patent: *Jun. 10, 2014

(54) POLYCARBONATE RESIN COMPOSITION CONTAINING TRIAZINE COMPOUND AND MOLDED ARTICLE USING THE SAME

(75) Inventors: Takashi Kitagawa, Odawara (JP); Ichiro Amasaki, Odawara (JP); Yukie Watanabe, Odawara (JP); Keizo Kimura, Odawara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 725 days.

This patent is subject to a terminal disclaimer.

(21) Appl. No.: 12/891,148

(22) Filed: Sep. 27, 2010

(65) Prior Publication Data

US 2011/0077331 A1 Mar. 31, 2011

(30) Foreign Application Priority Data

Sep. 28, 2009 (JP) .................. 2009-223468
Jan. 19, 2010 (JP) .................. 2010-009539

(51) Int. Cl.
*C08K 5/3492* (2006.01)

(52) U.S. Cl.
USPC ....................................... 524/100

(58) Field of Classification Search
USPC ....................................... 524/100
See application file for complete search history.

(56) References Cited

U.S. PATENT DOCUMENTS

| | | | |
|---|---|---|---|
| 4,962,142 A * | 10/1990 | Migdal et al. .................. | 524/100 |
| 5,354,794 A | 10/1994 | Stevenson et al. | |
| 5,597,854 A | 1/1997 | Birbaum et al. | |
| 5,942,564 A | 8/1999 | Kaschig et al. | |
| 6,867,250 B1 | 3/2005 | Gupta et al. | |
| 2003/0146412 A1 * | 8/2003 | Gupta et al. .................. | 252/380 |
| 2003/0158300 A1 | 8/2003 | Gorny et al. | |
| 2004/0013619 A1 * | 1/2004 | Reinehr et al. .................. | 424/59 |
| 2007/0215845 A1 | 9/2007 | Negishi et al. | |
| 2011/0272648 A1 | 11/2011 | Fukushima et al. | |

FOREIGN PATENT DOCUMENTS

| | | |
|---|---|---|
| EP | 1213283 A2 | 6/2002 |
| EP | 1310492 A1 | 5/2003 |
| JP | 05-339033 A | 12/1993 |
| JP | 05-345639 A | 12/1993 |
| JP | 06-056466 A | 3/1994 |
| JP | T-08-501291 | 2/1996 |
| JP | 11-071355 | 3/1999 |
| JP | 2001-524473 | 12/2001 |
| JP | 2002-524452 T | 8/2002 |
| JP | T-2004-504414 | 2/2004 |
| JP | 2004-137471 | 5/2004 |
| JP | 2005-054032 A | 3/2005 |
| JP | 2006-324556 A | 11/2006 |
| JP | 3965631 B2 | 8/2007 |
| JP | 2009-096974 | 5/2009 |
| JP | 2009-185291 A | 8/2009 |
| WO | WO 94/18278 A2 | 8/1994 |
| WO | WO 00/14077 A1 | 3/2000 |
| WO | WO 0228854 A1 | 4/2002 |
| WO | WO 0236579 A1 | 5/2002 |

OTHER PUBLICATIONS

Amasaki et al., U.S. Appl. No. 12/890,822, entitled "*Polycarbonate Resin Composition Containing Triazine Compound and Molded Article Using the Same*", filed on Sep. 27, 2010.
Office Action issued Jan. 8, 2013, in corresponding Japanese Patent Application No. JP 2009-223467 with partial English translation.
Extended Search Report from European Patent Office issued in Applicant's corresponding European Patent Application No. 10180009.2 dated Nov. 15, 2010.
H. Brunetti et al., "*Die Synthese von asymmetrisch substituierten omicron-Hydroxyphenyl-sigma-triazinen*", Helvetica Chimica Acta, Jan. 1, 1972, pp. 1566-1595, vol. 55, No. 1, Verlag Helvetica Chimica Acta, Basel, CH, XP002034121, ISSN: 0018-019X.
Corwin Hansch et al., "*A Survey of Hammett Substituent Constants and Resonance and Field Parameters*", Chemical Reviews, Janurary 1, 1991, pp. 165-195, vol. 91, ACS, Washington, DC. US, XP002447343, ISSN: 0009-2665.
Office Action dated Jun. 15, 2012, issued in the corresponding European Patent Application No. 10 180 009.2-2102. (5 pages).
Japanese Office Action issued Sep. 3, 2013, in corresponding Japanese Patent Application No. JP 2010-216101. (4 pgs).

\* cited by examiner

*Primary Examiner* — Kriellion Sanders
(74) *Attorney, Agent, or Firm* — Buchanan Ingersoll & Rooney PC

(57) ABSTRACT

A polycarbonate resin composition comprising a compound represented by the following formula (1):

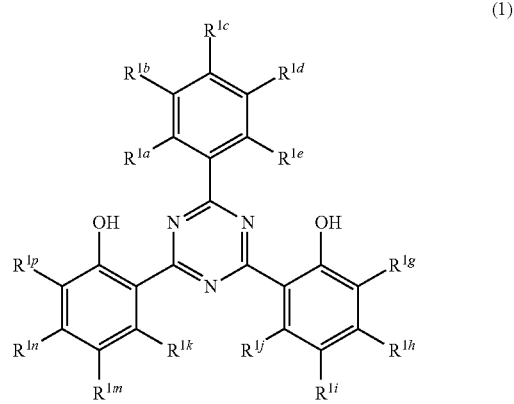

wherein each of $R^{1a}$, $R^{1b}$, $R^{1c}$, $R^{1d}$ and $R^{1e}$ independently represents a hydrogen atom or a monovalent substituent provided that OH is excluded, at least one of the substituents represents a substituent having a Hammett's σp value of 0.3 or more, and the substituents may be combined each other to form a ring; and each of $R^{1g}$, $R^{1h}$, $R^{1i}$, $R^{1j}$, $R^{1k}$, $R^{1m}$, $R^{1n}$ and $R^{1p}$ independently represents a hydrogen atom or a monovalent substituent, and the substituents may be combined each other to form a ring.

16 Claims, No Drawings

POLYCARBONATE RESIN COMPOSITION CONTAINING TRIAZINE COMPOUND AND MOLDED ARTICLE USING THE SAME

BACKGROUND OF THE INVENTION

1. Field of the Invention

The present invention relates to a polycarbonate resin composition containing a triazine compound, and a molded article using the composition.

2. Description of the Related Art

Conventionally, it has been done to impart ultraviolet absorptivity by using an ultraviolet absorber in combination with various resins or the like. An inorganic ultraviolet absorber or an organic ultraviolet absorber is used as the ultraviolet absorber. In the case of an inorganic ultraviolet absorber (see, for example, Patent Documents 1 to 3), the durability such as weather resistance and heat resistance is excellent, but the latitude of selection is narrow, because the absorption wavelength is determined by the band gap of the compound. Moreover, an absorber capable of absorbing light even in the long-wavelength ultraviolet (UV-A) region of around 400 nm is not known, and an absorber capable of absorbing light in the long-wavelength ultraviolet light, if any, absorbs light also in the visible region and therefore, involves coloring.

In contrast, the organic ultraviolet absorber has a wide latitude in designing the absorber structure and therefore, absorbers having various absorption wavelengths can be obtained by designing the absorber structure.

Systems using various organic ultraviolet absorbers have been heretofore studied, and Patent Document 4 disclosures a triazole-based ultraviolet absorber. Also, Patent Document 5 describes a trisaryl-s-triazine having an alkoxy group and a hydroxy group at specific positions. However, those having a maximum absorption wavelength in the long-wavelength ultraviolet range are poor in the light resistance, and their ultraviolet blocking effect wears off with the passage of time.

Furthermore, a material applied to a solar cell or the like recently under development must be exposed to sunlight outdoors for a long period of time, and the exposure to ultraviolet ray over long term aging unavoidably obliges the material to undergo a change in the color hue as time passes. Accordingly, an ultraviolet-absorbing resin composition exhibiting a blocking effect even in the UV-A region and having a higher light resistance than ever and a molded article formed using the composition are demanded.

[Patent Document 1] JP-A-5-339033 (the term "JP-A" as used herein means an "unexamined published Japanese patent application")
[Patent Document 2] JP-A-5-345639
[Patent Document 3] JP-A-6-56466
[Patent Document 4] JP-T-2002-524452 (the term "JP-T" as used herein means a published Japanese translation of a PCT patent application)
[Patent Document 5] Japanese Patent 3,965,631

SUMMARY OF THE INVENTION

An object of the present invention is to provide a polycarbonate resin composition capable of maintaining a long-wavelength ultraviolet-blocking effect for a long period of time and exhibiting excellent light resistance. Another object of the present invention is to provide a molded article such as ultraviolet filter free of a change in the color hue with long term aging by forming it from the polycarbonate resin composition.

As a result of intensive studies to attain the objects above, the present inventors have found that when a novel compound exhibiting a blocking effect even in the UV-A region and having an unprecedented light resistance is incorporated into a polycarbonate resin composition, an excellent molded article free from a change in the color hue with aging can be provided. The present invention has been accomplished based on this finding.

The objects of the present invention have been attained by the following techniques.

(1) A polycarbonate resin composition comprising a compound represented by the following formula (1):

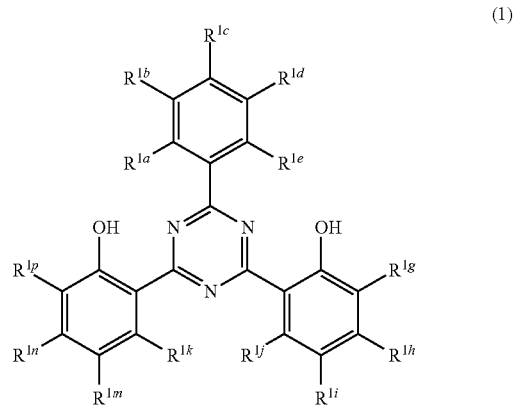

wherein each of $R^{1a}$, $R^{1b}$, $R^{1c}$, $R^{1d}$ and $R^{1e}$ independently represents a hydrogen atom or a monovalent substituent provided that OH is excluded, at least one of the substituents represents a substituent having a Hammett's σp value of 0.3 or more, and the substituents may be combined each other to form a ring; and each of $R^{1g}$, $R^{1h}$, $R^{1i}$, $R^{j1}$, $R^{1k}$, $R^{1m}$, $R^{1n}$ and $R^{1p}$ independently represents a hydrogen atom or a monovalent substituent, and the substituents may be combined each other to form a ring.

(2) The polycarbonate resin composition according to the above (1), wherein said monovalent substituent is a substituted or unsubstituted alkyl group having a carbon number of 1 to 20, a cyano group, a carboxyl group, a substituted or unsubstituted alkoxycarbonyl group, a substituted or unsubstituted carbamoyl group, a substituted or unsubstituted alkylcarbonyl group, a nitro group, a substituted or unsubstituted amino group, a hydroxy group, a substituted or unsubstituted alkoxy group having a carbon number of 1 to 20, a substituted or unsubstituted aryloxy group, a substituted or unsubstituted sulfamoyl group, a thiocyanate group, or a substituted or unsubstituted alkylsulfonyl group, and in the case of having a substituent, the substituent is an alkyl group having a carbon number of 1 to 20, a cyano group, a carboxyl group, an alkoxycarbonyl group, a carbamoyl group, an alkylcarbonyl group, a nitro group, an amino group, a hydroxy group, an alkoxy group having a carbon number of 1 to 20, an aryloxy group, a sulfamoyl group, a thiocyanate group, or an alkylsulfonyl group.

(3) The polycarbonate resin composition according to the above (1) or (2), wherein $R^{1c}$ is a substituent having a Hammett's σp value of 0.3 or more.

(4) The polycarbonate resin composition according to the above (1) or (2), wherein each of $R^{1a}$, $R^{1c}$ and $R^{1e}$ represents a hydrogen atom, each of $R^{1b}$ and $R^{1d}$ independently represents a hydrogen atom or a substituent having a Hammett's σp value of 0.3 or more, and at least either one is a substituent having a Hammett's σp value of 0.3 or more.

(5) The polycarbonate resin composition according to any one of the above (1) to (4), wherein said Hammett's σp value is from 0.3 to 1.2.

(6) The polycarbonate resin composition according to any one of the above (1) to (4), wherein the substituent having a Hammett's σp value of 0.3 or more is a group selected from COOR$^r$, CONR$^s_2$, a cyano group, CF$_3$, a nitro group and SO$_3$M wherein each of R$^r$ and R$^s$ represents a hydrogen atom or a monovalent substituent, and M represents a hydrogen atom or an alkali metal.

(7) The polycarbonate resin composition according to any one of the above (1) to (4) and (6), wherein the substituent having a Hammett's σp value of 0.3 or more is COOR$^r$ wherein R$^r$ represents a hydrogen atom or a monovalent substituent.

(8) The polycarbonate resin composition according to any one of the above (1) to (3) and (5) to (7), wherein R$^{1c}$ is a cyano group.

(9) The polycarbonate resin composition according to any one of the above (1) to (3) and (5) to (8), wherein R$^{1h}$ or R$^{1n}$ is a hydrogen atom.

(10) The polycarbonate resin composition according to any one of the above (1) to (9), wherein each of R$^{1g}$, R$^{1h}$, R$^{1i}$, R$^{1j}$, R$^{1k}$, R$^{1m}$, R$^{1n}$ and R$^{1p}$ is a hydrogen atom.

(11) The polycarbonate resin composition according to any one of the above (1) to (10), wherein pKa of the compound represented by formula (1) is from −5.0 to −7.0.

(12) The polycarbonate resin composition according to any one of the above (1) to (11), which further contains a phosphorus-based stabilizer.

(13) The polycarbonate resin composition according to any one of the above (1) to (12), wherein the content of the compound represented by formula (1) is from 0.05 to 3 parts by mass and the content of the phosphorus-based stabilizer is from 0.0005 to 0.3 parts by mass, per 100 parts by mass of the polycarbonate resin composition.

(14) The polycarbonate resin composition according to any one of the above (1) to (13), which further contains a hindered phenol-based stabilizer.

(15) The polycarbonate resin composition according to any one of the above (1) to (14), wherein the viscosity average molecular weight of the polycarbonate resin is from 10,000 to 50,000.

(16) A molded article comprising the polycarbonate resin composition according to any one of the above (1) to (15).

(17) A cover for solar cells, comprising the polycarbonate resin composition according to any one of the above (1) to (15).

(18) A member for light sources, comprising the polycarbonate resin composition according to any one of the above (1) to (15).

(19) A window member comprising the polycarbonate resin composition according to any one of the above (1) to (15).

(20) An architectural material comprising the polycarbonate resin composition according to any one of the above (1) to (15).

(21) A lens comprising the polycarbonate resin composition according to any one of the above (1) to (15).

The polycarbonate resin composition of the present invention contains a compound represented by formula (1) capable of exhibiting high light fastness even in the long-wavelength ultraviolet region, so that the obtained molded article and the contents therein can be enhanced in the light stability.

The molded article of the present invention is obtained by shaping the polycarbonate resin composition above and has an excellent long-wavelength ultraviolet absorbing ability, so that the molded article can be free from a change in the color hue with long term aging and can be used as an ultraviolet-absorbing filter or container.

DETAILED DESCRIPTION OF THE INVENTION

The present invention is described in detail below.

The present invention relates to a polycarbonate resin composition containing a compound represented by the following formula (1).

The compound represented by the following formula (1) is described below.

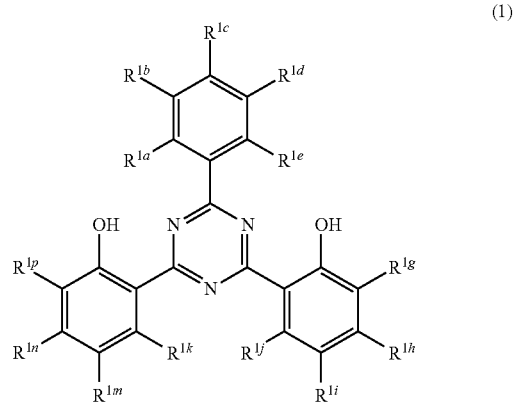

(1)

wherein each of R$^{1a}$, R$^{1b}$, R$^{1c}$, R$^{1d}$ and R$^{1e}$ independently represents a hydrogen atom or a monovalent substituent provided that OH is excluded, at least one of the substituents represents a substituent having a Hammett's σp value of 0.3 or more, and the substituents may be combined each other to form a ring; and each of R$^{1g}$, R$^{1h}$, R$^{1i}$, R$^{1j}$, R$^{1k}$, R$^{1m}$, R$^{1n}$ and R$^{1p}$ independently represents a hydrogen atom or a monovalent substituent, and the substituents may be combined each other to form a ring.

Each of R$^{1a}$, R$^{1b}$, R$^{1c}$, R$^{1d}$ and R$^{1e}$ independently represents a hydrogen atom or a monovalent substituent provided that OH is excluded, and at least one of the substituents represents a substituent having a Hammett's σp value of 0.3 or more.

Out of the substituents represented by R$^{1a}$, R$^{1b}$, R$^{1c}$, R$^{1d}$ and R$^{1e}$, preferably, one to three members represent a substituent having a Hammett's σp value of 0.3 or more; and more preferably, one or two members represent a substituent having a Hammett's σp value of 0.3 or more.

Examples of the monovalent substituent (hereinafter referred to as the substituent A) in formula (1) include an alkyl group having a carbon number of 1 to 20 (e.g., methyl, ethyl), an aryl group having a carbon number of 6 to 20 (e.g., phenyl, naphthyl), a cyano group, a carboxyl group, an alkoxycarbonyl group (e.g., methoxycarbonyl), an aryloxycarbonyl (e.g., phenoxycarbonyl), a substituted or unsubstituted carbamoyl group (e.g., carbamoyl, N-phenylcarbamoyl, N,N-dimethylcarbamoyl), an alkylcarbonyl (e.g., acetyl), an arylcarbonyl group (e.g., benzoyl), a nitro group, a substituted or unsubstituted amino group (e.g. amino, dimethylamino, anilino, substituted sulfoamino), an acylamino group (e.g., acetamide, ethoxycarbonylamino), a sulfonamido group (e.g., methanesulfonamido), an imido group (e.g., succinimido, phthalimido), an imino group (e.g., benzylideneamino), a hydroxy group, an alkoxy group having a carbon number of 1 to 20 (e.g., methoxy), an aryloxy group (e.g., phenoxy), an acyloxy group (e.g., acetoxy), an alkylsulfonyloxy group (e.g., methanesulfonyloxy), an arylsulfonyloxy group (e.g., benzenesulfonyloxy), a sulfa group, a substituted or unsubstituted sulfamoyl group (e.g., sulfamoyl, N-phenylsulfamoyl), an alkylthio group (e.g., methylthio), an arylthio group (e.g., phenylthio), a thiocyanate group, an alkylsulfonyl group (e.g., methanesulfonyl), an arylsulfonyl group (e.g., benzenesulfonyl), and a heterocyclic group having a carbon number of 6 to 20 (e.g., pyridyl, morpholino).

The substituent may be further substituted and when a plurality of substituents are present, they may be the same or different. In this case, examples of the substituent include the above-described monovalent substituent A.

Also, the substituents may combine with each other to form a ring.

Examples of the ring formed by combining the substituents with each other include a benzene ring, a pyridine ring, a pyrazine ring, a pyrimidine ring, a triazine ring, a pyridazine ring, a pyrrole ring, a pyrazole ring, an imidazole ring, a triazole ring, an oxazole ring, an oxadiazole ring, a thiazole ring, a thiadiazole ring, a furan ring, a thiophene ring, a selenophene ring, a silole ring, a germole ring, and a phosphole ring.

The monovalent substituent in formula (1) is preferably a substituted or unsubstituted alkyl group having a carbon number of 1 to 20, a cyano group, a carboxyl group, a substituted or unsubstituted alkoxycarbonyl group, a substituted or unsubstituted carbamoyl group, a substituted or unsubstituted alkylcarbonyl group, a nitro group, a substituted or unsubstituted amino group, a hydroxy group, a substituted or unsubstituted alkoxy group having a carbon number of 1 to 20, a substituted or unsubstituted aryloxy group, a substituted or unsubstituted sulfamoyl group, a thiocyanate group, or a substituted or unsubstituted alkylsulfonyl group, and in the case of having a substituent, the substituent is preferably an alkyl group having a carbon number of 1 to 20, a cyano group, a carboxyl group, an alkoxycarbonyl group, a carbamoyl group, an alkylcarbonyl group, a nitro group, an amino group, a hydroxy group, an alkoxy group having a carbon number of 1 to 20, an aryloxy group, a sulfamoyl group, a thiocyanate group, or an alkylsulfonyl group.

$OR^u$ ($R^u$ represents a hydrogen atom or a monovalent substituent), an alkyl group or an amido group is more preferred, and $OR^u$ or an alkyl group is still more preferred.

$R^u$ represents a hydrogen atom or a monovalent substituent, and examples of the monovalent substituent include the substituent A. In particular, a linear or branched alkyl group having a carbon number of 1 to 20 is preferred, and a linear or branched alkyl group having a carbon number of 1 to 6 is more preferred. Examples of the linear or branched alkyl group having a carbon number of 1 to 6 include methyl, ethyl, n-propyl, i-propyl, n-butyl, i-butyl, s-butyl, tert-butyl, n-pentyl, i-pentyl, tert-pentyl, n-hexyl, i-hexyl, tert-hexyl, n-octyl, tert-octyl and i-octyl. Among these, methyl and ethyl are preferred, and methyl is more preferred.

In the present invention, the first preferred embodiment includes an embodiment where at least one of $R^{1a}$, $R^{1c}$ and $R^{1e}$ represents a substituent having a Hammett's σp value of 0.3 or more. More preferably, $R^{1c}$ represents a substituent having a Hammett's σp value of 0.3 or more.

It is still more preferred that $R^{1c}$ represents a substituent having a Hammett's σp value of 0.3 or more and each of $R^{1a}$, $R^{1b}$, $R^{1d}$ and $R^{1e}$ represents a hydrogen atom.

In the case where $R^{1c}$ represents a substituent having a Hammett's σp value of 0.3 or more, LUMO is stabilized by an electron-withdrawing group, and this advantageously yields short excitation life and enhanced light resistance.

Also, the second preferred embodiment includes an embodiment where each of $R^{1a}$, $R^{1c}$ and $R^{1e}$ represents a hydrogen atom, each of $R^{1b}$ and $R^{1d}$ independently represents a hydrogen atom or a substituent having a Hammett's σp value of 0.3 or more, and at least either one is a substituent having a Hammett's σp value of 0.3 or more. Thanks to this configuration, the compound represented by formula (1) is excellent particularly in the solvent solubility, and the polycarbonate resin composition containing the compound is provided with an effect that the compound is unlikely to precipitate or bleed out and exhibits excellent compatibility with the polycarbonate resin. The solvent solubility means the solubility in an organic solvent such as ethyl acetate, methyl ethyl ketone and toluene, and in view of compatibility with the polycarbonate resin, the compound is preferably dissolved in a ratio of 10 mass % or more, more preferably 30 mass % or more, based on the solvent used.

First Preferred Embodiment

In the first embodiment, the substituent having a Hammett's σp value of 0.3 or more in formula (1) is preferably an electron-withdrawing group having a σp value of 0.3 to 1.2. Specific examples of the electron-withdrawing group having a σp value of 0.3 or more include $COOR^r$ ($R^r$ represents a hydrogen atom or a monovalent substituent and is a hydrogen atom or an alkyl group, preferably a hydrogen atom), $CONR^s_2$ ($R^s$ represents a hydrogen atom or a monovalent substituent), a cyano group, a nitro group, $SO_3M$ (M represents a hydrogen atom or an alkali metal), an acyl group, a formyl group, an acyloxy group, an acylthio group, an alkyloxycarbonyl group, an aryloxycarbonyl group, a dialkylphosphono group, a diarylphosphono group, a dialkylphosphinyl group, a diarylphosphinyl group, a phosphoryl group, an alkylsulfinyl group, an arylsulfinyl group, an acylthio group, a sulfamoyl group, a thiocyanate group, a thiocarbonyl group, an imino group, an N atom-substituted imino group, a carboxy group (or a salt thereof), an alkyl group substituted with at least two or more halogen atoms (e.g., $CF_3$), an alkoxy group substituted with at least two or more halogen atoms, an aryloxy group substituted with at least two or more halogen atoms, an acylamino group, an alkylamino group substituted with at least two or more halogen atoms, an alkylthio group substituted with at least two or more halogen atoms, an aryl group substituted with another electron-withdrawing group having a σp value of 0.2 or more, a heterocyclic group, an azo group, and a selenocyanate group. Details of the Hammett's σp value are described in C. Hansch, A. Leo and R. W. Taft, *Chem. Rev.*, 1991, 91, 165-195.

The substituent having a Hammett's σp value of 0.3 or more in formula (1) is more preferably $COOR^r$, $CONR^s_2$, a cyano group, $CF_3$, a nitro group or $SO_3M$ [wherein each of $R^r$ and $R^s$ independently represents a hydrogen atom or a monovalent substituent, and M represents a hydrogen atom or an alkali metal], still more preferably $COOR^r$ or a cyano group, yet still more preferably $COOR^r$ because of excellent light resistance and solubility.

Each $R^r$ of and $R^s$ represents a hydrogen atom or a monovalent substituent, and examples of the monovalent substituent include the substituent A. In particular, a linear or branched alkyl group is preferred, and a linear or branched alkyl group having a carbon number of 1 to 20 is more preferred. Examples of the linear or branched alkyl group having a carbon number of 1 to 20 include methyl, ethyl, n-propyl, i-propyl, n-butyl, i-butyl, s-butyl, tert-butyl, n-pentyl, i-pentyl, tert-pentyl, n-hexyl, i-hexyl, tert-hexyl, n-octyl, tert-octyl, i-octyl, 2-ethylhexyl, [7-methyl-2-(3-methylbutyl)]octyl, 2-hexyldecyl, [8-methyl-2-(4-methylhexyl)]decyl, [5,7,7-trimethyl-2-(1,3,3-trimethylbutyl)]octyl, 2-heptylundecyl, [5,9-dimethyl-2-(1,5-dimethylhexyl)]decyl, and 3,5,5-trimethyl-1-hexyl. Among these, methyl, ethyl, 2-ethylhexyl, [7-methyl-2-(3-methylbutyl)]octyl, 2-hexyldecyl, [8-methyl-2-(4-methylhexyl)]decyl, [5,7,7-trimethyl-2-(1,3,3-trimethylbutyl)]octyl, 2-heptylundecyl, [5,9-dimethyl-2-(1,5-dimethylhexyl)]decyl, and 3,5,5-trimethyl-1-hexyl are preferred, and methyl, 2-ethylhexyl, [7-methyl-2-(3-methylbutyl)]octyl, 2-hexyldecyl, [8-methyl-2-(4-methylhexyl)]decyl, [5,7,7-trimethyl-2-(1,3,3-trimethylbutyl)]octyl, 2-heptylundecyl, [5,9-dimethyl-2-(1,5-dimethylhexyl)]decyl, and 3,5,5-trimethyl-1-hexyl are more preferred.

In the compound represented by formula (1), $R^{1c}$ is preferably any one of $COOR^r$, $CONR^s_2$, a cyano group, $CF_3$, a nitro group and $SO_3M$ [M represents a hydrogen atom or an alkali metal], more preferably $COOR^r$ or a cyano group, still more preferably $COOR^r$.

In the present invention, when each of $R^{1g}$, $R^{1h}$, $R^{1k}$, $R^{1m}$, $R^{1n}$ and $R^{1p}$ represents a monovalent substituent, preferably, at least one of $R^{1g}$, $R^{1h}$, $R^{1i}$, $R^{1j}$, $R^{1k}$, $R^{1m}$, $R^{1n}$ and $R^{1p}$ represents the above-described substituent having a Hammett's σp value of 0.3 or more; more preferably, at least one of $R^{1g}$, $R^{1h}$, $R^{1i}$ and $R^{1j}$ represents the above-described substituent having a Hammett's σp value of 0.3 or more (preferably from 0.3 to 1.2); and still more preferably, $R^{1h}$ represents the above-described substituent having a Hammett's σp value of 0.3 or more. In particular, it is preferred that both $R^{1c}$ and $R^{1h}$ represent the above-described substituent having a Hammett's σp value or 0.3 or more (preferably 0.3 to 1.2). This is because the compound exhibits excellent light resistance.

In the present invention, preferably, each of $R^{1h}$ and $R^{1m}$ is independently any one of a hydrogen atom, $COOR^r$, $CONR^s_2$, a cyano group, $CF_3$, a nitro group and $SO_3M$ [M represents a hydrogen atom or an alkali metal]; more preferably, $R^{1h}$ or $R^{1m}$ is a hydrogen atom; still more preferably, both $R^{1h}$ and $R^{1m}$ are a hydrogen atom; and yet still more preferably, each of $R^{1g}$, $R^{1h}$, $R^{1i}$, $R^{1j}$, $R^{1k}$, $R^{1m}$, $R^{1n}$ and $R^{1p}$ represents a hydrogen atom. This is because the compound exhibits excellent light resistance.

In the compound represented by formula (1), preferably, $R^{1c}$ is a substituent having a Hammett's σp value of 0.3 or more (preferably from 0.3 to 1.2) and each of $R^{1g}$, $R^{1h}$, $R^{1i}$, $R^{1j}$, $R^{1k}$, $R^{1m}$, $R^{1n}$ and $R^{1p}$ is a hydrogen atom; and more preferably, $R^{1c}$ is any one of $COOR^r$, $CONR^s_2$, a cyano group, $CF_3$, a nitro group and $SO_3M$ [M represents a hydrogen atom or an alkali metal] and each of $R^{1g}$, $R^{1h}$, $R^{1i}$, $R^{1j}$, $R^{1k}$, $R^{1m}$, $R^{1n}$ and $R^{1p}$ is a hydrogen atom. This is because the compound exhibits excellent light resistance.

The compound represented by formula (1) preferably has a pKa of −5.0 to −7.0, more preferably from −5.2 to −6.5, still more preferably −5.4 to −6.0.

Preferred Second Embodiment

The second preferred embodiment includes an embodiment where each of $R^{1a}$, $R^{1c}$, and $R^{1e}$ represents a hydrogen atom, each of $R^{1b}$ and $R^{1d}$ independently represents a hydrogen atom or a substituent having a Hammett's σp value of 0.3 or more, and at least one of them is a substituent having a Hammett's σp value of 0.3 or more.

In the second embodiment where each of $R^{1a}$, $R^{1c}$ and $R^{1e}$ represents a hydrogen atom, each of $R^{1b}$ and $R^{1d}$ independently represents a hydrogen atom or a substituent having a Hammett's σp value of 0.3 or more, and at least one of them is a substituent having a Hammett's σp value of 0.3 or more, the substituent having a Hammett's σp value of 0.3 or more in formula (1) is preferably $COOR^r$, $CONR^s_2$, a cyano group, $CF_3$, a nitro group or $SO_3M$ [wherein each of $R^r$ and $R^s$ independently represents a hydrogen atom or a monovalent substituent, and M represents a hydrogen atom or an alkali metal].

Examples of the monovalent substituent of $R^r$ and $R^s$ include the substituent A.

The substituent having a Hammett's σp value of 0.3 or more in formula (1) is more preferably $COOR^r$ or a cyano group, still more preferably $COOR^r$. This is because the compound exhibits excellent light fastness when the substituent having a Hammett's σp value of 0.3 or more is a cyano group, and exhibits excellent solubility when the substituent having a Hammett's σp value of 0.3 or more is $COOR^r$.

$R^r$ preferably represents a hydrogen atom or an alkyl group, more preferably a linear or branched alkyl group having a carbon number of 1 to 20.

In view of solubility in a solvent, $R^r$ is preferably a branched alkyl group having a carbon number of 5 to 20.

The branched alkyl group has a secondary or tertiary carbon atom and preferably contains from one to five secondary or tertiary carbon atoms, more preferably from one to three secondary or tertiary carbon atoms, still more preferably one or two secondary or tertiary carbon atoms. It is also preferred to contain from one to three asymmetric carbons.

In view of solubility in a solvent, $R^r$ is more preferably a branched alkyl group having a carbon number of 5 to 20 and containing one or two secondary or tertiary carbon atoms and one or two asymmetric carbons.

This is because the symmetry of the compound structure is lost and the solubility is enhanced.

On the other hand, in view of ultraviolet absorbing ability, a linear or branched alkyl group having a carbon number of 1 to 20 is more preferred.

Examples of the linear or branched alkyl group having a carbon number of 1 to 20 include methyl, ethyl, n-propyl, i-propyl, n-butyl, i-butyl, s-butyl, tert-butyl, n-pentyl, i-pentyl, tert-pentyl, n-hexyl, i-hexyl, tert-hexyl, n-octyl, tert-octyl, i-octyl, 2-ethylhexyl, [7-methyl-2-(3-methylbutyl)]octyl, 2-hexyldecyl, [8-methyl-2-(4-methylhexyl)]decyl, [5,7,7-trimethyl-2-(1,3,3-trimethylbutyl)]octyl, 2-heptylundecyl, [5,9-dimethyl-2-(1,5-dimethylhexyl)]decyl, 7-methyloctyl, and 3,5,5-trimethyl-1-hexyl. Among these, methyl, ethyl, 2-ethylhexyl, [7-methyl-2-(3-methylbutyl)]octyl, 2-hexyldecyl, [8-methyl-2-(4-methylhexyl)]decyl, [5,7,7-trimethyl-2-(1,3,3-trimethylbutyl)]octyl, 2-heptylundecyl, [5,9-dimethyl-2-(1,5-dimethylhexyl)]decyl, 7-methyloctyl, and 3,5,5-trimethyl-1-hexyl are preferred, and methyl, 2-ethylhexyl, [7-methyl-2-(3-methylbutyl)]octyl, 2-hexyldecyl, [8-methyl-2-(4-methylhexyl)]decyl, [5,7,7-trimethyl-2-(1,3,3-trimethylbutyl)]octyl, 2-heptylundecyl, [5,9-dimethyl-2-(1,5-dimethylhexyl)]decyl, 7-methyloctyl, and 3,5,5-trimethyl-1-hexyl are more preferred.

In the present invention, when each of $R^{1g}$, $R^{1h}$, $R^{1i}$, $R^{1j}$, $R^{1k}$, $R^{1m}$, $R^{1n}$ and $R^{1p}$ represents a monovalent substituent, preferably, at least one of $R^{1g}$, $R^{1h}$, $R^{1i}$, $R^{1j}$, $R^{1k}$, $R^{1m}$, $R^{1n}$ and $R^{1p}$ represents the above-described substituent having a Hammett's σp value of 0.3 or more; more preferably, at least one of $R^{1g}$, $R^{1h}$, $R^{1i}$ and $R^{1j}$ represents the above-described substituent having a Hammett's σp value of 0.3 or more (preferably from 0.3 to 1.2); and still more preferably, $R^{1h}$ represents the above-described substituent having a Hammett's σp value of 0.3 or more. In particular, it is preferred that $R^{1b}$ or $R^{1d}$ and $R^{1h}$ represent the above-described substituent having a Hammett's σp value of 0.3 or more (preferably 0.3 to 1.2). This is because the compound exhibits excellent light resistance.

In the present invention, preferably, each of $R^{1h}$ and $R^{1n}$ is independently any one of a hydrogen atom, $COOR^r$, $CONR^s_2$, a cyano group, $CF_3$, a nitro group and $SO_3M$ [M represents a hydrogen atom or an alkali metal]; more preferably, $R^{1h}$ or $R^{1n}$ is a hydrogen atom; still more preferably, both $R^{1h}$ and $R^{1n}$ are a hydrogen atom; and yet still more preferably, each of $R^{1g}$, $R^{1h}$, $R^{1n}$, $R^{1j}$, $R^{1k}$, $R^{1m}$, $R^{1n}$ and $R^{1p}$ represents a hydrogen atom. This is because the compound exhibits excellent light resistance.

In the compound represented by formula (1), preferably, $R^{1b}$ or $R^{1d}$ represents a substituent having a Hammett's σp value of 0.3 or more (preferably from 0.3 to 1.2) and each of $R^{1g}$, $R^{1h}$, $R^{1i}$, $R^{1k}$, $R^{1m}$, $R^{1n}$ and $R^{1p}$ represents a hydrogen atom; and more preferably, $R^{1b}$ or $R^{1d}$ is any one of $COOR^r$, $CONR^s_2$, a cyano group, $CF_3$, a nitro group and $SO_3M$ [M represents a hydrogen atom or an alkali metal] and each of $R^{1g}$, $R^{1h}$, $R^{1i}$, $R^{1k}$, $R^{1m}$, $R^{1n}$ and $R^{1p}$ is a hydrogen atom. This is because the compound exhibits excellent light resistance.

The compound represented by formula (1) preferably has a pKa of −5.0 to −7.0, more preferably from −5.2 to −6.5, still more preferably −5.4 to −6.0.

Specific examples of the compound represented by formula (1) are illustrated below, but the present invention is not limited thereto.

In specific examples, Me indicates a methyl group, Ph indicates a phenyl group, and —$C_6H_{13}$ indicates an n-hexyl.

(9)
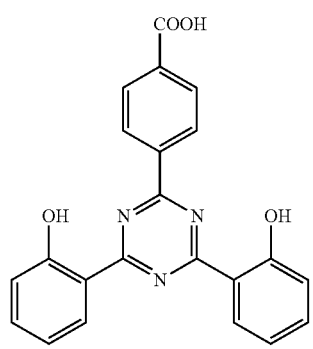
(10)
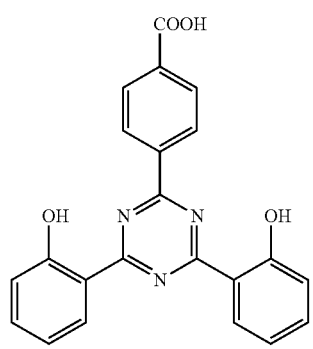
(11)
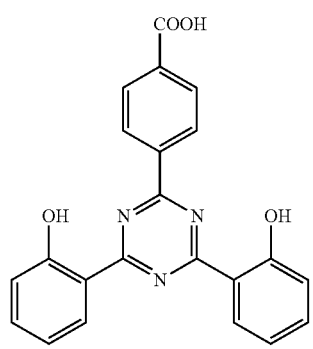
(12)
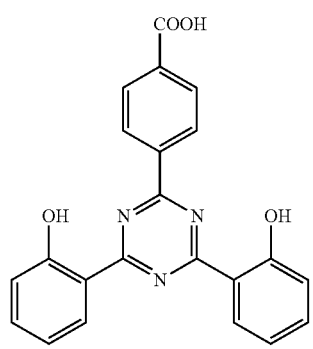
(13)
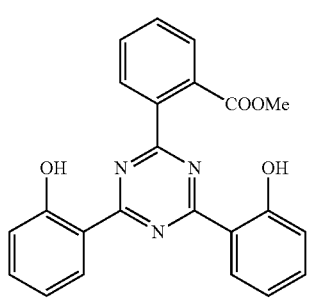
(14)
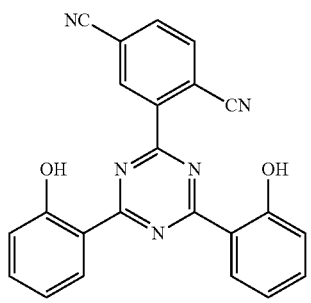
(15)
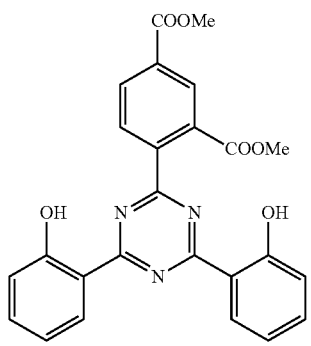
(16)
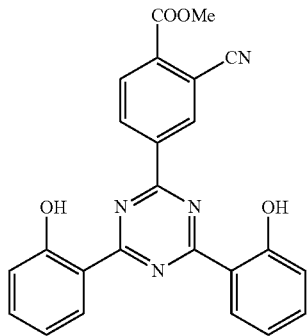
(17)
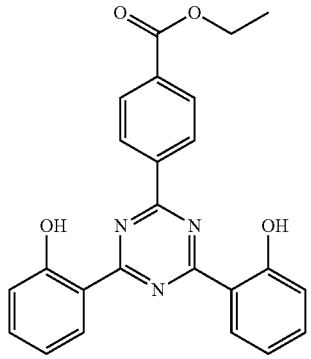

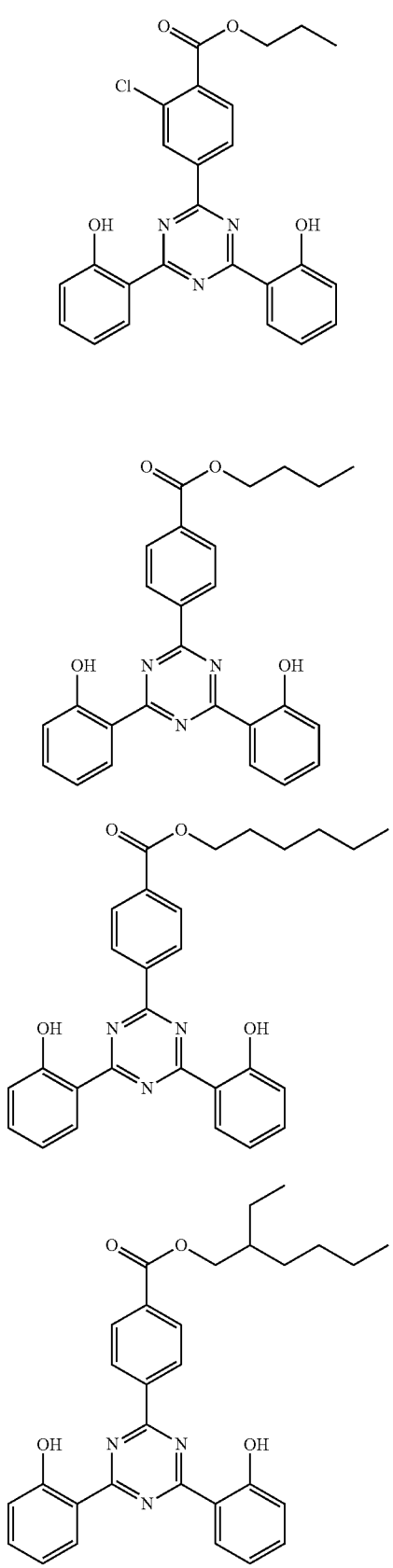
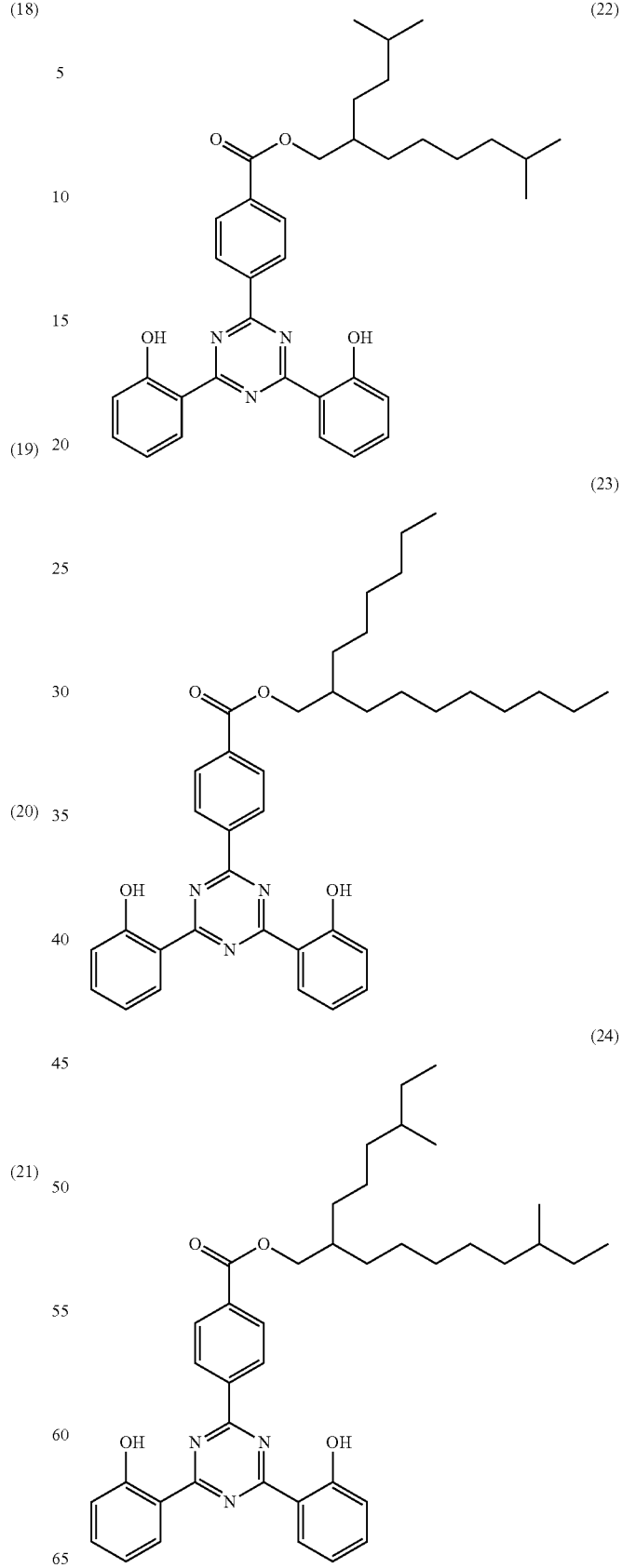

(25)
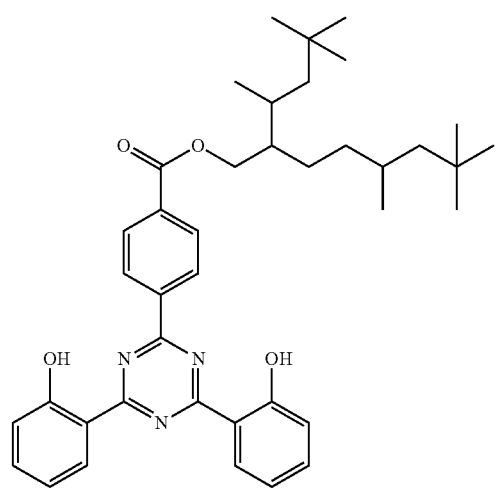
(26)
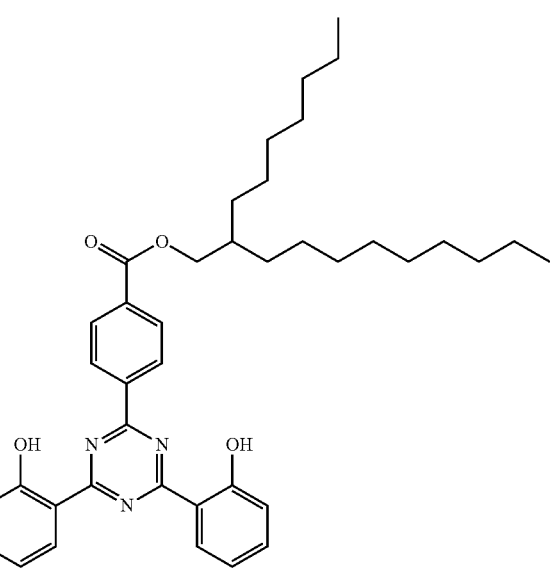
(27)
(28)
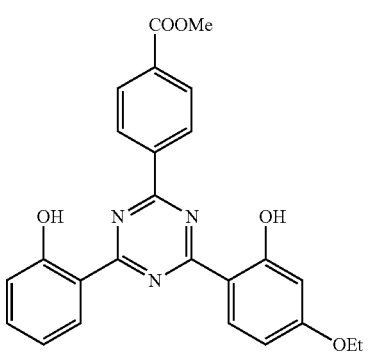
(29)
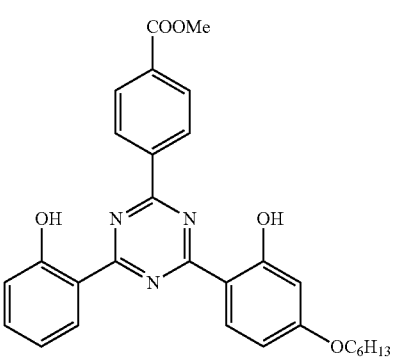
(30)
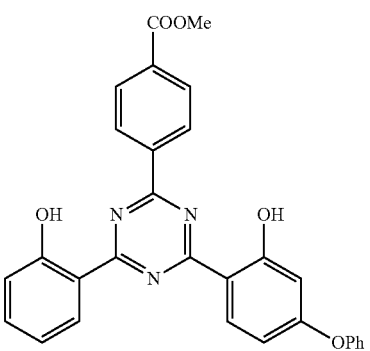
(31)
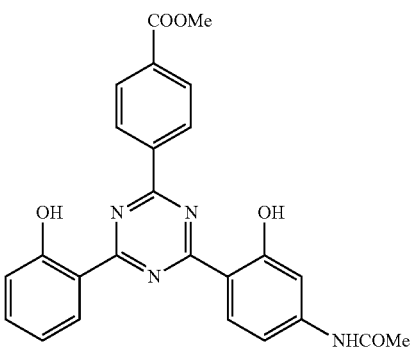

-continued
(32) 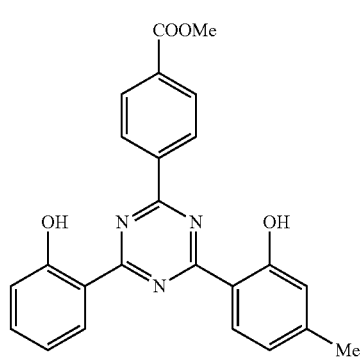
(33) 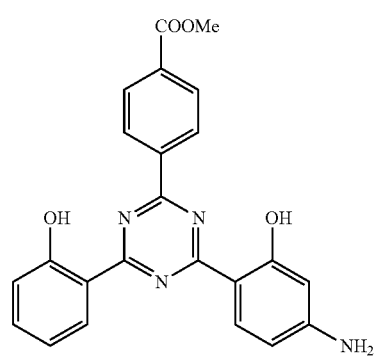
(34) 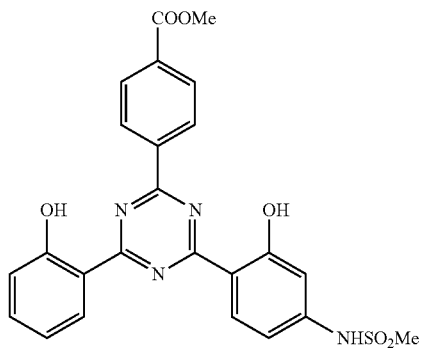
(35) 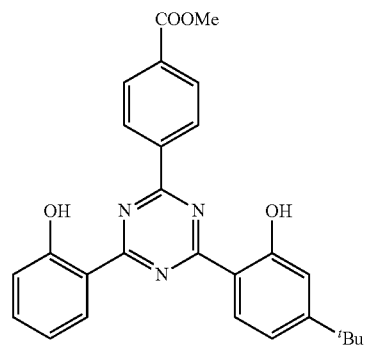
-continued
(36) 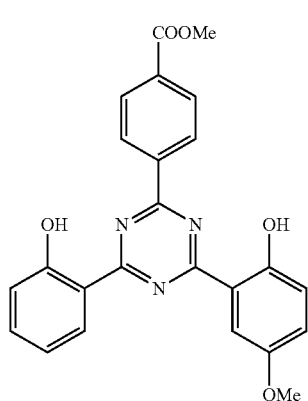
(37) 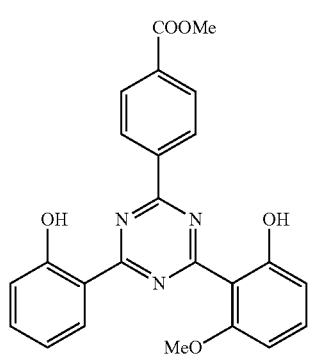
(38) 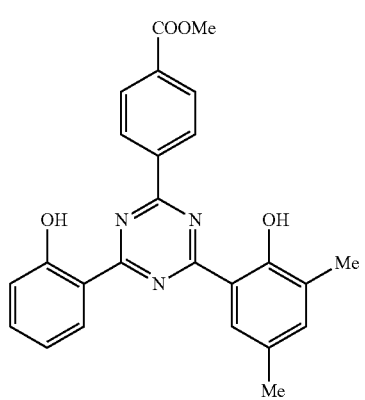
(39) 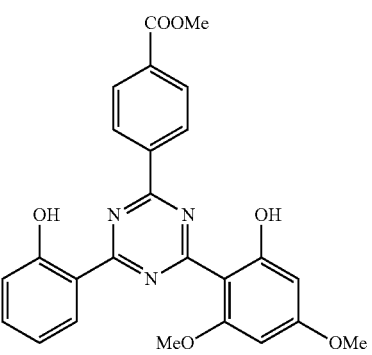

(40) 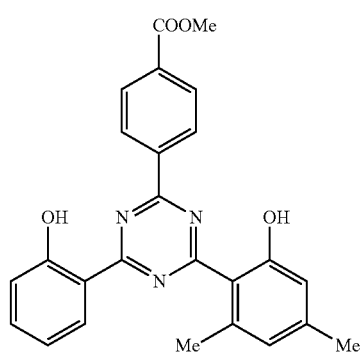
(41) 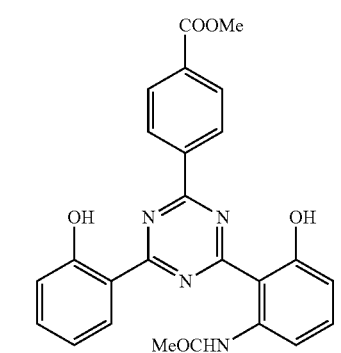
(42) 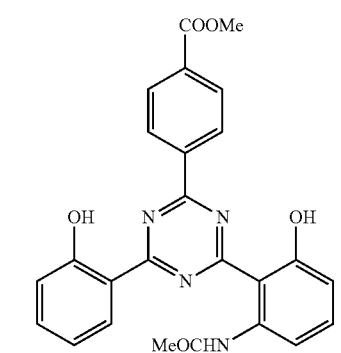
(43) 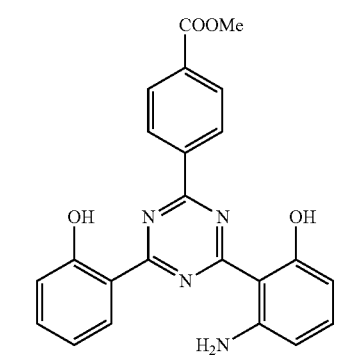
(44) 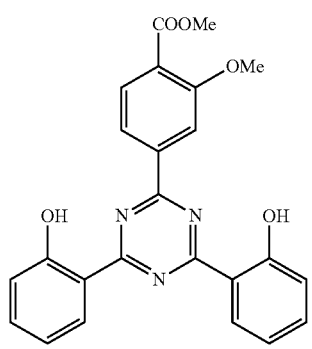
(45) 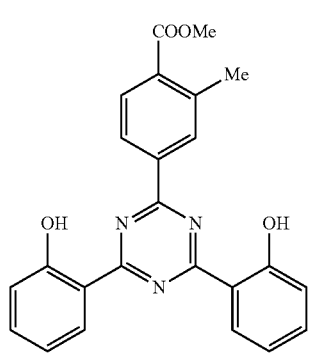
(46) 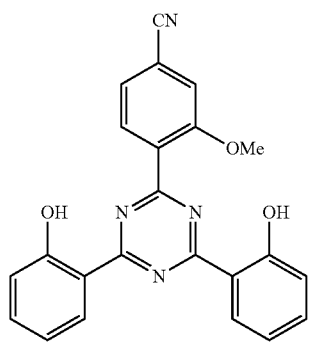
(47) 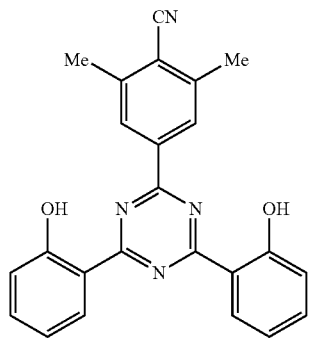

-continued
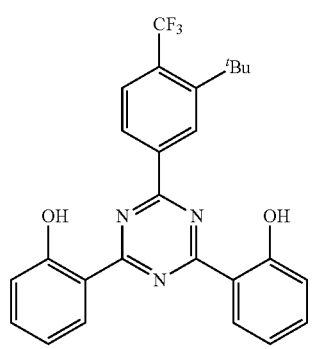
(48)
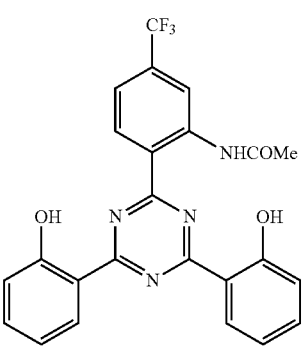
(49)
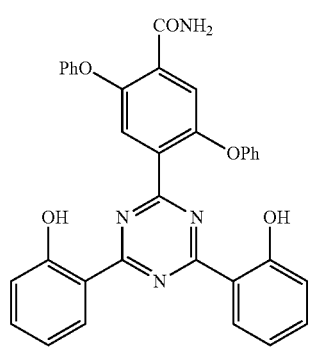
(50)
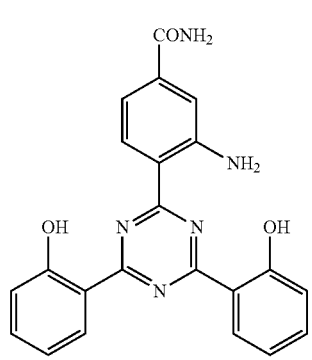
(51)
-continued
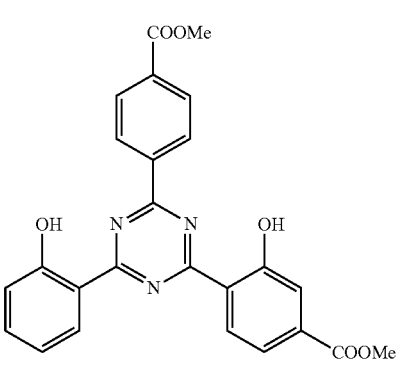
(55)
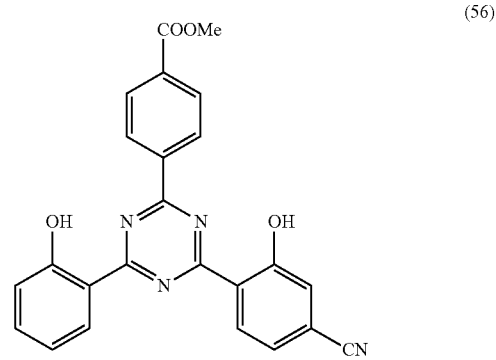
(56)
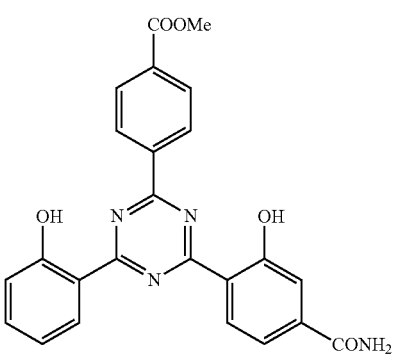
(57)
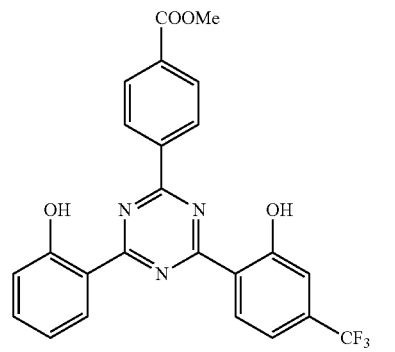
(58)

-continued
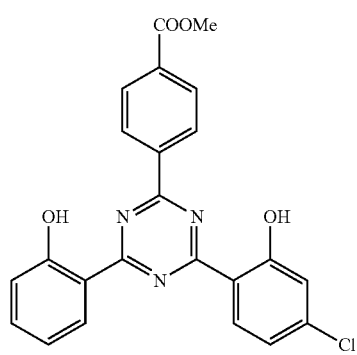 (59)
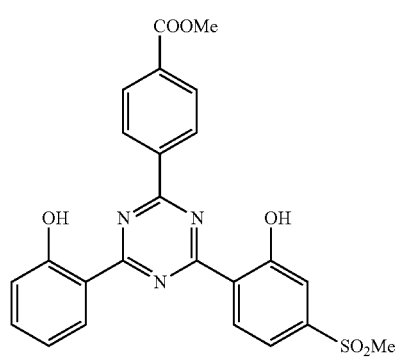 (60)
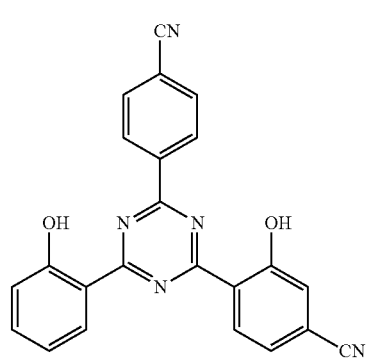 (61)
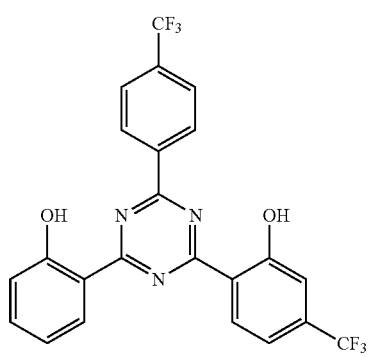 (62)
-continued
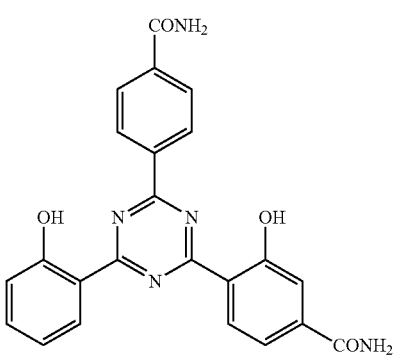 (63)
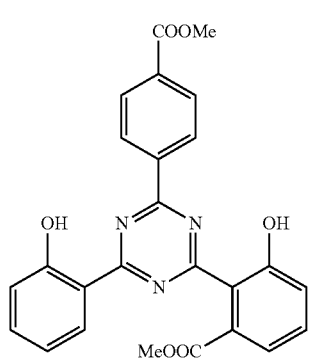 (64)
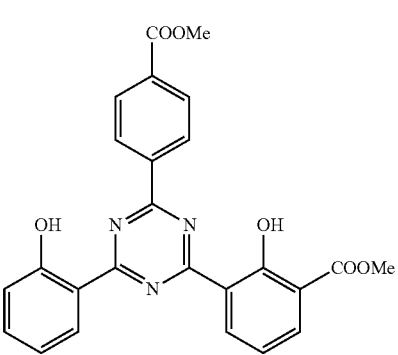 (65)
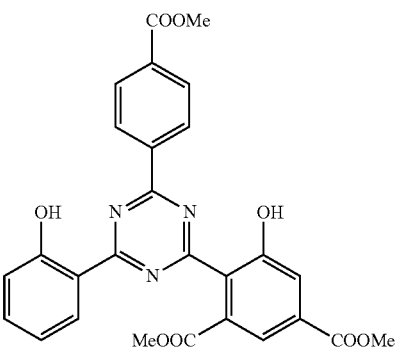 (66)

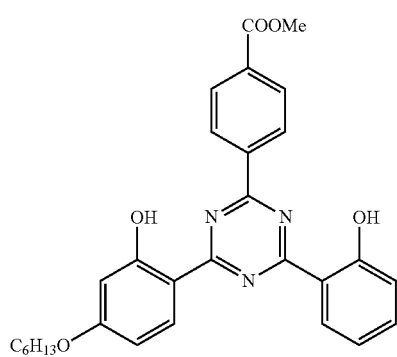
(67)
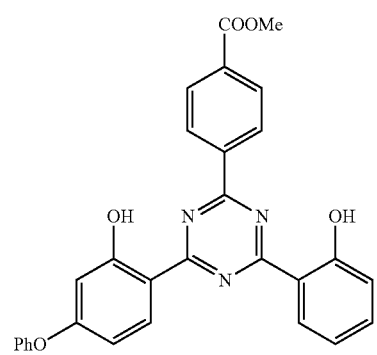
(68)
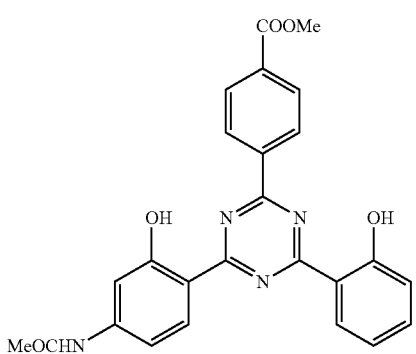
(69)
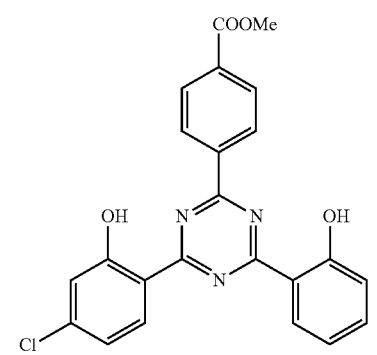
(70)
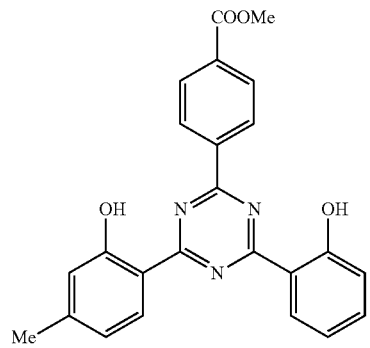
(71)
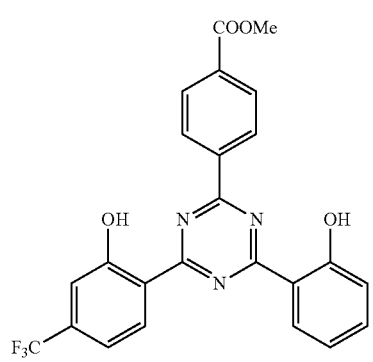
(72)
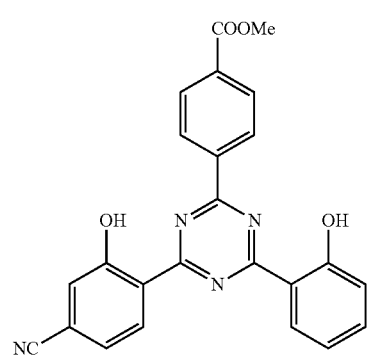
(73)
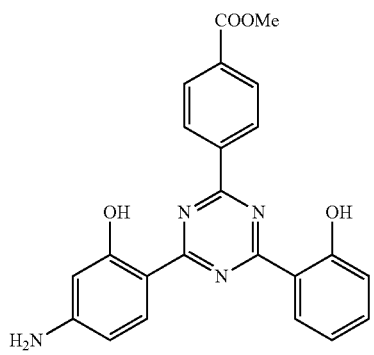
(74)

(75) 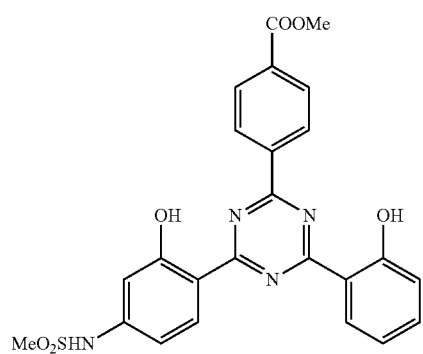
(76) 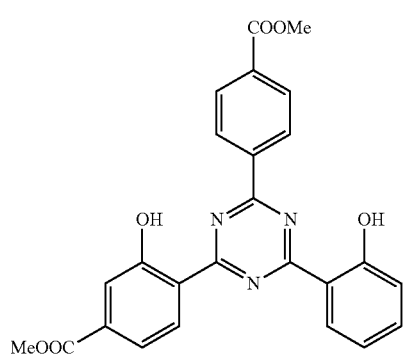
(77) 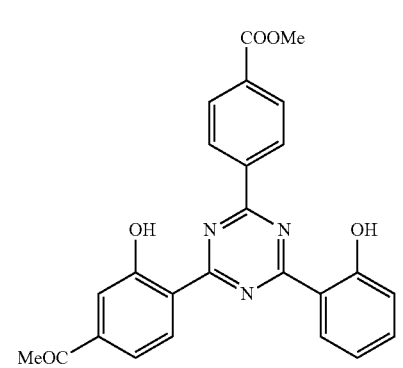
(78) 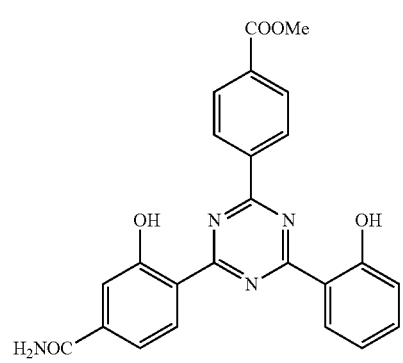
(79) 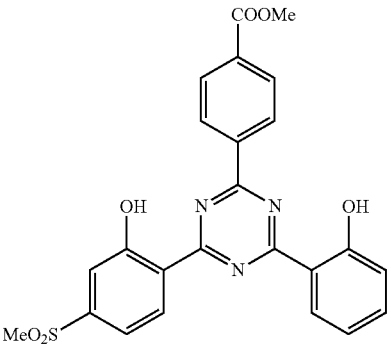
(80) 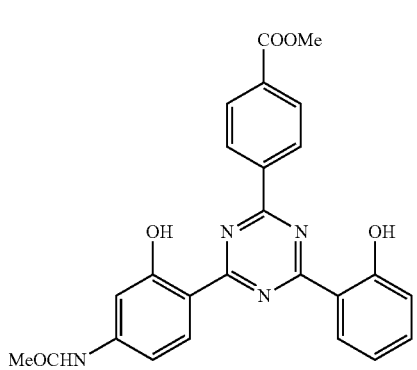
(81) 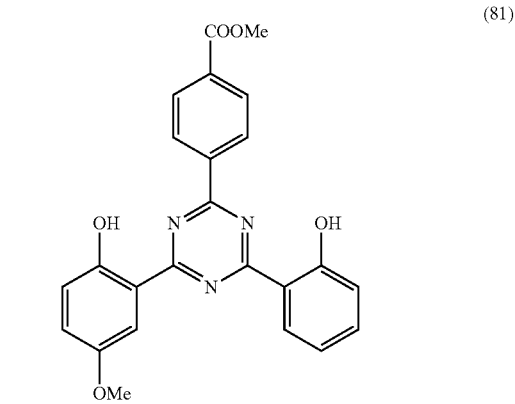
(82) 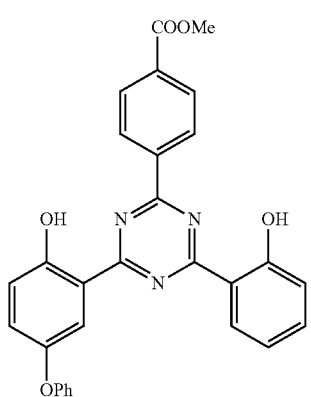

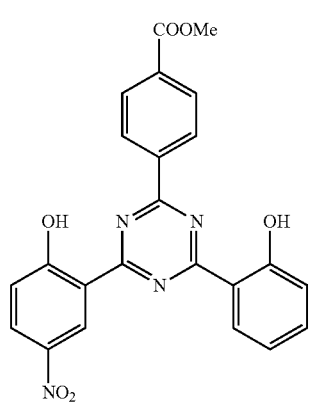 (83)
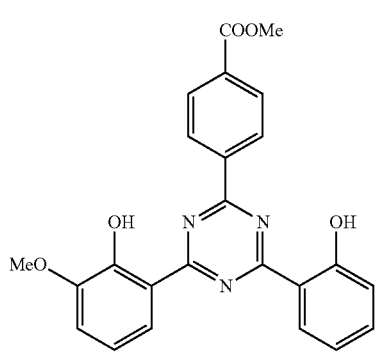 (87)
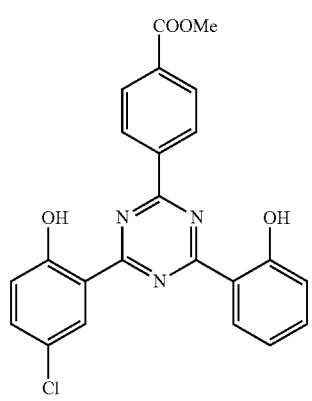 (84)
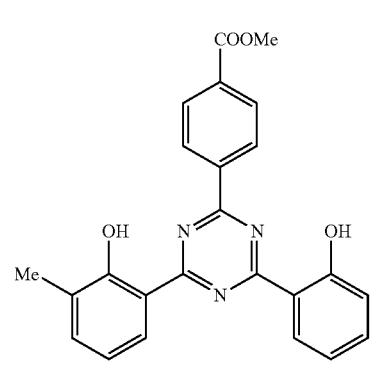 (88)
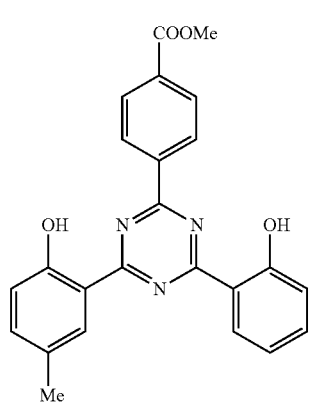 (85)
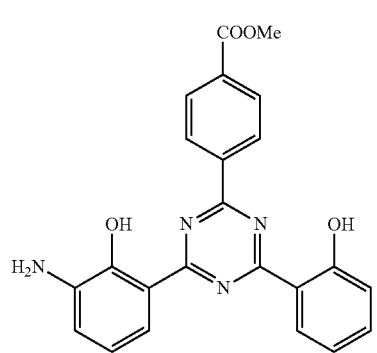 (89)
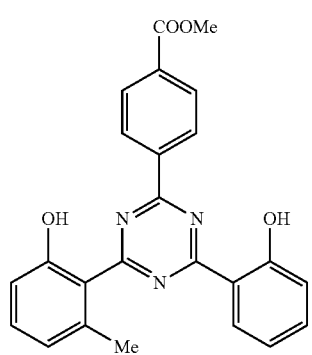 (86)
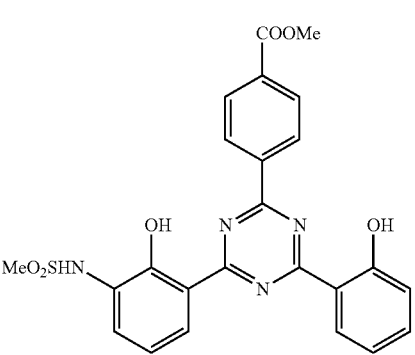 (90)

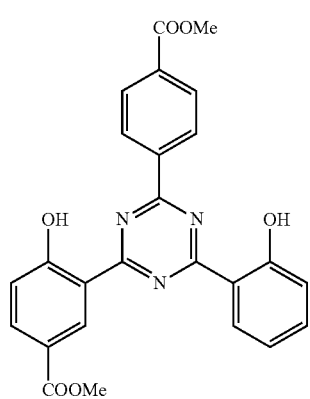
(91)
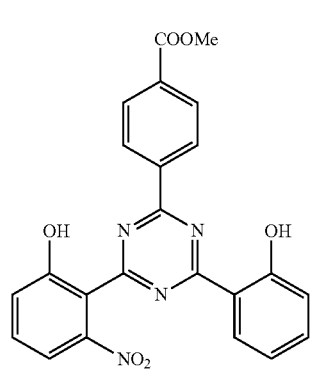
(95)
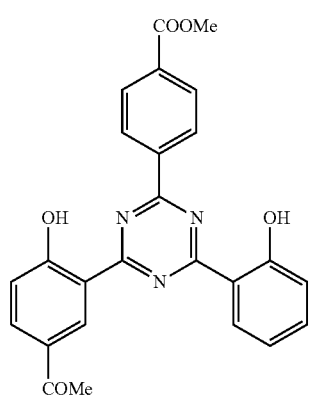
(92)
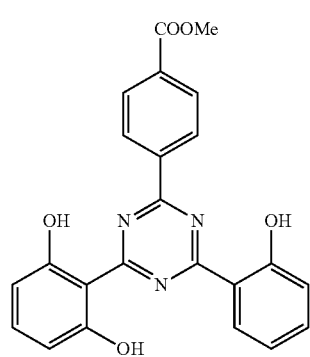
(96)
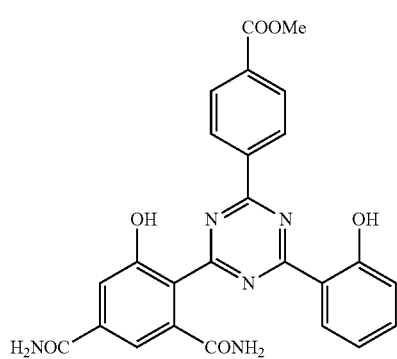
(93)
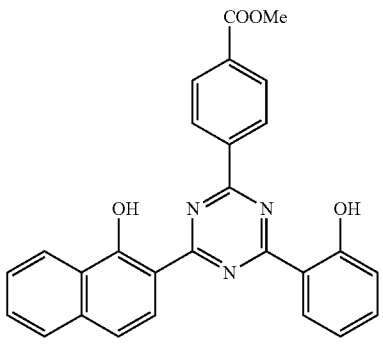
(97)
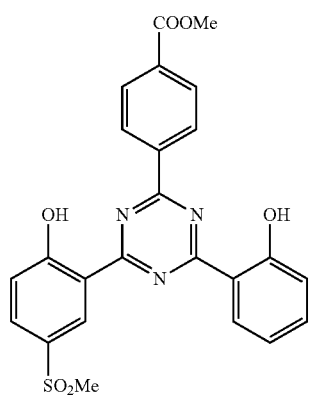
(94)
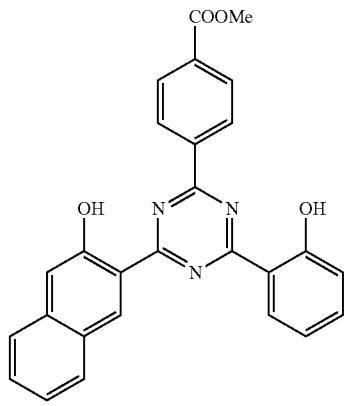
(98)

-continued
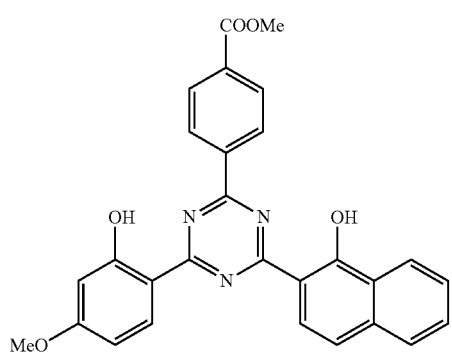
(99)
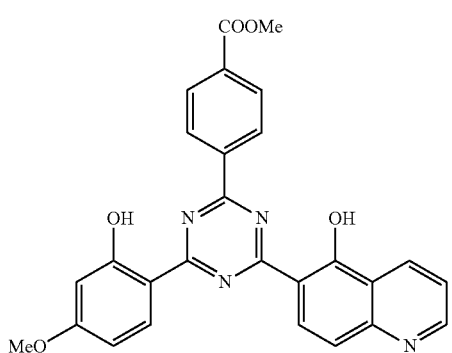
(100)
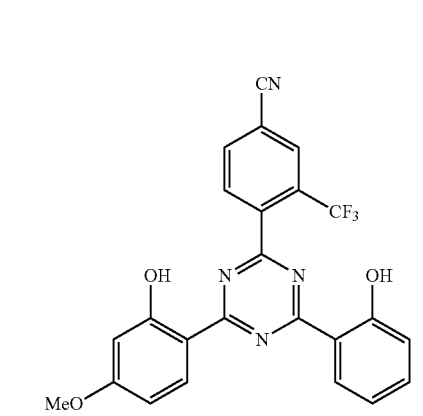
(101)
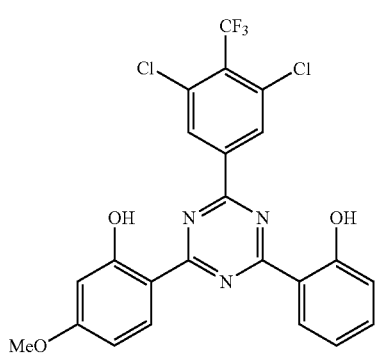
(102)
-continued
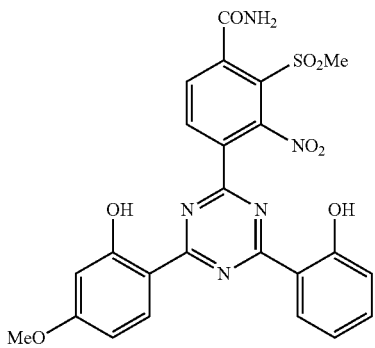
(103)
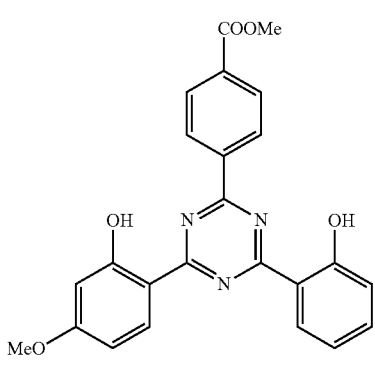
(104)
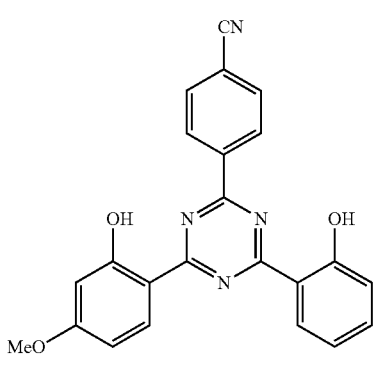
(105)
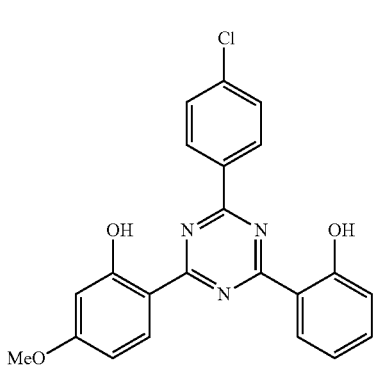
(106)

-continued
(107) 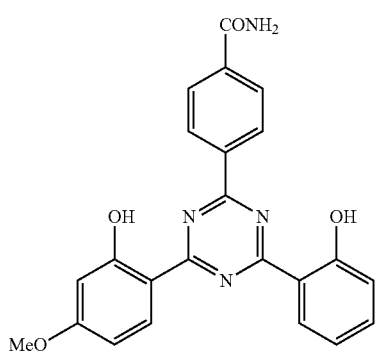
(108) 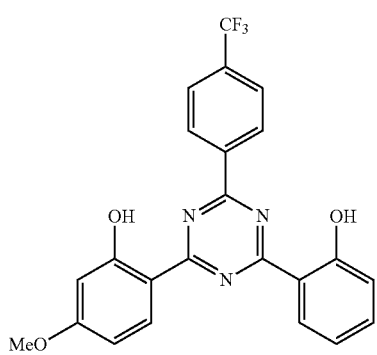
(109) 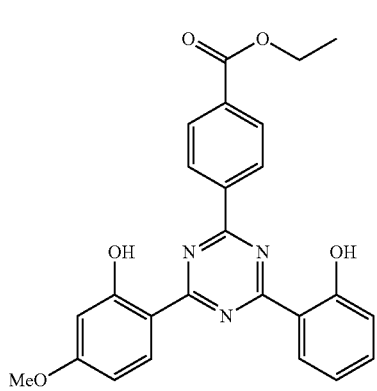
(110) 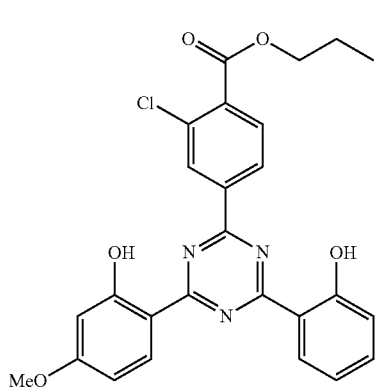
-continued
(111) 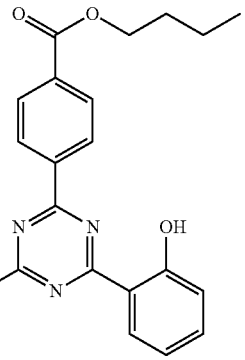
(112) 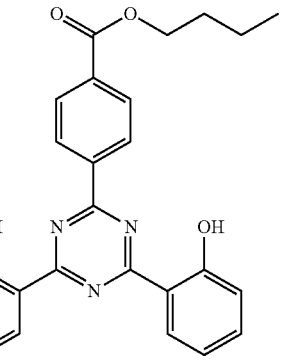
(113) 

(114)
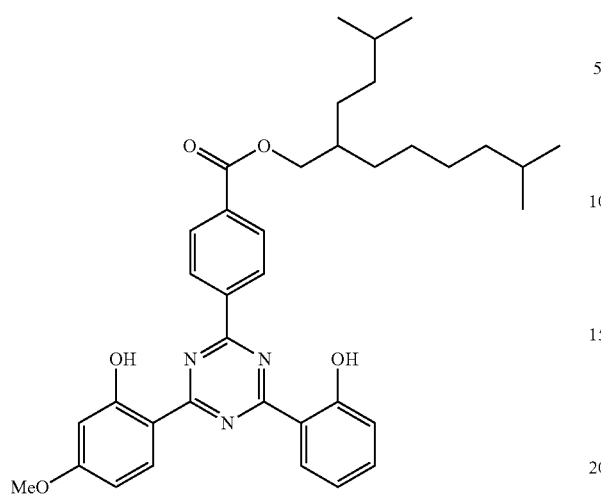
(115)
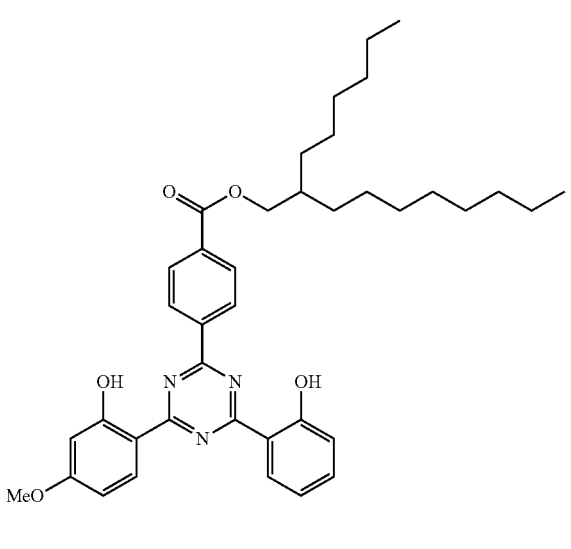
(116)
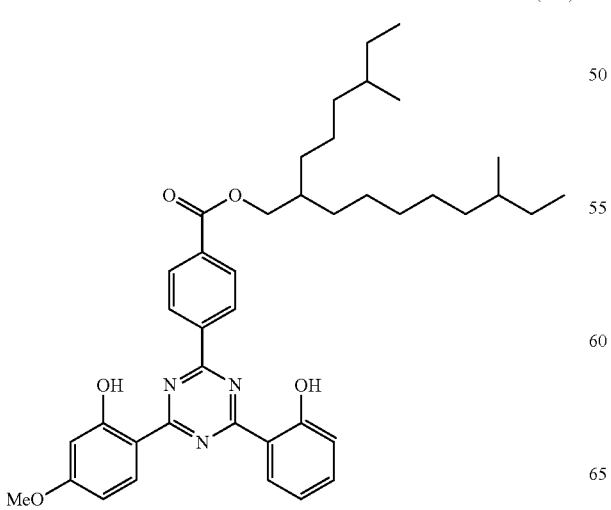
(117)
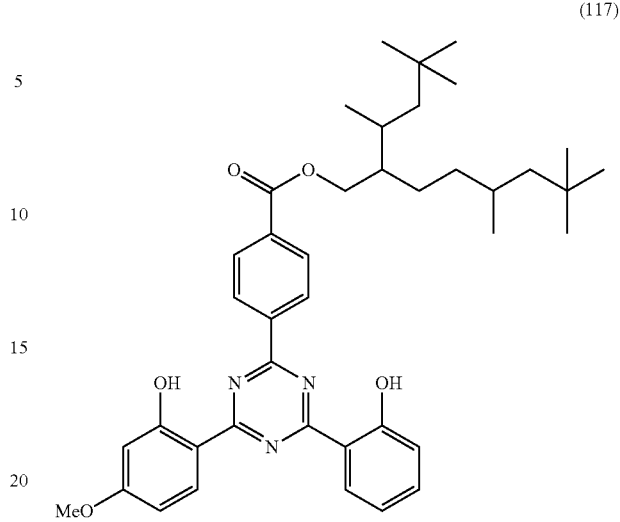
(118)
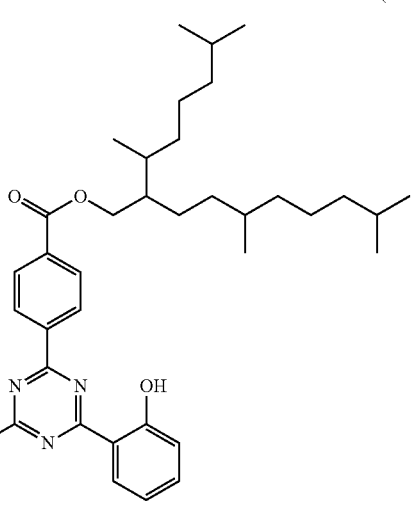
(119)

(120)
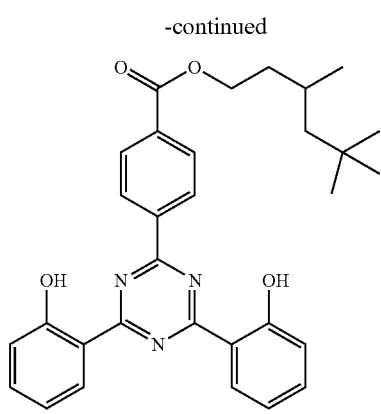
(m-1)
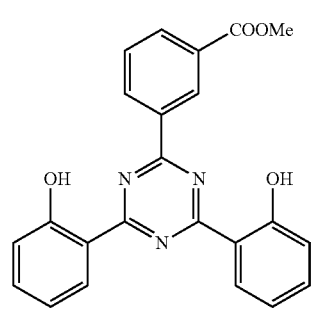
(m-2)
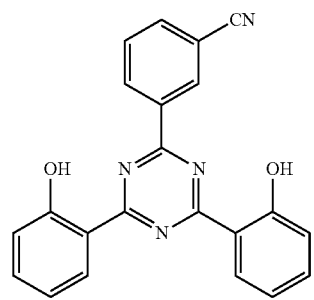
(m-3)
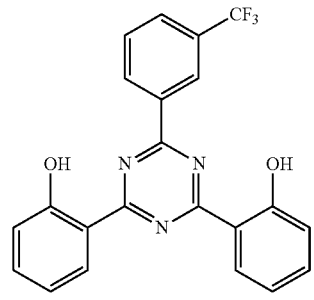
(m-4)
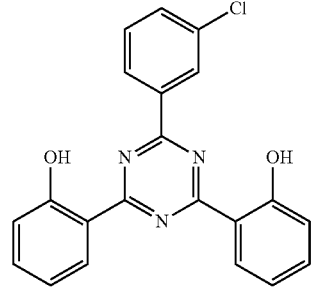
(m-5)
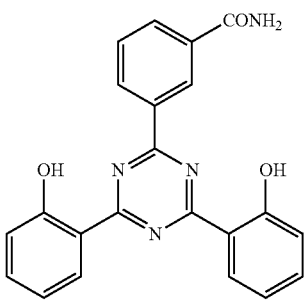
(m-6)
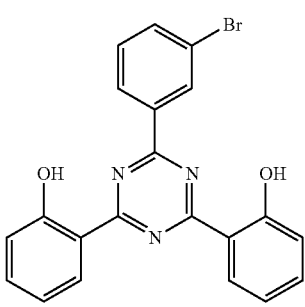
(m-7)
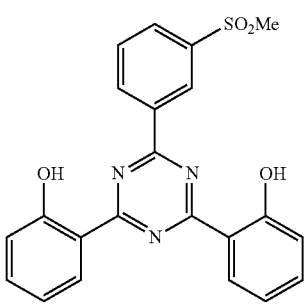
(m-8)
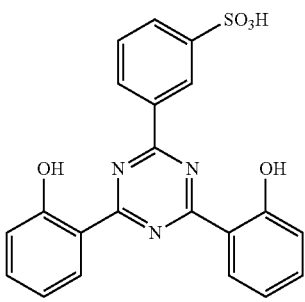
(m-9)
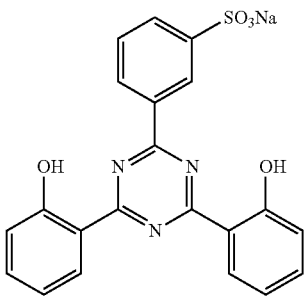

-continued
(m-10)
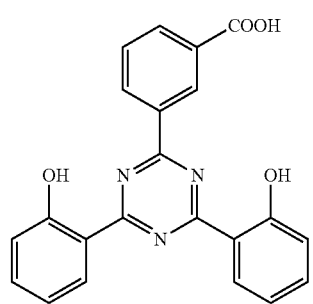
(m-11)
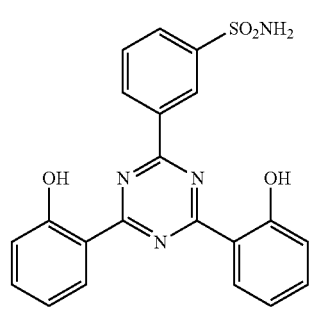
(m-12)
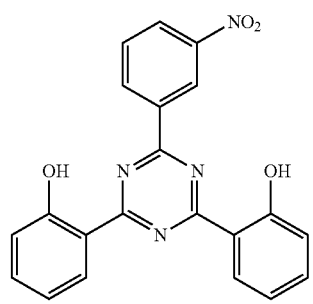
(m-13)
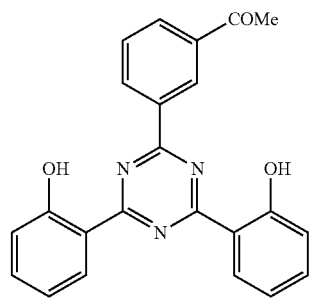
(m-14)
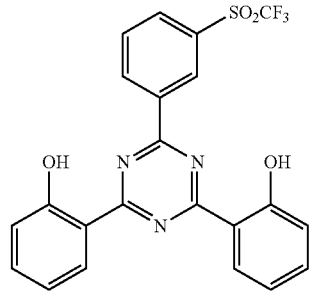
-continued
(m-15)
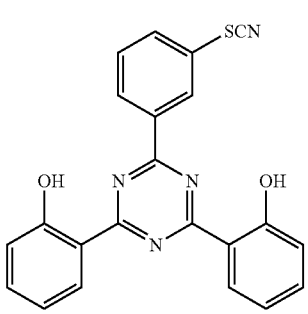
(m-16)
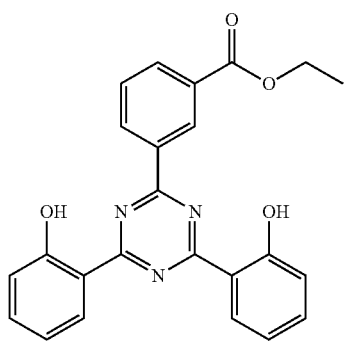
(m-17)
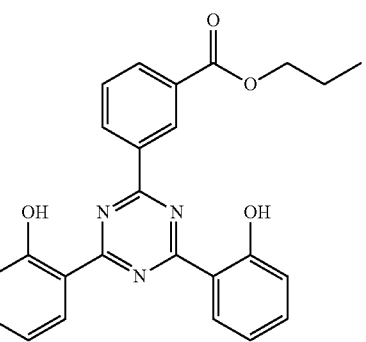
(m-18)
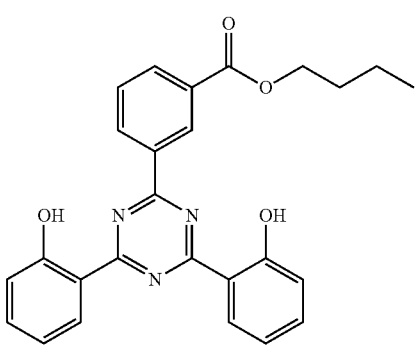

(m-19)
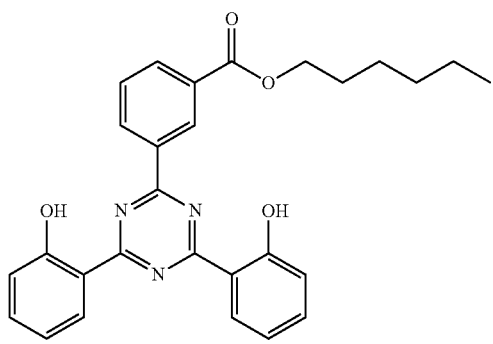
(m-23)
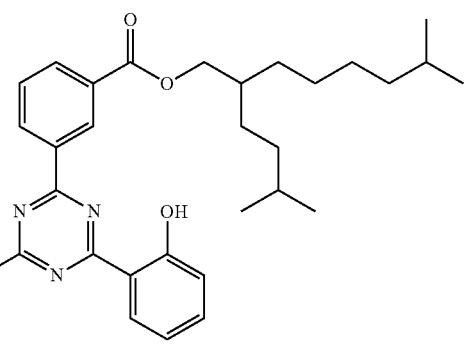
(m-20)
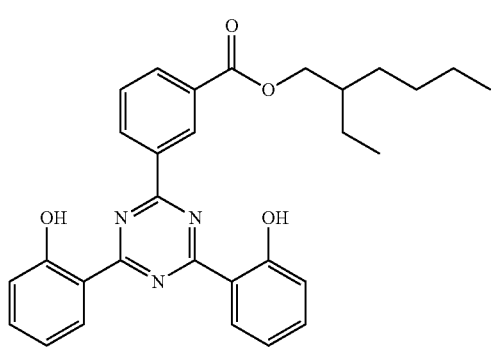
(m-24)
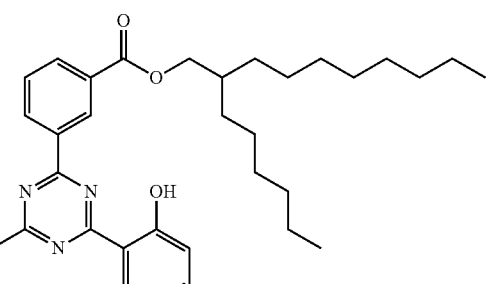
(m-21)
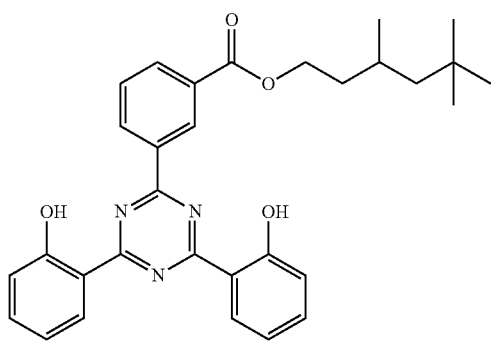
(m-25)
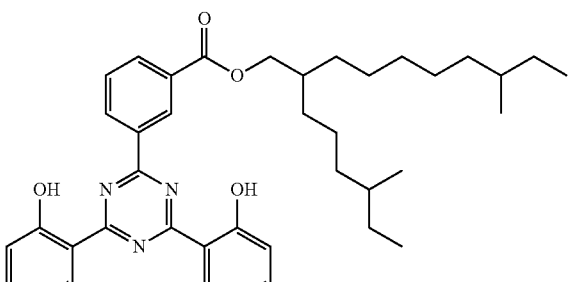
(m-22)
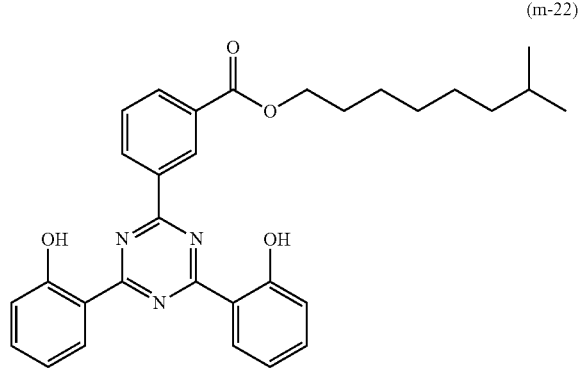
(m-26)
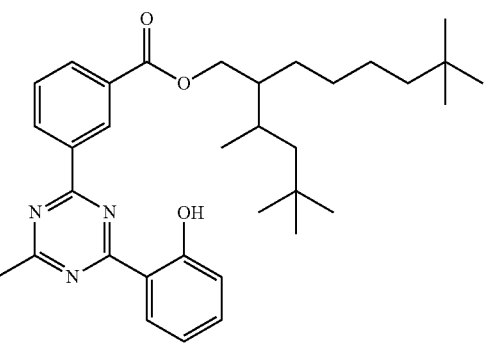

(m-27)
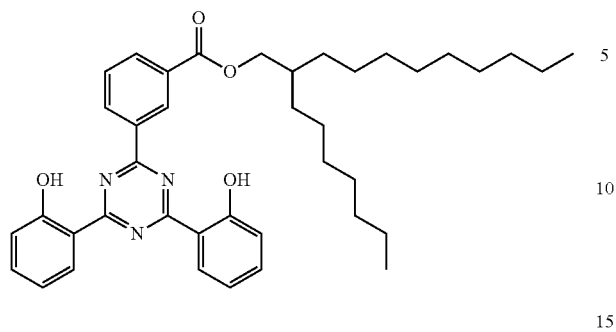
(m-32)
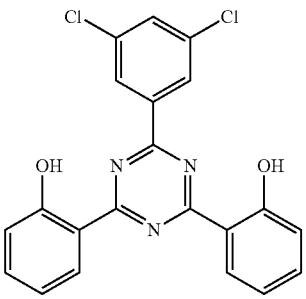
(m-28)
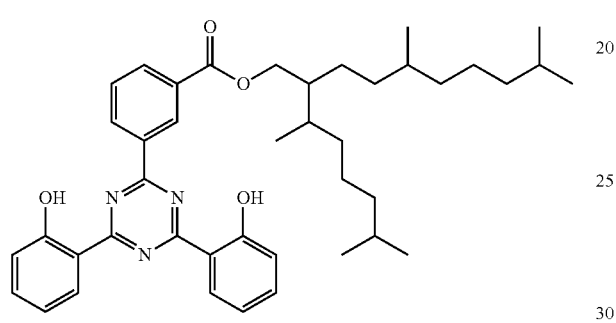
(m-33)
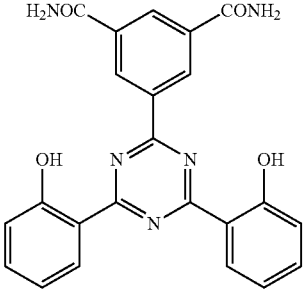
(m-29)
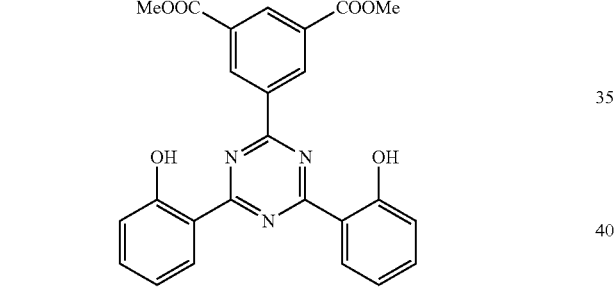
(m-34)
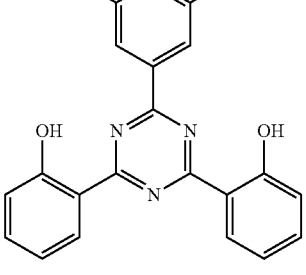
(m-30)
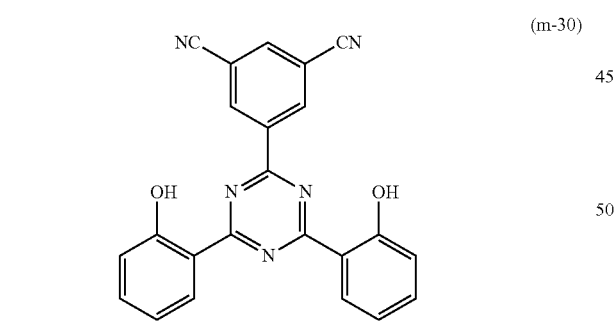
(m-35)
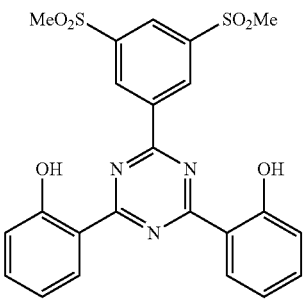
(m-31)
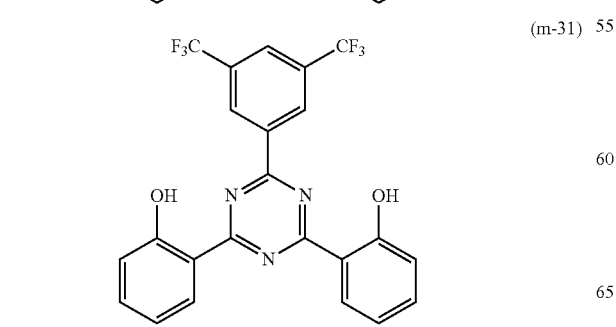
(m-36)
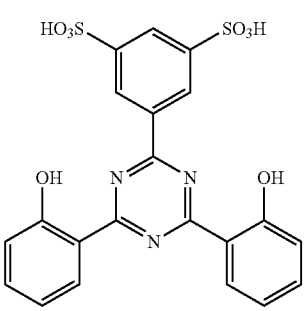

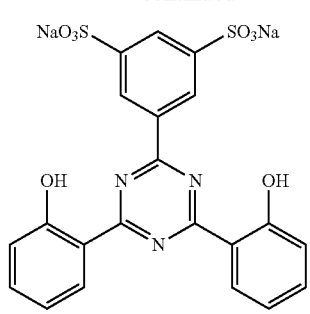 (m-37)
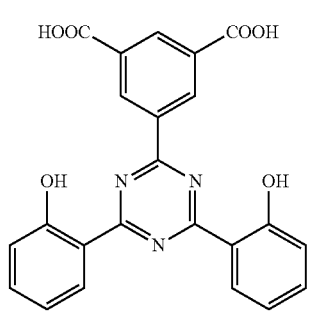 (m-38)
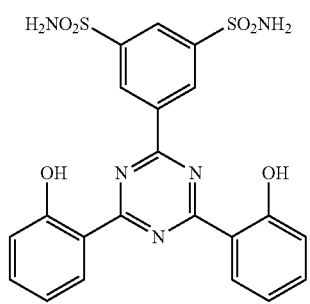 (m-39)
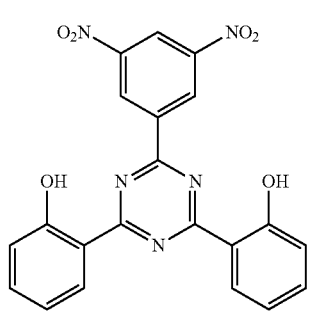 (m-40)
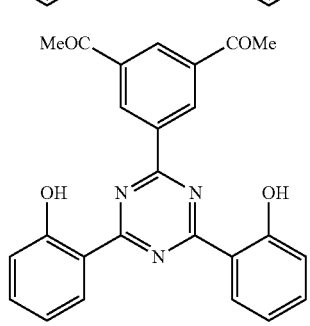 (m-41)
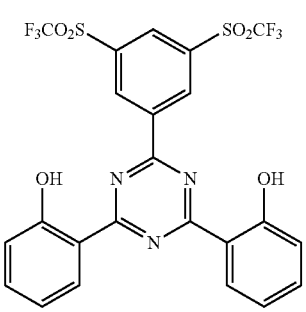 (m-42)
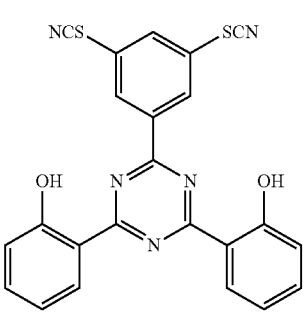 (m-43)
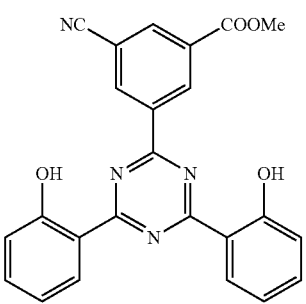 (m-44)
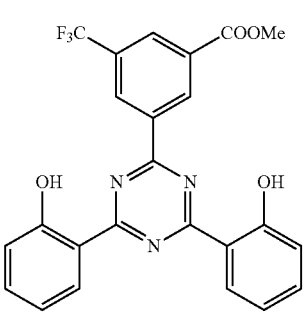 (m-45)
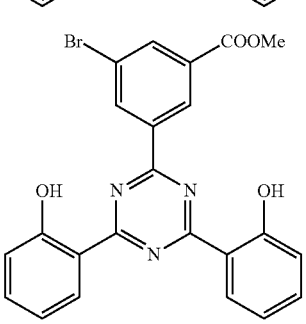 (m-46)

(m-47) 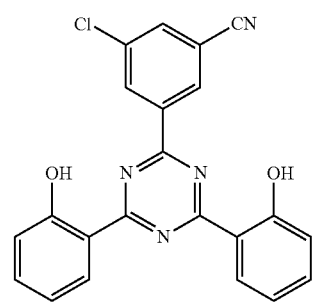
(m-48) 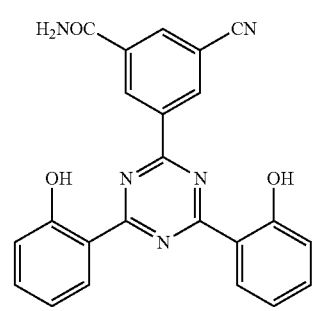
(m-49) 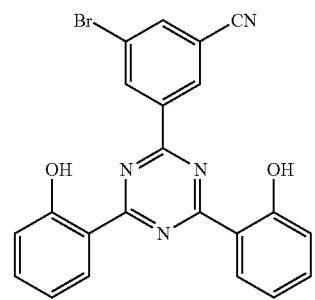
(m-50) 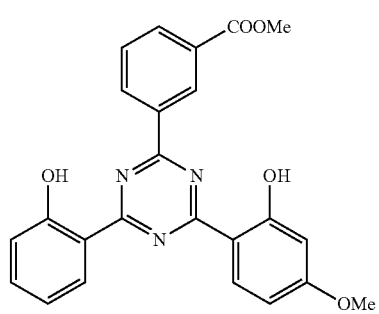
(m-51) 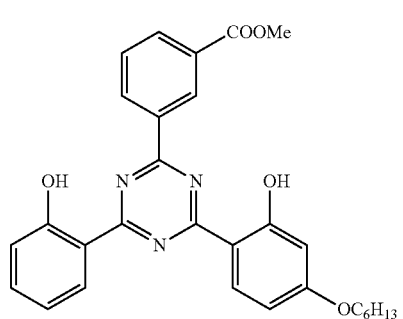
(m-52) 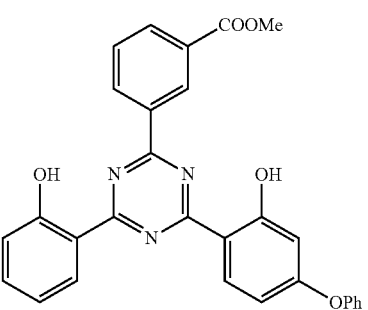
(m-53) 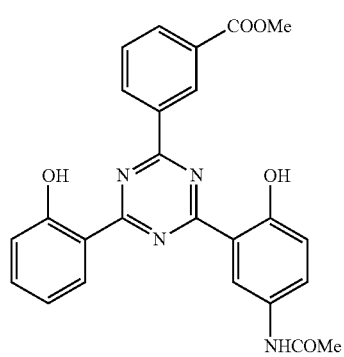
(m-54) 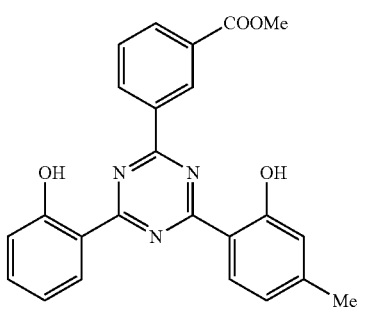
(m-55) 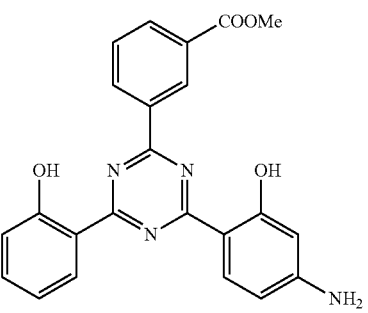
(m-56) 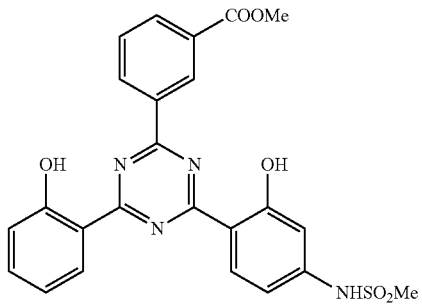

-continued
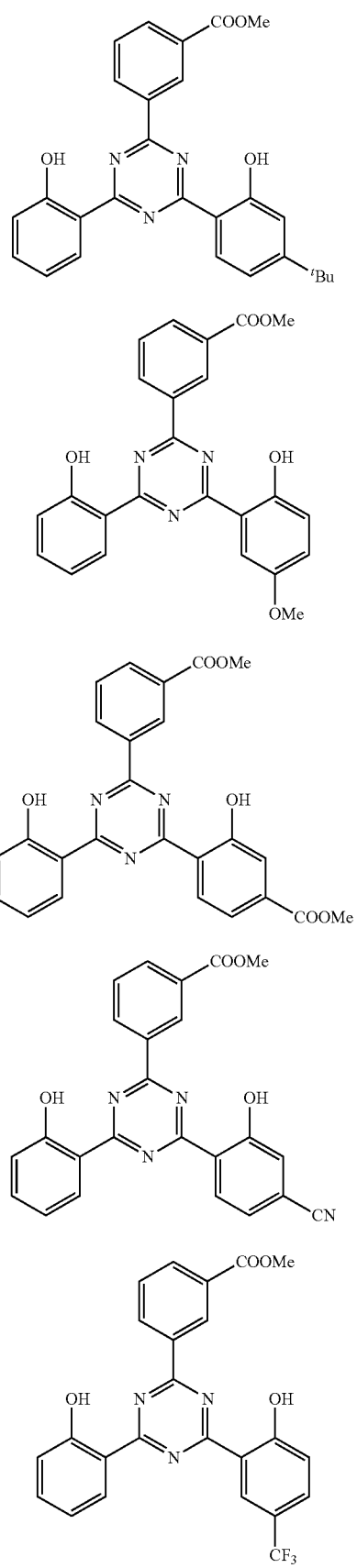
(m-57)
(m-58)
(m-59)
(m-60)
(m-61)
-continued
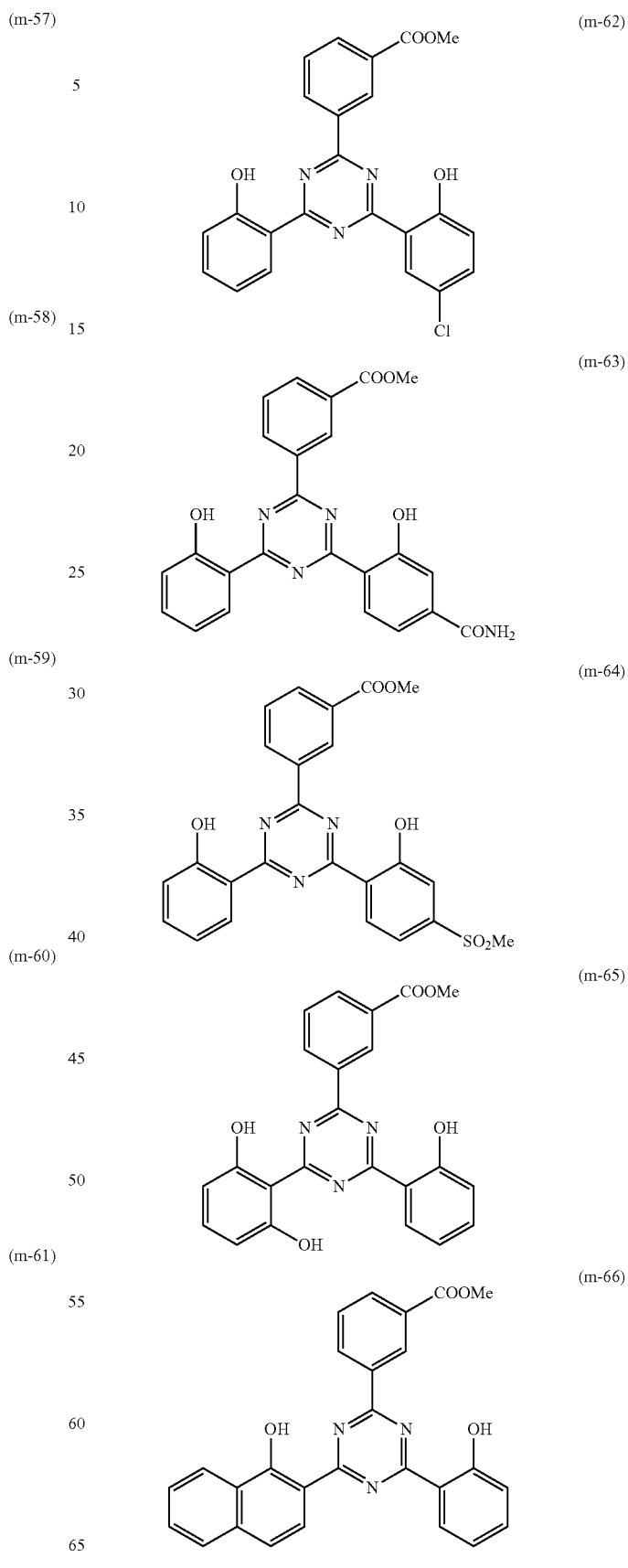
(m-62)
(m-63)
(m-64)
(m-65)
(m-66)

-continued

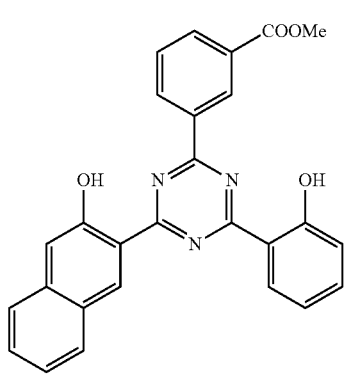
(m-67)

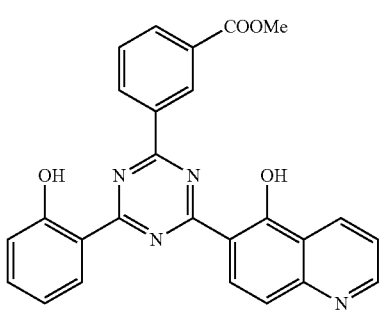
(m-68)

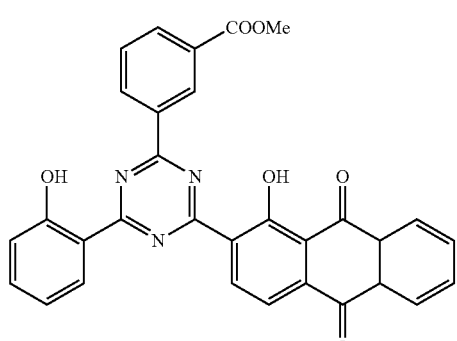
(m-69)

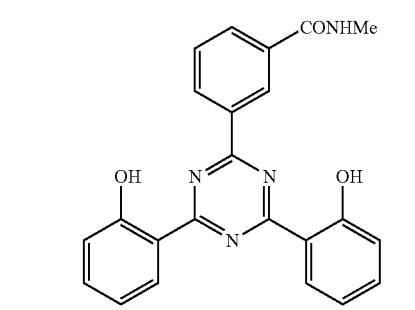
(m-70)

The compound represented by formula (1) may take a tautomer form depending on the structure and the environment. In the present invention, the compound is described by referring to one of representative forms, but a tautomer different from the compound described in the present invention is also included in the compound of the present invention.

The compound represented by formula (1) may contain an isotope (e.g., $^2$H, $^3$H, $^{13}$C, $^{15}$N, $^{17}$O, $^{18}$O).

The compound represented by formula (1) can be synthesized by an arbitrary method.

For example, the compound can be synthesized by referring to known patent documents or non-patent documents such as JP-A-7-188190, JP-A-11-315072, JP-A-2001-220385, and *Senryo to Yakuhin (Dyes and Chemicals)*, Vol. 40, No. 12, pp. 325-339 (1995). Specifically, Compound (16) can be synthesized by reacting salicylamide with 3,5-bis(trifluoromethyl)benzoyl chloride and 2-hydroxybenzamidine hydrochloride or by reacting salicylamide with salicylic acid and 3,5-bis(trifluoromethyl)benzamidine hydrochloride.

In the polycarbonate resin composition of the present invention, only one kind of the compound represented by formula (1) may be used, or two or more kinds thereof may be used in combination.

The compound above for use in the present invention is particularly suitable to stabilize an organic material against damages due to light/oxygen or heat. Above all, the compound represented by formula (1) can be suitably used as a light stabilizer, particularly as an ultraviolet absorber.

The compound represented by formula (1) contains a substituent having a Hammett's σp value of 0.3 or more at a specific position and therefore, LUMO is stabilized by an electron-withdrawing group, so that the compound can be characterized by short excitation life and excellent light resistance. Also, with respect to use as an ultraviolet absorber, in the case of using a known triazine-based compound, the compound decomposes in use for a long time and causes an adverse effect such as yellowing.

In contrast, the compound represented by formula (1) has excellent light resistance and therefore, produces an effect that even when used for a long time, the compound is not decomposed and causes no yellowing.

The maximum absorption wavelength of the compound represented by formula (1) is not particularly limited but is preferably from 250 to 400 mm, more preferably from 280 to 380 nm, and the half-value width is preferably from 20 to 100 nm, more preferably from 40 to 80 nm.

The maximum absorption wavelength and half-value width specified in the present invention can be easily measured by one skilled in the art. The measuring method is described, for example, in *Dai 4-han Jikken Kagaku Koza 7, Bunko II (4th ed., Experimental Chemistry Course 7, Spectroscopy II)*, pp. 180-186, edited by Chemical Society of Japan, Maruzen (1992). Specifically, these are determined by dissolving the sample in an appropriate solvent and measuring the spectrum in a spectrophotometer by using two quartz-made or glass-made cells, that is, one for the sample and another for control. It is required of the solvent used here to dissolve the sample, have no absorption in the measurement wavelength range, cause little interaction with the solute molecule, and be relatively low in the volatility. An arbitrary solvent may be used as long as the requirements above are satisfied. In the present invention, the measurement is performed using ethyl acetate (EtOAc) as the solvent.

The maximum absorption wavelength and the half-value width of the compound for use in the present invention are a value determined using a quartz cell having an optical path length of 10 mm after preparing a solution in a concentration of about $5 \times 10^{-5}$ mol·dm$^{-3}$ by using ethyl acetate as the solvent.

The spectral half-value width is described, for example, in *Dai 4-han Jikken Kagaku Koza 3, Kihon Sosa III (4th ed., Experimental Chemistry Course 3, Basic Operation III)*, page 154, edited by Chemical Society of Japan, Maruzen (1991). Incidentally, the half-vale width is described in the literature above by labeling the abscissa with a wavenumber scale, but the half-value width used in the present invention is a value when the axis is marked with a wavelength scale, and the unit of the half-width value width is am. Specifically, the half-value width indicates the width of the absorption band of ½ of the absorbance at the maximum absorption wavelength and is used as an indicator of the absorption spectral shape. A spectrum with a small half-value width is a sharp spectrum, and a spectrum with a large half-value width is a broad spectrum. The ultraviolet absorbing compound giving a broad spectrum has absorption also in a broad region on the longer wavelength side than the maximum absorption wavelength and therefore, in order to effectively block the light in the long-wavelength ultraviolet range with no yellow tinting, an ultraviolet absorbing compound giving a spectrum with a small half-value width is preferred.

As described in *Kagaku Seminar 9, Color Chemistry* (*Chemistry Seminar 9, Color Chemistry*), pp. 154-155, Maruzen (1982) written by Mr. Sumio Tokita, the absorption intensity of light, namely, the oscillator intensity, is proportional to the integral of the molar extinction coefficient and when the absorption spectrum has good symmetry, the oscillator intensity is proportional to the product of the absorbance at the maximum absorption wavelength and the half-value width (here, the half-value width is a value when the axis is marked with a wavelength scale). This indicates that as long as the value of transition moment is the same, a compound giving a spectrum with a small half-value width exhibits large absorbance at the maximum absorption wavelength. Use of such an ultraviolet absorbing compound is advantageous in that light in the region around the maximum absorption wavelength can be effectively blocked only by its use in a small amount, but absorbance at the wavelength a little distance away from the maximum absorption wavelength rapidly decreases, and this makes it impossible to block light over a wide region.

The molar extinction coefficient at the maximum absorption wavelength of the compound represented by formula (1) is preferably 20,000 or more, more preferably 30,000 or more, still more preferably 50,000 or more. With a molecular extinction coefficient of 20,000 or more, the absorption efficiency per mass of the compound represented by formula (I) is sufficiently high and the amount of the compound represented by formula (1) used for completely absorbing light in the ultraviolet region can be reduced. This is also preferred from the standpoint of preventing irritation to skin or accumulation in vivo and hardly causing bleed-out. Incidentally, the molar extinction coefficient used here is based on the definition described, for example, in *Shin-han Jikken Kagaku Koza 9, Bunseki Kagaku [II]* (*New Edition, Experimental Chemistry Course 9, Analytical Chemistry [II]*, page 244, edited by Chemical Society of Japan, Maruzen (1977) and can be determined together at the time of determining the above-described maximum absorption wavelength and half-value width.

The polycarbonate resin composition of the present invention can contain the compound represented by formula (1) in an arbitrary amount required to impart the desired performance. The amount varies depending on the compound or resin used, but an appropriate content can be determined. The content in the resin composition is preferably from more than 0 mass % to 20 mass %, more preferably from more than 0 mass % to 10 mass %, still more preferably from 0.05 to 5 mass %. The content in the range above is preferred because a sufficiently high effect of blocking ultraviolet light is obtained and the bleed-out can be suppressed.

The polycarbonate resin composition may contain, as the ultraviolet absorber, two or more kinds of the compound represented by formula (1) differing in the structure. Also, a compound represented by formula (1) and one or more kinds of ultraviolet absorbers having a structure other than the formula above may be used in combination. When two kinds (preferably three kinds) of ultraviolet absorbers differing in the basic framework structure are used, ultraviolet light in a wide wavelength region can be absorbed. Also, use of two or more kinds of ultraviolet absorbers produces an action of stabilizing the dispersion state of the ultraviolet absorbers. As for the ultraviolet absorber having a structure other than formula (I), any ultraviolet absorber may be used, and examples thereof include triazine-based, benzotriazole-based, benzophenone-based, merocyanine-based, cyanine-based, dibenzoylmethane-based, cinnamic acid-based, cyanoacrylate-based and benzoic ester-based compounds.

Other examples include the ultraviolet absorbers described in *Fine Chemical*, pp. 28-38 (May 2004), *Kobunshi-yo Kinousei Tenkabutsu no Shin Tenkai* (*New Development of Functional Additives for Polymers*), pp. 96-140, issued by Toray Research Center Inc., Technical Survey Dept. (Toray Research Center Inc., 1999), and Yasuichi Okatsu (supervisor), *Kobunshi Tenkazai no Kaihatsu to Kankyo Taisaku* (*Development of Polymer Additives and Environmental Measures*), pp. 54-64, CMC Publishing (2003).

The ultraviolet absorber having a structure other than formula (1) is preferably a benzotriazole-based compound, a benzophenone-based compound, a salicylic acid-based compound, a benzoxazinone-based compound, a cyanoacrylate-based compound, a benzoxazole-based compound, a merocyanine-based compound, or a triazine-based compound, more preferably a benzoxazinone-based compound, a benzotriazole-based compound, a benzophenone-based compound, or a triazine-based compound, still more preferably a benzoxazinone-based compound. The ultraviolet absorbers having a structure other than formula (1) are described in detail in Japanese Patent Application No. 2008-273950, paragraphs [0117] to [0121], and the materials described in this patent publication can be applied also in the present invention.

As described above, the polycarbonate resin composition of the present invention preferably contains a compound represented by formula (1) and a benzoxazinone-based compound in combination. The compound represented by formula (1) has excellent light resistance even in the long-wavelength region and therefore, produces an effect of preventing deterioration of benzoxazinone that can block the light to a longer wavelength region, and thanks to use together with a benzoxazinone-based compound, the blocking effect to a longer wavelength region can be advantageously maintained for a long period of time.

The polycarbonate resin composition of the present invention can practically exhibit a sufficient ultraviolet-blocking effect by using only the ultraviolet absorber represented by formula (1) but, if the requirement is more strict, a white pigment having a strong hiding power, such as titanium oxide, may be used in combination. Also, when the appearance or color tone becomes a problem or if desired, a slight amount (0.05 mass % or less) of a colorant may be used in combination. In applications where transparency or whiteness is important, a fluorescent brightener may be used in combination. Examples of the fluorescent brightener include commercial products and the compound of formula [1] and specific Compounds 1 to 35 described in JP-A-2002-53824.

The polycarbonate resin composition of the present invention contains a compound represented by formula (1) and therefore, can exhibit excellent light resistance (fastness to ultraviolet light) and be free from precipitation or bleed-out due to long-term use of the ultraviolet absorber.

The resin component such as polycarbonate resin contained in the polycarbonate resin composition of the present invention is described below.

The polycarbonate is a polymer compound being obtained, for example, by the transesterification of a di-substituted carbonate and a diol or the reaction of phosgene and a diol and containing a carbonate-type structure as a structural unit in the main chain. Examples of the polycarbonate include a linear polycarbonate, a branched polycarbonate, and a composite polymer containing a linear polycarbonate and a branched polycarbonate. The linear polycarbonate or branched polycarbonate can be obtained by copolymerizing a diol and a di-substituted carbonate or phosgene in the presence or absence of a branching agent by further using, if desired, a terminal stopper.

Examples of the diol include dihydroxydiarylalkanes such as bis(4-hydroxyphenyl)methane, bis(4-hydroxyphenyl)phenylmethane, bis(4-hydroxyphenyl)naphthylmethane, bis(4-hydroxyphenyl)-(4-isopropylphenyl)methane, bis(3,5-dichloro-4-hydroxyphenyl)methane, bis(3,5-dimethyl-4-hydroxyphenyl)methane, 1,1-bis(4-hydroxyphenyl)ethane, 2,2-bis(4-hydroxyphenyl)propane [alias: bisphenol A], 1-naphthyl-1,1-bis(4-hydroxyphenyl)ethane, 1-phenyl-1,1-bis(4-hydroxyphenyl)ethane, 1,2-bis(4-hydroxyphenyl)ethane, 2-methyl-1,1-bis(4-hydroxyphenyl)propane, 2,2-bis(3,5-dimethyl-4-hydroxyphenyl)propane, 1-ethyl-1,1-bis(4-hydroxyphenyl)propane, 2,2-bis(3,5-dichloro-4-hydroxyphenyl)propane, 2,2-bis(3,5-dibromo-4-hydroxyphenyl)propane, 2,2-bis(3-chloro-4-hydroxyphenyl)propane, 2,2-bis(3-methyl-4-hydroxyphenyl)propane, 2,2-bis(3-fluoro-4-hydroxyphenyl)propane, 1,1-bis(4-hydroxyphenyl)butane, 2,2-bis(4-hydroxyphenyl)butane, 1,4-bis(4-hydroxyphenyl)butane, 2,2-bis(4-hydroxyphenyl)pentane, 4-methyl-2,2-bis(4-hydroxyphenyl)pentane, 2,2-bis(4-hydroxyphenyl)hexane, 4,4-bis(4-hydroxyphenyl)heptane, 2,2-bis(4-hydroxyphenyl)nonane and 1,10-bis(4-hydroxyphenyl)decane; dihydroxydiarylcycloalkanes such as 1,1-bis(4-hydroxyphenyl)cyclohexane, 1,1-bis(3,5-dichloro-4-hydroxyphenyl)cyclohexane, 1,1-bis(4-hydroxyphenyl)-3,3,5-trimethylcyclohexane, 2,2-bis(4-hydroxyphenyl)-1,1,1,3,3,3-hexafluoropropane and 1,1-bis(4-hydroxyphenyl)cyclodecane; dihydroxydiarylsulfones such as bis(4-hydroxyphenyl)sulfone, bis(3,5-dimethyl-4-hydroxyphenyl)sulfone and bis(3-chloro-4-hydroxyphenyl)sulfone; dihydroxydiaryl ethers such as bis(4-hydroxyphenyl)ether and bis(3,5-dimethyl-4-hydroxyphenyl)ether; dihydroxydiaryl ketones such as 4,4'-dihydroxybenzophenone and 3,3',5,5'-tetramethyl-4,4'-dihydroxybenzophenone; dihydroxydiaryl sulfides such as bis(4-hydroxyphenyl)sulfide, bis(3-methyl-4-hydroxyphenyl)sulfide and bis(3,5-dimethyl-4-hydroxyphenyl)sulfide; dihydroxydiarylsulfoxides such as bis(4-hydroxyphenyl)sulfoxide; dihydroxydiphenyls such as 4,4'-dihydroxydiphenyl; and dihydroxyarylfluorenes such as 9,9-bis(4-hydroxyphenyl)fluorene. In addition to the above-described diols, ethylene glycol, 1,3-propanediol, 1,4-butanediol, 1,6-hexanediol, 1,4-cyclohexanediol, 4,4'-dihydroxyethoxyphenylmethane; dihydroxybenzenes such as hydroquinone, resorcinol and methylhydroquinone; or dihydroxynaphthalenes such as 1,5-dihydroxynaphthalene and 2,6-dihydroxynaphthalene, may also be contained. One of these diols and the like may be used, or two or more thereof may be used in combination. Among these, 2,2-bis(4-hydroxyphenyl)propane is representative.

Examples of the di-substituted carbonate compound include a diaryl carbonate such as diphenyl carbonate; and a dialkyl carbonate such as dimethyl carbonate and diethyl carbonate. One of these di-substituted carbonate compounds may be used alone, or two or more thereof may be used in combination.

The branching agent is not particularly limited, and a compound having three or more functional groups can be used. Specific examples of the branching agent include phloroglucine, mellitic acid, trimellitic acid, trimellitic acid chloride, trimellitic anhydride, protocatechuic acid, pyromellitic acid, pyromellitic dianhydride, α-resorcylic acid, β-resorcylic acid, resorcin aldehyde, trimethyl chloride, isatin-bis(o-cresol), trimethyl trichloride, 4-chloroformylphthalic anhydride, benzophenonetetracarboxylic acid, 2,4,4'-trihydroxybenzophenone, 2,2',4,4'-tetrahydroxybenzophenone, 2,4,4'-trihydroxyphenyl ether, 2,2',4,4'-tetrahydroxyphenyl ether, 2,4,4'-trihydroxydiphenyl-2-propane, 2,2'-bis(2,4-dihydroxy)propane, 2,2',4,4'-tetrahydroxydiphenylmethane, 2,4,4'-trihydroxydiphenylmethane, 1-[α-methyl-α-(4'-dihydroxyphenyl)ethyl]-3-[α',α'-bis(4''-hydroxyphenyl)ethyl]benzene, 1-[α-methyl-α-(4'-dihydroxyphenyl)ethyl]-4-[α',α'-bis(4''-hydroxyphenyl)ethyl]benzene, α,α',α''-tris(4-hydroxyphenyl)-1,3,5-triisopropylbenzene, 2,6-bis(2-hydroxy-5'-methylbenzyl)-4-methylphenol, 4,6-dimethyl-2,4,6-tris(4'-hydroxyphenyl)-2-heptene, 4,6-dimethyl-2,4,6-tris(4'-hydroxyphenyl)-2-heptane, 1,3,5-tris(4'-hydroxyphenyl)benzene, 1,1,1-tris(4-hydroxyphenyl)ethane, 2,2-bis[4,4-bis(4'-hydroxyphenyl)cyclohexyl]propane, 2,6-bis(2'-hydroxy-5'-isopropylbenzyl)-4-isopropylphenol, bis[2-hydroxy-3-(2'-hydroxy-5'-methylbenzyl)-5-methylphenyl]methane, bis[2-hydroxy-3-(2'-hydroxy-5'-isopropylbenzyl)-5-methylphenyl]methane, tetrakis(4-hydroxyphenyl)methane, tris(4-hydroxyphenyl)phenylmethane, 2',4',7-trihydroxyflavan, 2,4,4-trimethyl-2',4',7-trihydroxyflavan, 1,3-bis-(2',4'-dihydroxyphenylisopropyl)benzene and tris(4'-hydroxyphenyl)-amyl-s-triazine. One of these branching agents may be used alone, or two or more thereof may be used in combination.

As for the terminal stopper, a monovalent phenol can be used, and the structure thereof is not particularly limited. Examples of the monovalent phenol include p-tert-butylphenol, p-tert-octylphenol, p-cumylphenol, p-tert-amylphenol, p-nonylphenol, p-cresol, 2,4,6-tribromophenol, p-bromophenol, 4-hydroxybenzophenone and phenol. One of these terminal stoppers may be used alone, or two or more thereof may be used in combination.

As for the polymerization method, an interface method or a transesterification method is used. For example, in the case of polymerizing a diol and phosgene by the interface method, a branching agent or a terminal stopper may be reacted in the presence of phosgene, or after obtaining a polycarbonate oligomer by the reaction of a diol and phosgene, a branching agent or a terminal stopper may be reacted therewith in the absence of phosgene. Also, in the case of the transesterification method, a branching agent or a terminal stopper is added in the transesterification reaction of a diol and a di-substituted carbonate compound, whereby a branched polycarbonate resin can be obtained.

The linear polycarbonate is usually obtained by polymerizing a diol and phosgene or a di-substituted carbonate compound, if desired, in the presence of a terminal stopper. That is, the process is the same as that for the branched polycarbonate resin except for using no branching agent.

Among the polycarbonates obtained by polymerizing a diol and phosgene or a di-substituted carbonate compound, in view of balance between the mechanical strength and the shapability, a polycarbonate obtained by reacting 2,2-bis(4-hydroxyphenyl)propane and diphenyl carbonate, a polycarbonate obtained by reacting 2,2-bis(4-hydroxyphenyl)propane and dimethyl carbonate, a polycarbonate obtained by reacting 2,2-bis(4-hydroxyphenyl)propane and diethyl carbonate, a polycarbonate obtained by reacting bis(4-hydroxyphenyl)methane and diphenyl carbonate, and a polycarbonate obtained by reacting bis(4-hydroxyphenyl)phenylmethane and diphenyl carbonate are preferred.

Furthermore, in the present invention, a polycarbonate-polyorganosiloxane copolymer containing a polycarbonate structural unit and a polyorganosiloxane structural unit may be used as the polycarbonate. Also, an aromatic or aliphatic dibasic acid such as terephthalic acid, isophthalic acid, pimelic acid, suberic acid, azelaic acid, sebacic acid, decanedicarboxylic acid and adipic acid, or an ester thereof, which are an acid component, may be contained as a copolymerization component. In this case, a carboxylic acid ester structure is introduced into a part of the main chain in addition to a carbonate-type structure.

In the present invention, one kind of polycarbonate obtained using the above-described diol and di-substituted carbonate or phosgene or, if desired, further using other components may be used, or two or more kinds thereof may be used in combination.

The viscosity average molecular weight of the polycarbonate is preferably from 10,000 to 50,000, more preferably from 13,000 to 40,000. With a viscosity average molecular weight in this range, a tough molded article is obtained and a high molding temperature is not required. The viscosity average molecular weight of the polycarbonate can be determined by the conversion from the specific viscosity at 20° C. of a solution obtained by dissolving the polycarbonate resin in methylene chloride.

In the polycarbonate resin composition of the present invention, the content ratio of the compound represented by formula (1) is preferably from 0.05 to 3 parts by mass, more preferably from 0.05 to 1 part by mass, per 100 parts by mass of the polycarbonate.

The polycarbonate resin composition of the present invention may contain other resin components in combination with the polycarbonate resin. The resin component which can be used in combination may be either a natural polymer or a synthetic polymer. Examples thereof include a polyolefin (e.g., polyethylene, polypropylene, polyisobutylene, poly(1-butene), poly-4-methylpentene, polyvinylcyclohexane, polystyrene, poly(p-methylstyrene), poly(α-methylstyrene), polyisoprene, polybutadiene, polycyclopentene, polynorbornene), a copolymer of vinyl monomer (e.g., ethylene/propylene copolymer, ethylene/methylpentene copolymer, ethylene/heptene copolymer, ethylene/vinylcyclohexane copolymer, ethylene/cycloolefin copolymer (for example, a cycloolefin copolymer (COC: Cyclo-Olefin Copolymer) such as ethylene/norbornene), propylene/butadiene copolymer, isobutylene/isoprene copolymer, ethylene/vinylcyclohexene copolymer, ethylene/alkyl acrylate copolymer, ethylene/alkyl methacrylate copolymer), an acrylic polymer (e.g., polymethacrylate, polyacrylate, polyacrylamide, polyacrylonitrile), a polyvinyl chloride, a polyvinylidene chloride, a polyvinyl fluoride, a polyvinylidene fluoride, a vinyl chloride/vinyl acetate copolymer, a polyether (e.g., polyalkylene glycol, polyethylene oxide, polypropylene oxide), a polyacetal (e.g., polyoxymethylene), a polyamide, a polyimide, a polyurethane, a polyurea, a polyester (e.g., polyethylene terephthalate, polyethylene naphthalate), a polyketone, a polysulfone polyether ketone, a phenol resin, a melamine resin, a cellulose ester (e.g., diacetylcellulose, triacetylcellulose (TAC), propionylcellulose, butyrylcellulose, acetylpropionylcellulose, nitrocellulose), a polysiloxane, and a natural polymer (e.g., cellulose, rubber, gelatin).

The resin component which can be used in combination is preferably a synthetic polymer, more preferably a polyolefin, an acrylic polymer, a polyester or a cellulose ester, still more preferably polyethylene, polypropylene, poly(4-methylpentene), polymethyl methacrylate, polyethylene terephthalate, polyethylene naphthalate, polybutylene terephthalate or triacetylcellulose. The resin component which can be used in combination is preferably a thermoplastic resin.

The polycarbonate resin composition of the present invention may appropriately contain, if desired, an arbitrary additive such as antioxidant, light stabilizer, process stabilizer, anti-aging agent and compatibilizer.

The polycarbonate resin composition of the present invention preferably further contains a phosphorus-based stabilizer as the antioxidant, because thermal stability can be improved. Examples of the phosphorus-based stabilizer include phosphorous acid, phosphoric acid, a phosphorous acid ester and a phosphoric acid ester. Among these, in terms of containing a trivalent phosphorus and readily exerting a discoloration-preventing effect, a phosphoric acid-based stabilizer is preferred, and a phosphorous acid ester such as phosphite and phosphonite is preferred.

Examples of the phosphite include triphenyl phosphite, tris(nonylphenyl)phosphite, dilauryl hydrogenphosphite, triethyl phosphite, tridecyl phosphite, tris(2-ethylhexyl)phosphite, tris(tridecyl)phosphite, tristearyl phosphite, diphenyl monodecyl phosphite, monophenyl didecyl phosphite, diphenyl mono(tridecyl)phosphite, tetraphenyl dipropylene glycol diphosphite, tetraphenyl tetra(tridecyl)pentaerythritol tetraphosphite, hydrogenated bisphenol A phenol phosphite polymer, diphenyl hydrogenphosphite, 4,4'-butylidene-bis(3-methyl-6-tert-butylphenyldi(tridecyl)phosphite, tetra(tridecyl)-4,4'-isopropylidene diphenyl diphosphite, bis(tridecyl) pentaerythritol diphosphite, bis(nonylphenyl)pentaerythritol diphosphite, dilauryl pentaerythritol diphosphite, distearyl pentaerythritol diphosphite, tris(4-tert-butylphenyl)phosphite, tris(2,4-di-tert-butylphenyl)phosphite, a hydrogenated bisphenol A pentaerythritol phosphite polymer, bis(2,4-di-tert-butylphenyl)pentaerythritol diphosphite, bis(2,6-di-tert-butyl-4-methylphenyl)pentaerythritol diphosphite, 2,2'-methylenebis(4,6-di-tert-butylphenyl)octylphosphite and bis(2,4-dicumylphenyl)pentaerythritol diphosphite.

Moreover, examples of the phosphonite include tetrakis(2,4-di-isopropylphenyl)-4,4'-biphenylene diphosphonite, tetrakis(2,4-di-n-butylphenyl)-4,4'-biphenylene diphosphonite, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-isopropylphenyl)-4,4'-biphenylene diphosphonite, tetrakis(2,6-di-n-butylphenyl)-4,4'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, and tetrakis(2,6-di-tert-butylphenyl)-3,3'-biphenylene diphosphonite.

Moreover, examples of the acid phosphate include methyl acid phosphate, ethyl acid phosphate, propyl acid phosphate, isopropyl acid phosphate, butyl acid phosphate, butoxyethyl acid phosphate, octyl acid phosphate, 2-ethylhexyl acid phosphate, decyl acid phosphate, lauryl acid phosphate, stearyl acid phosphate, oleyl acid phosphate, behenyl acid phosphate, phenyl acid phosphate, nonylphenyl acid phosphate, cyclohexyl acid phosphate, phenoxyethyl acid phosphate, alkoxypolyethylene glycol acid phosphate, bisphenol A acid phosphate, dimethyl acid phosphate, diethyl acid phosphate, dipropyl acid phosphate, diisopropyl acid phosphate, dibutyl acid phosphate, dioctyl acid phosphate, di-2-ethylhexyl acid phosphate, dioctyl acid phosphate, dilauryl acid phosphate, distearyl acid phosphate, diphenyl acid phosphate, and bis-nonylphenyl acid phosphate.

The phosphorus-based stabilizer for use in the present invention may be contained by mixing two or more kinds thereof, but the total content ratio of phosphorus-based stabilizers is preferably from 0.0005 to 0.3 parts by mass, more preferably from 0.001 to 0.1 parts by mass, per 100 parts by mass of the polycarbonate resin composition. Within this range, the stabilizer exerts a sufficient effect, and reduction in the molecular weight or deterioration of the color hue is hardly caused during shaping.

In the present invention, it is particularly preferred that the compound represented by formula (1) accounts for 0.05 to 3 parts by mass and the phosphorus-based stabilizer accounts for 0.0005 to 0.3 parts by mass, per 100 parts by mass of the polycarbonate resin composition.

The polycarbonate resin composition of the present invention preferably further contains a hindered phenol-based stabilizer as the antioxidant, because the compound represented by formula (1) can be stabilized and in turn, the light stability of the polycarbonate resin composition is increased.

Examples of the hindered phenol-based stabilizer include a compound having at least one substituent (for example, an alkyl group, an alkenyl group, an alkynyl group, an aryl group, a heterocyclic group, an alkoxy group, an aryloxy group or a substituted amino group) except for hydrogen atom, at the ortho-position of a phenolic hydroxyl group.

The hindered phenol-based stabilizer may be a compound known as an antioxidant and available on the market, and examples thereof include 2,6-di-tert-butyl-4-methylphenol and the antioxidants produced by Ciba Specialty Chemicals.

The hindered phenol-based stabilizers for use in the present invention may be contained by mixing two or more kinds thereof, but the total content ratio of hindered phenol-based stabilizers is preferably from 0.0001 to 1 part by mass, more preferably from 0.001 to 0.1 parts by mass, per 100 parts by mass of the polycarbonate resin composition.

The method for mixing the compound represented by formula (1) and the resin component such as polycarbonate to prepare the polycarbonate resin composition of the present invention is not particularly limited.

In the case where the compound represented by formula (1) has compatibility with the resin component such as polycarbonate, the compound represented by formula (1) can be directly added to the resin component such as polycarbonate. Other examples include a method of melt-kneading the mixture by a melt-kneader as represented by vented twin-screw extruder and pelletizing it by a device such as pelletizer.

The compound represented by formula (1) may be dissolved in an auxiliary solvent having compatibility with the resin component such as polycarbonate, and the solution may be added to the resin component such as polycarbonate. Also, the compound represented by formula (1) may be dispersed in a high boiling-point organic solvent or a polymer, and the dispersion may be added to the resin component such as polycarbonate.

The timing for the addition and mixing may be before or after the resin component such as polycarbonate is formed by polymerization.

The polycarbonate resin composition of the present invention may be a composition formed by dissolving the polycarbonate resin in an arbitrary solvent.

Examples of the high boiling-point organic solvent include a phosphoric acid ester, a phosphonic acid ester, a benzoic acid ester, a phthalic acid ester, a fatty acid ester, a carbonate, an amide, an ether, a halogenated hydrocarbon, an alcohol and a paraffin. Among these, a phosphoric acid ester, a phosphonic acid ester, a phthalic acid ester, a benzoic acid ester and a fatty acid ester are preferred.

As for the method to prepare the polycarbonate resin composition of the present invention, JP-A-58-209735, JP-A-63-264748, JP-A-4-191851, JP-A-8-272058, and British Patent 2016017A can be referred to.

The polycarbonate resin composition of the present invention is usable in all applications using a synthetic resin but is suitably usable in particular for the application that is likely to be exposed to sunlight or ultraviolet ray-containing light. Specific examples thereof include a glass alternative and a surface-coating material therefor; a coating material for window glass, lighting glass and light source-protecting glass in house, facility, transport vehicle and the like; a window member such as window film for house, facility, transport vehicle and the like; an interior or exterior material and an interior or exterior paint for house, facility, transport vehicle and the like, and a coating formed by the paint; an alkyd resin lacquer paint and a coating formed by the paint; an acrylic lacquer paint and a coating formed by the paint; a member for ultraviolet-emitting light sources such as fluorescent lamp and mercury lamp; a material for precision machines and electric/electronic devices; a material for blocking electromagnetic and other waves emitted from various displays; a container or packaging material for food, chemicals, drugs and the like; a sheet or film material for special packages such as bottle, box, blister and cup or for compact disk coat and agricultural/industrial usage; a discoloration inhibitor for printed matter, dyed matter, dye/pigment and the like; a protective film for polymer supports (such as plastic-made components, e.g., mechanical or automotive component); an overcoat for printed matters; an inkjet medium coat; a laminate with matte finish; an optical light film; a safety glass/front glass intermediate layer; an electrochromic/photochromic application; an over-lamination film; a solar heat-controlling film; a cosmetic material such as anti-sunburn cream, shampoo, rinse and hair dressing; an apparel fiber product and the fiber, such as sport wear, stockings and cap; a home interior product such as curtain, carpet and wall paper; a medical device such as plastic lens, contact lens and artificial eye; an optical material such as optical filter, backlight display film, prism, mirror and photographic material; a mold film; a transfer-type sticker; an anti-graffiti film; a stationery product such as tape and ink; and an indicator board or device and the surface-coating material therefor.

The molded article of the present invention is described below.

The molded article of the present invention can be formed from the polycarbonate resin composition of the present invention.

The shape of the molded article of the present invention formed from the above-described polycarbonate resin composition may be any form of flat film, powder, spherical particle, crushed particle, continuous block, fiber, tube, hollow yarn, granule, plate and porous solid.

The polycarbonate resin composition of the present invention contains a polycarbonate resin and therefore, can be transparent and in this case, the composition can be shaped as an ultraviolet absorbing filter or an ultraviolet absorbing film.

At this time, the polycarbonate resin composition of the present invention may contain other transparent resins. Examples of the other transparent resin include a cellulose ester (e.g., diacetylcellulose, triacetylcellulose (TAC), propionylcellulose, butyrylcellulose, acetylpropionylcellulose, nitrocellulose), a polyamide, a polyester (e.g., polyethylene terephthalate, polyethylene naphthalate, polybutylene terephthalate, poly-1,4-cyclohexanedimethylene terephthalate, polyethylene-1,2-diphenoxyethane-4,4'-dicarboxylate, polybutylene terephthalate), a polystyrene (e.g., syndiotactic polystyrene), a polyolefin (e.g., polyethylene, polypropylene, polymethylpentene), a polymethyl methacrylate, a syndiotactic polystyrene, a polysulfone, a polyethersulfone, a polyether ketone, a polyetherimide, and a polyoxyethylene.

The molded article of the present invention obtained from the above-described polycarbonate resin composition can be used as a transparent support, and the transmittance of the transparent support is preferably 80% or more, more preferably 86% or more.

The molded article of the present invention is formed by shaping the polycarbonate resin composition and has an excellent long-wavelength ultraviolet absorbing ability, so that the molded article can be used as an ultraviolet absorbing filter or container or can protect a compound sensitive to ultraviolet ray. For example, the molded article of the present invention can be obtained as a container or the like by shaping the polycarbonate resin composition by an arbitrary method such as extrusion molding or injection molding. Also, a solution of the polycarbonate resin composition of the present invention can be coated on a separately produced molded article and dried to obtain a molded article coated with an ultraviolet absorbing film composed of the polycarbonate resin composition.

In the present invention, the matters described in JP-A-2009-209343, paragraphs [0192] to [0230] can be applied.

The packaging material containing the ultraviolet absorber of the present invention is described below. The packaging material containing the polycarbonate resin composition of the present invention may be a packaging material composed of any kind of polymer as long as it contains the polycarbonate resin composition. Examples thereof include a thermoplastic resin, a polyvinyl alcohol, a polyvinyl chloride, a styrene-based resin, a polyolefin and ROMP. For example, the packaging material may be a resin having a thin film layer formed by deposition of an inorganic material. Also, for example, the packaging material may be paper coated with a resin containing the polycarbonate resin composition.

The packaging material containing the polycarbonate resin composition of the present invention may package any of food, beverages, medicine, cosmetics, individual care products and the like. Examples thereof include food packaging, colored liquid packaging, liquid preparation packaging, medicine container packaging, medical sterilization packaging, photographic light-sensitive material packaging, photographic film packaging, ultraviolet curable ink packaging, and shrink label.

The packaging material containing the polycarbonate resin composition of the present invention may be a transparent package or a light-blocking package.

The packaging material containing the polycarbonate resin composition of the present invention may have not only ultraviolet light-blocking property but also other performances. Examples thereof include those having also a gas barrier property, those containing an oxygen indicator, and those using the polycarbonate resin composition and a fluorescent brightener in combination.

The packaging material containing the polycarbonate resin composition of the present invention may be produced using any method. Examples of the method include a method of forming an ink layer, a method of melt-extruding and stacking a resin containing the polycarbonate resin composition, a method of coating the composition on a base film, and a method of dispersing the polycarbonate resin composition in an adhesive.

The container containing the polycarbonate resin composition of the present invention is described below. The container containing the polycarbonate resin composition of the present invention may be a container composed of any kind of polymer as long as it contains the polycarbonate resin composition. Examples thereof include a thermoplastic resin container, a polyester-made container, a polyethylene naphthalate-made container, a polyethylene-made container, a cyclic olefin-based resin composition-made container, a plastic container, and a transparent polyamide container. For example, the container may be a paper container containing a resin or may be a glass container having a polyester resin layer.

As for the usage of the container containing the polycarbonate resin composition of the present invention, the container may enclose any of food, beverages, medicine, cosmetics, individual care products, shampoos and the like. Examples thereof include a liquid fuel-storing container, a golf ball container, a food container, a liquor container, a medicine-filling container, a beverage container, an oily food container, an analytical reagent solution container, an instant noodle container, a light-resistant cosmetic material container, a medical product container, a high-purity chemical solution container, a liquid medicine container, an ultraviolet curable ink container, and a W plastic ampoule.

The container containing the polycarbonate resin composition of the present invention may have not only ultraviolet-blocking property but also other performances. Examples thereof include an antimicrobial container, a flexible container, a dispenser container, and a biodegradable container.

The container containing the polycarbonate resin composition of the present invention may be produced using any method. Examples thereof include a two-layer stretching blow-molding method, a multilayer co-extrusion blow-molding method, a method of forming an ultraviolet-absorbing layer on the external surface of a container, a method using a shrinkable film, and a method using a supercritical fluid.

The coating material and the coating film each containing the polycarbonate resin composition of the present invention are described below. The coating material containing the polycarbonate resin composition of the present invention may be a coating material composed of any components as long as it contains the compound represented by formula (1). Examples thereof include acrylic resin-based, urethane resin-based, aminoalkyd resin-based, epoxy resin-based, silicone resin-based and fluororesin-based coating materials. Such a resin can be arbitrarily blended with a base compound, a curing agent, a diluent, a leveling agent, an anti-shedding agent and the like.

For example, in the case where an acrylic urethane resin or a silicon acrylic resin is selected as the transparent resin component, polyisocyanate and the like can be used as the curing agent, and a hydrocarbon-based solvent such as toluene and xylene, an ester-based solvent such as isobutyl acetate, butyl acetate and amyl acetate, or an alcohol-based solvent such as isopropyl alcohol and butyl alcohol, can be used as the diluent. The acrylic urethane resin as used herein indicates an acrylic urethane resin obtained by reacting a methacrylic acid ester (typically, methyl)/hydroxyethyl methacrylate copolymer and a polyisocyanate. In this case, examples of the polyisocyanate include tolylene diisocyanate, diphenylmethane diisocyanate, polymethylene polyphenylene polyisocyanate, tolidine diisocyanate, naphthalene diisocyanate, hexamethylene diisocyanate, isophorone diisocyanate, xylylene diisocyanate, dicyclohexylmethane diisocyanate, and hexamethylene diisocyanate. Other examples of the transparent resin component include polymethyl methacrylate, polymethyl methacrylate/styrene copolymer, polyvinyl chloride, and polyvinyl acetate. In addition to these components, for example, a leveling agent such as acrylic resin and silicone resin, and an anti-shedding agent including silicone-based and acrylic anti-shedding agents may be blended, if desired.

As for the intended usage, the coating material containing the polycarbonate resin composition of the present invention may be used in any application. Examples thereof include an ultraviolet-blocking paint, an ultraviolet/near infrared-blocking paint, an electromagnetic wave-blocking paint, a clear paint, a metallic paint composition, a cationic electrodeposition paint, an antimicrobial and lead-free cationic electrodeposition paint, a powder paint, an aqueous middle coat paint, an aqueous metallic paint, an aqueous clear paint, a topcoat paint for automobiles, architectures or civil works, a curable paint, a coat-forming composition used for plastic materials such as automobile bumper, a paint for metal plates, a cured gradient coating, a paint material for electric wires, a vehicle refinishing paint, an anionic electrodeposition paint, an automotive paint, a paint for coated steel plates, a paint for stainless steels, an insecticidal paint for lamps, an ultraviolet curable paint, an antimicrobial paint, an eyestrain protection paint, an antifogging paint, an ultra-weather-resistant paint, a gradient paint, a photocatalyst paint, a strippable paint, a concrete separation paint, an anticorrosion paint, a protective paint, a water-repellent protective paint, a paint for preventing sheet glass scattering, an alkali-soluble protective paint, an aqueous temporary protective paint composition, a floor paint, an emulsion paint, a two-liquid aqueous paint, a one-liquid paint, a UV-curable paint, an electron beam-curable paint composition, a thermosetting paint composition, an aqueous paints for baking lacquers, a powder paint, a slurry paint, a repair paint, a water dispersion of powder paint, a paint for plastics, and an electron beam-curable paint.

The coating material containing the polycarbonate resin composition of the present invention is generally composed of a coating material (containing a transparent resin component as the main component) and the polycarbonate resin composition and is preferably a composition containing the polycarbonate resin composition in a ratio of 0 to 20 mass %. In applying the coating material, the thickness is preferably from 2 to 1,000 μm, more preferably from 5 to 200 μm. The coating material may be applied by an arbitrary method, but examples of the method include a spray method, a dipping method, a roller coating method, a flow coater method and a flow coating method. The drying after coating is preferably performed at a temperature of generally from room temperature to 120° C. for approximately from 10 to 90 minutes, though these conditions may vary according to the components of the coating material.

The coating film containing the polycarbonate resin composition of the present invention is a coating film containing the polycarbonate resin composition composed of a compound represented by formula (1), and this is a coating film formed using a coating material containing the polycarbonate resin composition of the present invention.

The ink containing the polycarbonate resin composition of the present invention is described below. The ink containing the polycarbonate resin composition of the present invention may be an ink in any form as long as it contains the polycarbonate resin composition above. Examples thereof include a dye ink, a pigment ink, an aqueous ink and an oil-based ink. Also, the ink may be used in any application. Examples of the application include a screen printing ink, a flexographic printing ink, a gravure printing ink, a lithographic offset printing ink, a letterpress printing ink, a UV ink, and an EB ink, Other examples thereof include an inkjet ink, a photochromic ink, a thermal transfer ink, a masking ink, a security ink, and a DNA ink.

Also, any embodiment obtained using the ink containing the polycarbonate resin composition of the present invention is included in the present invention. Examples thereof include a printed matter, a laminate obtained by laminating the printed matter, a packaging material or container using the laminate, and an ink receiving layer.

The fiber containing the polycarbonate resin composition of the present invention is described below. The fiber containing the polycarbonate resin composition of the present invention may be a fiber containing any kind of polymer as long as it contains the polycarbonate resin composition. Examples thereof include a polyester fiber, a polyphenylene sulfide fiber, a polyamide fiber, an aramid fiber, a polyurethane fiber, and a cellulose fiber.

The fiber containing the polycarbonate resin composition of the present invention may be produced by any method. For example, a polymer previously containing a compound represented by formula (1) may be processed into a fiber shape, or a fiber obtained by processing the above-described polycarbonate resin may be treated with a solution containing a compound represented by formula (1). Also, the treatment may be performed using a supercritical fluid.

The fiber containing the polycarbonate resin composition of the present invention can be used in various applications. Examples thereof include clothing, backing cloth, underwear, blanket, socks, artificial leather, insecticidal mesh sheet, architectural mesh sheet, carpet, moisture-permeable waterproof sheet, nonwoven fabric, ultrafine fiber, fiber-made sheet material, refreshing clothing moisture-permeable waterproof sheet, flame-retardant synthetic suede-like structure, resin tarpaulin, film agent, external wall material, agricultural greenhouse, net or mesh for building material, filter backing, antifouling film agent, mesh fabric, land net, underwater net, ultrafine fiber, textile fiber, air-bag base cloth, and ultraviolet-absorbing fiber product.

The architectural material containing the polycarbonate resin composition of the present invention is described below. The architectural material containing the polycarbonate resin composition of the present invention may be an architectural material containing any kind of polymer as long as it contains the above-described polycarbonate resin composition. Examples thereof include a vinyl chloride-based material, an olefin-based material, a polyester-based material, a polyphenylene ether-based material, and a polycarbonate-based material.

The architectural material containing the polycarbonate resin composition of the present invention may be produced by any method. For example, a material containing the polycarbonate resin composition may be formed into a desired shape; a laminate may be formed by stacking a material containing the polycarbonate resin composition; a coated layer using a compound represented by formula (1) may be formed; or a material applied with a coating material containing the polycarbonate resin composition may be formed.

The architectural material containing the polycarbonate resin composition of the present invention can be used in various applications. Examples thereof an exterior architectural material, an architectural wood structure, an architectural roofing material, an antimicrobial architectural material, an architectural base material, an antifouling architectural material, a flame-retardant material, a ceramic architectural material, a decorative architectural material, an architectural painted article, a cosmetic material, an architectural material net, an architectural moisture-permeable waterproof sheet, an architectural mesh sheet, an architectural film, a decorative film, an architectural coating material, an architectural adhesive composition, a civil engineering construction structure, a walking path coating material, a sheet-like photocurable resin, a wood-protecting paint, a push-switch cover, a bond-sheeting agent, an architectural backing, a wall paper, a decorative polyester film, a decorative polyester film for molded members, and a floor material The recording medium containing the polycarbonate resin composition of the present invention is described below. The recording medium containing the polycarbonate resin composition of the present invention may be any recording medium as long as it contains a compound represented by formula (1). Examples thereof include an inkjet recording medium, a sublimation transfer image-receiving sheet, an image-recording medium, a heat-sensitive recording medium, a reversible heat-sensitive recording medium, and an optical information recording medium.

The image display device containing the polycarbonate resin composition of the present invention is described below. The image display device containing the polycarbonate resin composition of the present invention may be any device as long as it contains the compound represented by formula (1). Examples thereof include an image display device using an electrochromic element, a so-called electronic paper image display device, a plasma display, and an image display device using an organic EL element. The polycarbonate resin composition of the present invention may be used for forming an ultraviolet-absorbing layer in a laminate structure, or the polycarbonate resin composition may be contained in a necessary member such as circularly polarizing plate.

The solar cell cover containing the polycarbonate resin composition of the present invention is described below. The solar cell for use in the present invention may be a solar cell composed of an element in any form, such as crystalline silicon solar cell, amorphous silicon solar cell and dye-sensitized solar cell. In a crystalline silicon solar cell or an amorphous silicon solar cell, a cover material is used as a protective member for imparting antifouling property, impact resistance and durability. As for a dye-sensitized solar cell, a metal oxide-based semiconductor capable of becoming active upon excitation by light (in particular, ultraviolet light) is used as the electrode material, which gives rise to a problem that the dye adsorbed as a photosensitizer is deteriorated and the solar power efficiency is gradually reduced, and it is proposed to provide an ultraviolet-absorbing layer.

The solar cell cover containing the polycarbonate resin composition of the present invention may be a cover containing any kind of polymer. Examples of the polymer include a polyester, a thermosetting transparent resin, an α-olefin polymer, a polypropylene, a polyether sulfone, an acrylic resin, and a transparent fluororesin.

The solar cell cover containing the polycarbonate resin composition of the present invention may be produced by any method. For example, an ultraviolet-absorbing layer may be formed; layers each containing the polycarbonate resin composition may be stacked; the polycarbonate resin composition may be contained in a filler layer resin; or a film may be formed from a polymer containing the polycarbonate resin composition.

The solar cell cover containing the polycarbonate resin composition of the present invention may be in any form. Examples thereof include a film, a sheet, a laminate film, and a cover glass structure. The polycarbonate resin composition may be contained in a sealer.

The glass or glass coat containing the polycarbonate resin composition of the present invention is described below. The glass or glass coat containing the polycarbonate resin composition of the present invention may be in any form as long as it contains the compound represented by formula (1). Also, the glass or glass coat may be used for any application.

Examples thereof include a heat ray-blocking glass, a window glass, a colored glass, an ultraviolet sharp-cut glass for high-intensity light sources such as mercury lamp and metal halide lamp, a frit glass, an ultraviolet-blocking glass for vehicles, a colored heat ray-absorbing glass, a fluorescent brightening agent-containing ultraviolet-absorbing insulated glass, an ultraviolet/heat ray-blocking glass for automobiles, an exterior stained glass, a water-repellent ultraviolet/infrared ray-absorbing glass, a glass for head-up display device of vehicles, a dimming heat barrier multilayer window, an ultraviolet/infrared cut glass, an ultraviolet cut glass, an ultraviolet/infrared-absorbing window glass, an ultraviolet-blocking antifouling window film, a translucent panel for cultivation house, an ultraviolet/infrared-absorbing low-transmission glass, a low-reflectance low-transmittance glass, an edge light apparatus, a rough surface-forming sheet glass, a laminated display glass, an electrically conductive film-attached glass, an antiglare glass, an ultraviolet/infrared-absorbing middle-transmission glass, a privacy-protection window glass for vehicles, an antifogging glass for vehicles, a glass for paving materials, a water droplet adhesion-preventing and heat ray-blocking glass plate, an ultraviolet/infrared-absorbing bronze glass, a laminated glass, a glass with ID identification function, a PDP optical filter, and a skylight window. The glass containing the polycarbonate resin composition of the present invention may be produced by any method.

Other usage examples include an illuminating device light source cover, an artificial leather, a sport goggle, a deflection lens, a hardcoat for various plastic products, a hardcoat for lamination to the exterior surface of window, a window film, a high-definition antiglare hardcoat film, an antistatic hardcoat film, a permeable hardcoat film, an anti-forgery paper described in JP-A-2002-113937, a purple blotch-preventing agent for lawn, a sealant for resin film sheet bonding, a light guiding element, a rubber coating agent, an agricultural covering material, a color candle, a cloth-rinsing agent composition, a prism sheet, a protective layer transfer sheet, a photocurable resin product, a floor sheet, a light-blocking printed label, an fuel cup, a hardcoat film-coated article, an intermediate transfer recording medium, an artificial hair, a low-temperature heat-shrinkable film for label, a fishing article, a microbead, a pre-coated metal plate, a thin film, a heat-shrinkable film, an in-mold molding label, a projection screen, a decorative sheet, a hot-melt adhesive, an adhesive, an electrodeposited coat, a basecoat, a wood surface protection, a light control material, light control film, a light control glass, a moth repellent lamp, a touch panel, a sealant for resin film sheet bonding, a polycarbonate film coating, an optical fiber tape, and a solid wax.

The method for evaluating the light resistance of the polymer material is described below. The method for evaluating the light resistance of the polymer material can be referred to, for example, *Kobunshi no Hikari Anteika Gijutsu* (*Technique for Photostabilizing Polymers*), pp. 85-107, CMC Publishing (2000), *Koseino Toryo no Kiso to Bussei* (*Basis and Physical Properties of High Functional Coating Materials*), pp. 314-359, CMC Publishing (2003), *Kobunshi Zairyo to Fukugouzai Seihin no Taikyusei* (*Durability of Polymer Materials and Composite Material Products*), CMC Publishing (2005), *Kobunshi Zairyo no Chojumyoka to Kankyo Taisaku* (*Elongation of Lifetime of Polymer Materials and Environmental Measures*), CMC Publishing (2000), H. Zweifel (compiler), *Plastics Additives Handbook, 5th Edition*, pp. 238-244, and Hanser Publishers, Tadahiko Kutsura, *Kiso Koza 2, Plastic Housou Yoki no Kagaku* (*Basic Seminar 2, Science of Plastic*

*Packaging Container)*, Chapter 8, Society of packaging Science & Technology, Japan (2003).

The evaluation in each application can be achieved by the following known evaluation methods. The degradation of a polymer material due to light can be evaluated by the method of JIS-K7105:1981, JIS-K7101:1981, JIS-K7102:1981, JIS-K7219:1998, JIS-K7350-1:1995, JIS-K7350-2:1995, JIS-K7350-3:1996 or JIS-K7350-4:1996 or a method based thereon.

The light resistance in use for packaging/container can be determined by the method of JIS-K7105 or a method based thereon. Specific examples of the method include an evaluation of light transmittance or transparency of a bottle body, a sensory test evaluation of the bottle content after exposure to ultraviolet light from a xenon light source, a haze value evaluation after xenon lamp irradiation, a haze value evaluation using a halogen lamp as the light source, a yellowing degree evaluation by a blue wool scale after exposure to a mercury lamp, a haze value evaluation using a sunshine weather meter, a visual evaluation of colorability, an ultraviolet transmittance evaluation, an ultraviolet blocking rate evaluation, a beam transmittance evaluation, evaluations of viscosity and beam transmittance of ink in an ink container, an evaluation with an eye or based on the color difference ΔE of the sample in a container after exposure to sunlight, evaluations of ultraviolet transmittance, light transmittance, color difference, beam transmittance, haze value, color tone, yellowness index and light-blocking property after irradiation with a white fluorescent lamp, a whiteness index evaluation using the color difference formula of the L*a*b* color system, a yellowing evaluation based on the color difference ΔEa*b* of the exposed sample for each wavelength after dispersion of xenon light, an ultraviolet absorbance evaluation after exposure to ultraviolet light, a tensile elongation evaluation of the film after exposure using a sunshine weather meter, an antimicrobial evaluation after exposure using a xenon weather meter, a discoloration evaluation of the package content after fluorescent lamp irradiation, evaluations of peroxide and color tone of oil after exposing a salad oil-filled bottle to a fluorescent lamp, an absorbance difference evaluation after chemical lamp irradiation, evaluations of surface gloss retention and appearance after exposure using a sunshine weather meter, evaluations of color difference and flexural strength after exposure using a sunshine weatherometer, a light blocking ratio evaluation, and an evaluation of peroxide production in kerosene.

The long-term durability in use for coating material/coating film can be evaluated by the method of JIS-K5400, JIS-K5600-7-5:1999, JIS-K5600-7-6:2002, JIS-K5600-7-7:1999, JIS-K5600-7-8:1999 or JIS-K8741 or a method based thereon. Specific examples thereof include an evaluation based on the color density, the color difference ΔEa*b* in the CIE L*a*b* color coordinates or the residual gloss after exposure using a xenon light resistance tester and an UVCON apparatus, an absorbance evaluation after exposure of a film on a quartz slide by using a xenon arc light resistance tester, an evaluation based on the color density or the color difference ΔEa*b* in the CIE L*a*b* color coordinates after exposing the wax to a fluorescent lamp or an UV lamp, a color hue evaluation after exposure using Metalweather weather resistance tester, an evaluation of gloss retention or an evaluation based on the color difference ΔEa*b* after an exposure test using a metal halide lamp, an evaluation of glossiness after exposure using a sunshine carbon arc light source, an evaluation based on the color difference ΔEa*b* or an evaluation of the gloss retention or appearance after exposure using Metalweather weather resistance tester, an evaluation of gloss retention after exposure using a sunshine weatherometer, an evaluation based on the color difference ΔEa*b* or an evaluation of gloss retention after exposure using a QUV weather resistance tester, an evaluation of gloss retention after exposure using a sunshine weatherometer, an appearance evaluation of the coated plate after exposure using a sunshine weatherometer, an evaluation of gloss retention or change in brightness after exposure using a sunshine weatherometer, an appearance evaluation of the coated film in a deteriorated state after dew cycle WOM exposure, an evaluation of ultraviolet transmittance of the coated film, an evaluation of ultraviolet blocking rate of the coated film, a comparative evaluation of the time until the gloss retention rate of the coated film is reduced to 80% by using a sunshine weatherometer, an evaluation of rusting after exposure using Dewpanel light control weather meter, an evaluation of strength of the concrete against the coated formwork after outdoor exposure, an evaluation based on the color difference ΔEa*b* after outdoor exposure, a grid adhesion evaluation, a surface appearance evaluation, a gloss retention evaluation after outdoor exposure, and an evaluation of yellowing degree (ΔYI) after exposure using a carbon arc light source.

The light resistance in use for an ink can be evaluated by the method of JIS-K5701-1:2000, JIS-K7360-2, or ISO105-B02 or a method based thereon. Specific examples thereof include an evaluation based on the color density or the measurement of the CIE L*a*b* color coordinates after exposure using an office fluorescent lamp or a discoloration tester, an electrophoretic evaluation after exposure to ultraviolet light from a xenon arc light source, a density evaluation of the printed matter by using a xenon fade meter, a deinking evaluation using a 100 W chemical lamp, an evaluation of dye residual ratio in the image-forming region by using a weather meter, evaluations of chalking and discoloration of the printed matter by using Eye Super UV Tester, an evaluation based on the color difference ΔEa*b* of the CIE L*a*b* color coordinates for a printed matter after exposure using a xenon fade meter, and a reflectance evaluation after exposure using a carbon arc light source.

The light resistance of the solar cell module can be evaluated by the method of JIS-C8917:1998 or JIS-C8938:1995 or a method based thereon. Specific examples thereof include an I-V measurement photovoltaic efficiency evaluation after exposure using a xenon lamp light source equipped with a sunlight-simulating compensation filter, an evaluation of discoloration gray scale degree after exposure using a sunshine weather meter or a fade mater, and an evaluation of color, appearance and adherence.

The light resistance of the fiber and fiber product can be evaluated by the method of JIS-L1096:1999, JIS-A5905:2003, JIS-L0842, JIS-K6730, JIS-K7107, DIN75.202, SAEJ1885, SN-ISO-105-B02 or AS/NZS4399 or a method based thereon. Examples thereof include an ultraviolet transmittance evaluation, a blue scale discoloration evaluation after exposure using a xenon light source or a carbon arc light source, a UV protection evaluation, an ultraviolet-blocking property evaluation, a blue scale discoloration evaluation after dry cleaning and after exposure using a carbon arc light source, an evaluation of the color difference ΔE* based on lightness index and chromaticness index after exposure using a fadeometer, a tensile strength evaluation after exposure using a UV tester or a sunshine weather meter, a total transmission evaluation, a strength retention evaluation, an ultraviolet protection factor (UPF) evaluation, a discoloration gray scale evaluation after exposure using a high-temperature fade meter, an appearance evaluation after outdoor exposure, evaluations of yellowness index (YI) and yellowing degree (ΔYI) after exposure to ultraviolet light, and a reflectance evaluation.

The light resistance of the architectural material can be evaluated by the method of JIS-A1415:1999 or a method based thereon. Specific examples thereof include a surface color tone evaluation after exposure using a sunshine weatherometer, an appearance evaluation after exposure using a carbon arc light source, an appearance evaluation after exposure using Eye Super UV Tester, an absorbance evaluation after exposure, an evaluation of chromaticity and color difference after exposure, an evaluation based on the color difference ΔEa*b* of the CIE L*a*b* color coordinates after exposure using a metal halide lamp light source, a gloss retention evaluation, an evaluation of change in the haze value after exposure using a sunshine weather meter described in JP-A-10-44352 and JP-A-2003-211538, an elongation retention evaluation using a tensile tester after exposure, an ultraviolet transmittance evaluation after dipping in a solvent, a visual appearance evaluation after exposure using Eye Super UV Tester, an evaluation of change in the glossiness after a QUV test, a gloss retention evaluation after exposure using a sunshine weatherometer, an evaluation based on the color difference ΔEa*b* after exposure to ultraviolet light using a black light blue fluorescent lamp, an adherence retention evaluation after exposure using UVCON acceleration tester, an ultraviolet blocking property evaluation, an appearance evaluation after outdoor exposure (JIS-A1410), a total light transmittance evaluation, a haze change evaluation, a tensile shear adhesive strength evaluation, a total light transmittance evaluation after exposure using a xenon weather meter, a haze evaluation, a yellowing degree evaluation, and evaluations of yellowing degree (ΔYI) and ultraviolet absorber residual ratio after exposure using a sunshine weatherometer.

The light resistance in use for the recording medium can be evaluated by the method of JIS-K7350 or a method based thereon. Specific examples thereof include an evaluation of base color difference in the printing region after fluorescent lamp irradiation, an image density residual ratio evaluation after exposure using a xenon weather meter, an evaluation of change in the optical reflection density due to exposure using a xenon weather meter, a yellowing degree evaluation based on the L*a*b* evaluation system after exposure using Suntest CPS photofading tester, a discoloration evaluation using a fade meter, a visual discoloration evaluation after exposure using a xenon fade meter, a color density retention evaluation after exposure to indoor sunlight, a color density retention evaluation after exposure using a xenon weather meter, a C/N evaluation after exposure using a fade meter, a fog density evaluation after exposure to a fluorescent lamp, an optical reflection density evaluation after exposure using a fluorescent lamp, an erasure evaluation, a color difference ΔE* evaluation after exposure using Atlas fade meter, a visual evaluation of discoloration after exposure using a carbon arc fade meter, an evaluation of color conversion retention of an organic EL device, and a measurement/evaluation of organic EL display luminance after exposure by a xenon discoloration tester.

As for other evaluation methods, the evaluation can be performed by the method of JIS-K7103 or ISO/DIS9050 or a method based thereon. Specific examples thereof include an appearance evaluation of a polycarbonate coating film after exposure by a UV tester, a blue scale evaluation of artificial hair after exposure to ultraviolet light, an evaluation of water contact angle on a processed cloth for evaluation after exposure using an accelerated weather resistance tester, a visual evaluation of the image projected on a projection screen after exposure using a weather resistance tester described in JP-A-2005-55615, a visual evaluation of the sample surface deterioration and change in decoration after exposure using a sunshine weather meter or a metal weather meter, a visual appearance evaluation after exposure to lighting using a metal lamp reflector, a beam transmittance evaluation of bottle label, a polypropylene deterioration evaluation after exposure using a xenon weather meter under humid condition, a deterioration evaluation of hardcoat film by using a sunshine weatherometer, evaluations of deterioration, hydrophilicity and scratch resistance of base material, a gray scale evaluation of color difference of artificial leather after exposure using a xenon lamp light, an evaluation of liquid crystal device characteristics after exposure using a mercury lamp, an adherence evaluation after exposure using a sunshine weatherometer, a purple blotch degree evaluation of lawn grass, an ultraviolet transmittance evaluation after exposure using a xenon arc light source, a tensile strength evaluation, a concrete adhesion velocity evaluation, evaluations of appearance and coating film adherence after exposure using a sunshine weatherometer, an evaluation of yellowing degree and adherence after exposure using a carbon arc light source, an adhesive performance evaluation using an ultraviolet fade meter, an evaluation of insects flying prevention during lighting, an evaluation of yellowing degree (ΔYI) of the laminated glass by using Eye Super UV Tester, evaluations of surface appearance and gloss retention after QUV irradiation and humidity-resistance test, an evaluation of color difference with aging using Dewpanel light control weather meter, evaluations of glossiness (DI) and yellowness index (YI) of the wood base in a coated state after exposure using a xenon weatherometer, an ultraviolet absorbance evaluation after repeating ultraviolet irradiation and darkness, and an evaluation of dye discoloration based on color difference ΔE after exposure to ultraviolet light.

EXAMPLES

The present invention is described in greater detail below by referring to Examples, but the present invention is not limited thereto.

Synthesis Example

Synthesis Example 1

Preparation of Compound (1)

Acetonitrile (600 mL) and 356.2 g of DBU (diazabicycloundecene (1,8-diazabicyclo[5.4.0]undec-7-ene)) were added to 160.0 g of salicylamide and dissolved. To this solution, 231.7 g of methyl 4-(chloroformyl)benzoate was added, and the mixture was stirred at room temperature for 24 hours. To the resulting reaction solution, 1,800 mL of water and 170 mL of 35% hydrochloric acid were added, and the obtained solid was filtered and washed with water to obtain 343.0 g of Synthetic Intermediate A (yield: 98%).

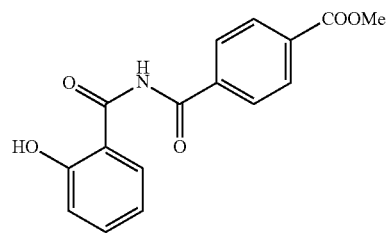

(Synthetic Intermediate A)

Acetonitrile (1,200 mL) and 98.1 g of sulfuric acid were added to 200.0 g of Synthetic Intermediate A, and the mixture was stirred at 90° C. for 4 hours. To the resulting reaction solution, 600 mL of triethylamine was added, and the mixture was cooled to room temperature. The obtained solid was filtered and washed with water to obtain 182.3 g of Synthetic Intermediate B (yield: 97%).

(Synthetic Intermediate B)

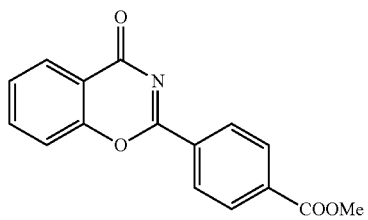

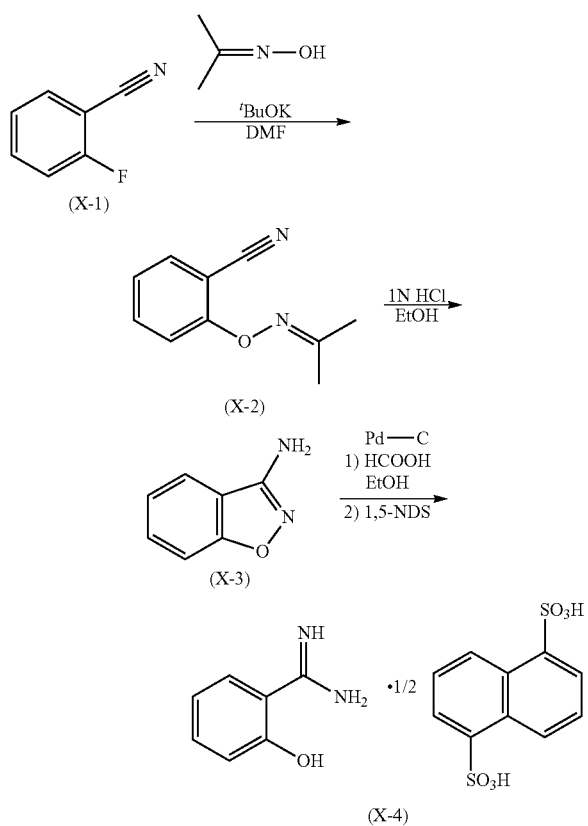

(Synthesis of X-2)

A three-neck flask was charged with 39.5 g (1.1 molar equivalents) of acetoxime, 600 mL of DMF (N,N-dimethylformamide) and 60.6 g (1.1 molar equivalents) of potassium tert-butoxide, and the mixture was stirred at room temperature for 30 minutes. The inner temperature was then set to 0° C. and thereto, 60 g (1.0 molar equivalent) of Compound (X-1) was slowly added dropwise. After the dropwise addition, the inner temperature was raised to 25° C., and the mixture was stirred at this temperature for 1 hour.

The resulting reaction mixture was subjected to an extraction and separation operation with an aqueous ammonium chloride and ethyl acetate, and the obtained organic phase was washed by adding saturated brine and then separated. The separated organic phase was concentrated in a rotary evaporator to yield a residue as a crude product of Compound (X-2).

(Synthesis of X-3)

A three-neck flack was charged with the entire amount of the crude product of Compound (X-2) obtained above and after adding 700 mL of ethanol and 500 mL of aqueous 1 mol/l hydrochloric acid, the reaction mixture was heated to an inner temperature of 80° C. and stirred at this temperature for 3 hours.

The reaction mixture was cooled to an inner temperature of 25° C. and then subjected to an extraction and separation operation with an aqueous saturated sodium hydrogencarbonate solution and ethyl acetate, and the obtained organic phase was washed by adding saturated brine and separated. The separated organic phase was concentrated in a rotary evaporator to yield a residue as a crude product of Compound (X-3).

(Synthesis of X-4)

In a three-neck flask, after filling the inside of flask with nitrogen gas, 6.5 g of 10% Pd—C (produced by Wako Pure Chemical Industries, Ltd.) was added, and 2,000 mL of ethanol and the entire amount of the crude product of Compound (X-3) obtained above were further added. The resulting mixture was heated/refluxed and after 55 mL (3 molar equivalents) of formic acid was slowly added dropwise thereto, stirred at this temperature for 5 hours. The resulting reaction mixture was cooled to an inner temperature of 25° C. and then filtered by Celite filtration and to the mother solution separated by filtration, 105 g of 1,5-naphthalenedisulfonic acid was added. After raising the inner temperature to 70° C., the mixture was stirred for 30 minutes and then gradually cooled to room temperature, and the crystal was separated by filtration to obtain 100 g of Compound (X-4). The yield was 72% based on Compound (X-1) as the starting material. The obtained crystal was pale brown. $^1$H NMR (deuterated DMSO): δ6.95-6.98 (1H), δ7.02-7.04 (1H), δ7.40-7.51 (3H), δ7.90-7.95 (1H), δ8.75 (1H), δ8.85-8.88 (2H), δ9.03 (2H), δ10.89 (1H).

Methanol (50 mL) and 3.8 g of a 28% sodium methoxide methanol solution were added to 5.5 g of Compound (X-4). To this solution, 5.0 g of Synthetic Intermediate B was added, and the mixture was stirred at 60° C. for 3 hours. The resulting reaction solution was cooled to room temperature, and 0.2 mL of hydrochloric acid was added thereto. The obtained solid was filtered and washed with water and methanol to obtain 6.8 g of Compound (1) (yield: 95%).

MS:m/z 400 (M+). $^1$H NMR (CDCl$_3$): δ7.04-7.12 (4H), δ7.53-7.57 (2H), δ8.24-8.27 (2H), δ8.51-8.53 (4H), δ12.91 (2H). λmax=353 nm (EtOAc).

Synthesis Example 2

Preparation of Compound (2)

Acetonitrile (600 mL) and 355.2 g of DBU were added to 160.0 g of salicylamide and dissolved. To this solution, 193.2 g of 4-cyanobenzoyl chloride was added, and the mixture was stirred at room temperature for 24 hours. To the resulting reaction solution, 1,200 mL of water and 150 mL of hydrochloric acid were added, and the obtained solid was filtered and washed with water to obtain 292.8 g of Synthetic Intermediate C (yield: 94%), (Synthetic Intermediate C)

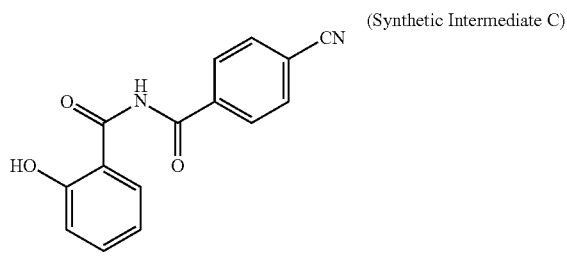 [SMILES: N#Cc1ccc(C(=O)NC(=O)c2ccccc2O)cc1]

(Synthetic Intermediate E)

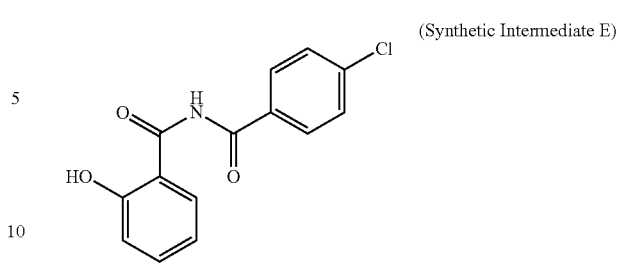

Acetonitrile (1,200 mL) and 110.5 g of sulfuric acid were added to 200.0 g of Synthetic Intermediate C, and the mixture was stirred at 90° C. for 4 hours. To the resulting reaction solution, 600 mL of triethylamine was added, and the mixture was cooled to room temperature. The obtained solid was filtered and washed with water to obtain 177.2 g of Synthetic Intermediate D (yield: 95%).

Acetonitrile (240 mL) and 20.2 g of sulfuric acid were added to 38.0 g of Synthetic Intermediate E, and the mixture was stirred at 90° C. for 4 hours. To the resulting reaction solution, 150 mL of triethylamine was added, and the mixture was cooled to room temperature. The obtained solid was filtered and washed with water to obtain 30.8 g of Synthetic Intermediate F (yield: 94%).

(Synthetic Intermediate D)

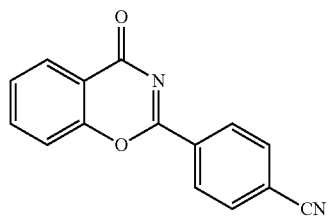

(Synthetic Intermediate F)

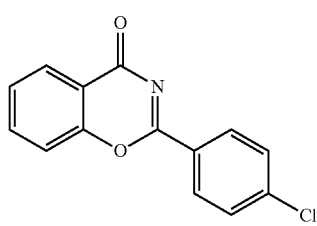

Methanol (50 mL) and 4.3 g of a 28% sodium methoxide methanol solution were added to 6.2 g of Compound (X-4). To this solution, 5.0 g of Synthetic Intermediate D was added, and the mixture was stirred at 60° C. for 3 hours. The resulting reaction solution was cooled to room temperature, and 0.2 mL of hydrochloric acid was added thereto. The obtained solid was filtered and washed with water and methanol to obtain 7.1 g of Compound (2) (yield: 96%).

MS:m/z 367 (M+). NMR (CDCl$_3$): δ7.01-7.13 (4H), δ7.56-7.59 (2H), δ7.91-7.93 (2H), δ8.52-8.54 (2H), δ8.58-8.60 (2H), δ12.77 (2H). λmax=355 nm (EtOAc).

Methanol (50 mL) and 4.1 g of a 28% sodium methoxide methanol solution were added to 6.0 g of Compound (X-4). To this solution, 5.0 g of Synthetic Intermediate F was added, and the mixture was stirred at 60° C. for 3 hours. The resulting reaction solution was cooled to room temperature, and 0.2 mL of hydrochloric acid was added thereto. The obtained solid was filtered and washed with water and methanol to obtain 6.8 g of Compound (4) (yield: 93%).

MS:m/z 376 (M+). $^1$H NMR (CDCl$_3$): δ7.04-7.12 (4H), δ7.53-7.60 (4H), δ8.41-8.43 (2H), δ8.53-8.55 (2H), δ12.96 (2H). λmax=352 nm (EtOAc).

Synthesis Example 3

Preparation of Compound (4)

Acetonitrile (800 mL) and 444.0 g of DBU were added to 200.0 g of salicylamide and dissolved. To this solution, 255.0 g of 4-chlorobenzoyl chloride was added, and the mixture was stirred at room temperature for 24 hours. To the resulting reaction solution, 2,000 mL of water and 200 mL of hydrochloric acid were added, and the obtained solid was filtered and washed with water to obtain 389.9 g of Synthetic Intermediate E (yield: 97%).

Synthesis Example 4

Preparation of Compound (104)

Acetonitrile (80 mL) and 36.4 g of DBU were added to 20.0 g of 4-methoxysalicylamide and dissolved. To this solution, 23.8 g of methyl 4-(chloroformyl)benzoate was added, and the mixture was stirred at room temperature for 24 hours. To the resulting reaction solution, 100 mL of water and 20 mL of hydrochloric acid were added, and the obtained solid was filtered and washed with water to obtain 36.0 g of Synthetic Intermediate G (yield: 91%).

(Synthetic Intermediate G)

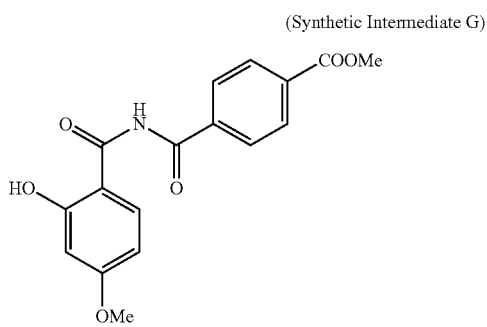 [SMILES: COC(=O)c1ccc(C(=O)NC(=O)c2ccc(OC)cc2O)cc1]

Acetonitrile (200 mL) and 8.9 g of sulfuric acid were added to 20.0 g of Synthetic Intermediate G, and the mixture was stirred at 90° C. for 4 hours. To the resulting reaction solution, 80 mL of triethylamine was added, and the mixture was cooled to room temperature. The obtained solid was filtered and washed with water to obtain 17.1 g of Synthetic Intermediate H (yield: 90%).

(Synthetic Intermediate H)

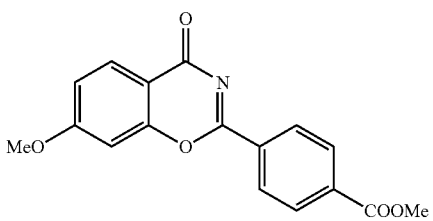

Methanol (50 mL) and 3.4 g of a 28% sodium methoxide methanol solution were added to 5.5 g of Compound (X-4). To this solution, 5.0 g of Synthetic Intermediate H was added, and the mixture was stirred at 60° C. for 3 hours. The resulting reaction solution was cooled to room temperature, and 0.2 mL of hydrochloric acid was added thereto. The obtained solid was filtered and washed with water and methanol to obtain 6.3 g of Compound (104) (yield: 91%). MS:m/z 430 (M+). $^1$H NMR (CDCl$_3$): δ6.54-6.55 (1H), δ6.63-6.64 (1H), δ7.02-7.10 (2H), δ7.51-7.55 (1H), δ8.23-8.25 (2H), δ8.48-8.50 (3H), δ13.02 (1H), δ13.17 (1H). λmax=352 nm (EtOAc).

Synthesis Example 5

Preparation of Compound (3)

Acetonitrile (800 mL) and 444.0 g of DBU were added to 200.0 g of salicylamide and dissolved. To this solution, 303.9 g of 4-(trifluoromethyl)benzoyl chloride was added, and the mixture was stirred at room temperature for 24 hours. To the resulting reaction solution, 2,000 mL of water and 200 mL of hydrochloric acid were added, and the obtained solid was filtered and washed with water to obtain 428.3 g of Synthetic Intermediate I (yield: 95%).

(Synthetic Intermediate I)

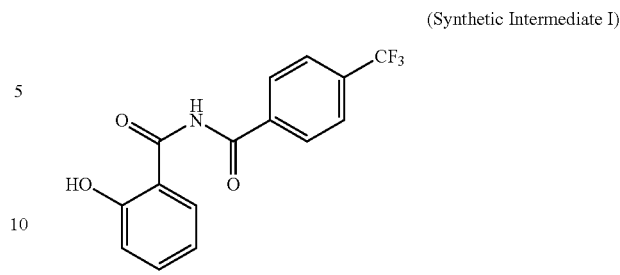

Acetonitrile (240 mL) and 20.2 g of sulfuric acid were added to 34.0 g of Synthetic Intermediate I, and the mixture was stirred at 90° C. for 4 hours. To the resulting reaction solution, 150 mL of triethylamine was added, and the mixture was cooled to room temperature. The obtained solid was filtered and washed with water to obtain 34.8 g of Synthetic Intermediate J (yield: 94%).

(Synthetic Intermediate J)

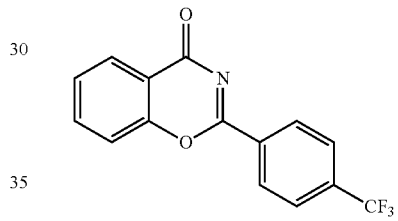

Methanol (50 mL) and 4.6 g of a 28% sodium methoxide methanol solution were added to 6.8 g of Compound (X-4). To this solution, 5.0 g of Synthetic Intermediate J was added, and the mixture was stirred at 60° C. for 3 hours. The resulting reaction solution was cooled to room temperature, and 0.2 mL of hydrochloric acid was added thereto. The obtained solid was filtered and washed with water and methanol to obtain 6.7 g of Compound (3) (yield: 95%).

MS:m/z 409 (M+).

Synthesis Example 6

Preparation of Compound (m-1)

Acetonitrile (600 mL) and 356.2 g of DBU were added to 160.0 g of salicylamide and dissolved. To this solution, 231.7 g of methyl 3-(chloroformyl)benzoate was added, and the mixture was stirred at room temperature for 24 hours. To the resulting reaction solution, 1,800 mL of water and 170 mL of 35% hydrochloric acid were added, and the obtained solid was filtered and washed with water to obtain 329.0 g of Synthetic Intermediate K (yield: 94%).

(Synthetic Intermediate K)

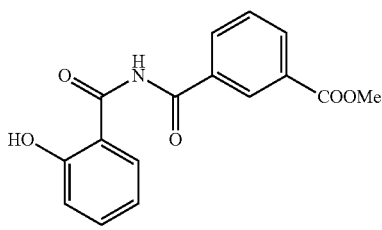

Acetonitrile (1,200 mL) and 98.1 g of sulfuric acid were added to 200.0 g of Synthetic Intermediate K, and the mixture was stirred at 90° C. for 4 hours. To the resulting reaction solution, 600 mL of triethylamine was added, and the mixture was cooled to room temperature. The obtained solid was filtered and washed with water to obtain 178.5 g of Synthetic Intermediate L (yield: 95%).

(Synthetic Intermediate L)

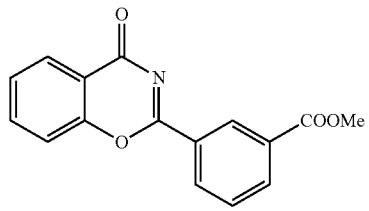

Methanol (50 mL) and 3.8 g of a 28% sodium methoxide methanol solution were added to 5.5 g of Compound (X-4). To this solution, 5.0 g of Synthetic Intermediate L was added, and the mixture was stirred at 60° C. for 3 hours. The resulting reaction solution was cooled to room temperature, and 0.2 mL of hydrochloric acid was added thereto. The obtained solid was filtered and washed with water and methanol to obtain 6.9 g of Compound (m-1) (yield: 96%). MS:m/z 400 (M+).

Synthesis Example 7

Preparation of Compound (m-2)

Acetonitrile (600 mL) and 355.2 g of DBU were added to 160.0 g of salicylamide and dissolved. To this solution, 193.2 g of 3-cyanobenzoyl chloride was added, and the mixture was stirred at room temperature for 24 hours. To the resulting reaction solution, 1,200 mL of water and 150 mL of hydrochloric acid were added, and the obtained solid was filtered and washed with water to obtain 296.0 g of Synthetic Intermediate M (yield: 95%).

(Synthetic Intermediate M)

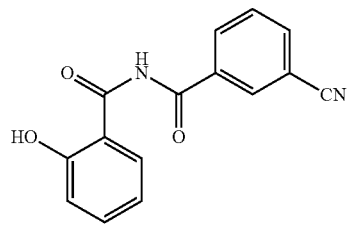

Acetonitrile (1,200 mL) and 110.5 g of sulfuric acid were added to 200.0 g of Synthetic Intermediate M, and the mixture was stirred at 90° C. for 4 hours. To the resulting reaction solution, 600 mL of triethylamine was added, and the mixture was cooled to room temperature. The obtained solid was filtered and washed with water to obtain 177.3 g of Synthetic Intermediate N (yield: 95%).

(Synthetic Intermediate N)

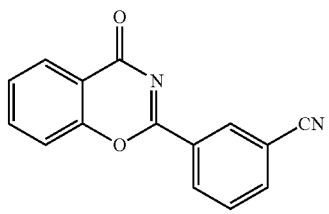

Methanol (50 mL) and 4.3 g of a 28% sodium methoxide methanol solution were added to 6.2 g of Compound (X-4). To this solution, 5.0 g of Synthetic Intermediate N was added, and the mixture was stirred at 60° C. for 3 hours. The resulting reaction solution was cooled to room temperature, and 0.2 mL of hydrochloric acid was added thereto. The obtained solid was filtered and washed with water and methanol to obtain 6.9 g of Compound (m-2) (yield: 93%). MS:m/z 367 (M+).

Synthesis Example 8

Preparation of Compound (21)

2-Ethylhexanol (31.6 g), 0.13 g of NaOMe and 100 mL of xylene were added to 10 g of Compound (1), and the mixture was stirred at 90° C. for 6 hours under reduced pressure. To the resulting reaction solution, water and ethyl acetate were added, followed by stirring. The organic phase separated was concentrated, and the obtained residue was crystallized from hexane/isopropyl alcohol (1:10 by volume) to obtain 11.7 g of Compound (21) (yield: 95%).
MS:m/z 498 (M+).

Synthesis Example 9

Preparation of Compound (24)

FINEOXOCOL 180N (produced by Nissan Chemicals Industries, Ltd.) (9.8 g), 0.13 g of NaOMe and 100 mL of xylene were added to 10 g of Compound (1), and the mixture was stirred at 90° C. for 6 hours under reduced pressure. To the resulting reaction solution, water and ethyl acetate were added, followed by stirring. The organic phase separated was concentrated, and the obtained residue was crystallized from hexane/isopropyl alcohol (1:10 by volume) to obtain 14.5 g of Compound (24) (yield: 92%). MS:m/z 638 (M+).

Synthesis Example 10

Preparation of Compound (72)

Acetonitrile (80 mL) and 29.7 g of DBU were added to 20.0 g of 2-hydroxy-4-(trifluoromethyl)benzamide and dissolved. To this solution, 19.4 g of methyl 4-(chloroformyl)benzoate was added, and the mixture was stirred at room temperature for 24 hours. To the resulting reaction solution, 100 mL of water and 20 mL of 35% hydrochloric acid were added, and the obtained solid was filtered and washed with water to obtain 34.1 g of Synthetic Intermediate O (yield: 95%).

(Synthetic Intermediate O)

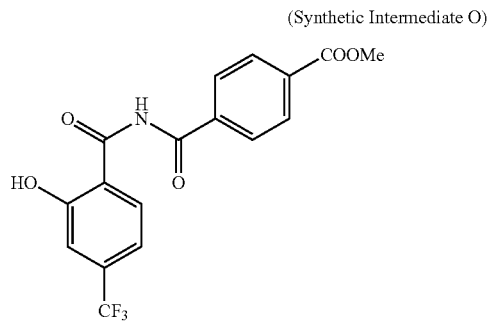 [SMILES: COC(=O)c1ccc(C(=O)NC(=O)c2ccc(C(F)(F)F)cc2O)cc1]

Acetonitrile (200 mL) and 6.9 g of sulfuric acid were added to 20.0 g of Synthetic Intermediate 0, and the mixture was stirred at 90° C. for 4 hours. To the resulting reaction solution, 80 mL of triethylamine was added, and the mixture was cooled to room temperature. The obtained solid was filtered and washed with water to obtain 18.4 g of Synthetic Intermediate P (yield: 97%).

(Synthetic Intermediate P)

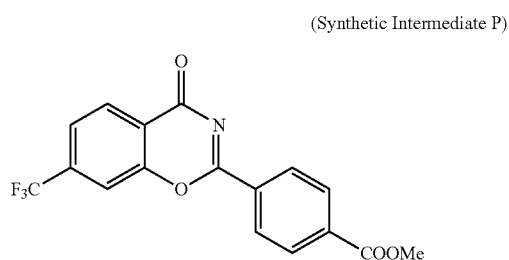 [SMILES: COC(=O)c1ccc(-c2nc(=O)c3ccc(C(F)(F)F)cc3o2)cc1]

Methanol (100 mL) and 3.4 g of a 28% sodium methoxide methanol solution were added to 5.5 g of Compound (X-4). To this solution, 5.0 g of Synthetic Intermediate P was added, and the mixture was stirred at 60° C. for 3 hours. The resulting reaction solution was cooled to room temperature, and 0.2 mL of 35% hydrochloric acid was added thereto. The obtained solid was filtered and washed with water and methanol to obtain 5.9 g of Compound (72) (yield: 91%). MS:m/z 467 (M+).

Synthesis Example 11
Preparation of Compound (81)

Acetonitrile (80 mL) and 36.4 g of DBU were added to 20.0 g of 2-hydroxy-5-methoxybenzamide and dissolved. To this solution, 23.8 g of methyl 4-(chloroformyl)benzoate was added, and the mixture was stirred at room temperature for 24 hours. To the resulting reaction solution, 100 mL of water and 20 mL of 35% hydrochloric acid were added, and the obtained solid was filtered and washed with water to obtain 38.0 g of Synthetic Intermediate Q (yield: 96%).

(Synthetic Intermediate Q)

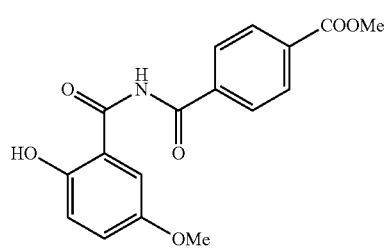

Acetonitrile (200 mL) and 8.9 g of sulfuric acid were added to 20.0 g of Synthetic Intermediate Q, and the mixture was stirred at 90° C. for 4 hours. To the resulting reaction solution, 80 mL of triethylamine was added, and the mixture was cooled to room temperature. The obtained solid was filtered and washed with water to obtain 18.1 g of Synthetic Intermediate R (yield: 96%).

(Synthetic Intermediate R)

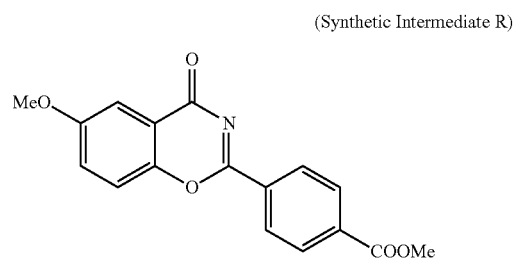 [SMILES: COC(=O)c1ccc(-c2nc(=O)c3cc(OC)ccc3o2)cc1]

Methanol (50 mL) and 3.4 g of a 28% sodium methoxide methanol solution were added to 5.5 g of Compound (X-4). To this solution, 5.0 g of Synthetic Intermediate R was added, and the mixture was stirred at 60° C. for 3 hours. The resulting reaction solution was cooled to room temperature, and 0.2 mL of hydrochloric acid was added thereto. The obtained solid was filtered and washed with water and methanol to obtain 6.3 g of Compound (81) (yield: 91%), MS:m/z 430 (M+).

Synthesis Example 12

Preparation of Compound (84)

Acetonitrile (80 mL) and 35.4 g of DBU were added to 20.0 g of 2-hydroxy-5-chlorobenzamide and dissolved. To this solution, 23.1 g of methyl 4-(chloroformyl)benzoate was added, and the mixture was stirred at room temperature for 24 hours. To the resulting reaction solution, 100 mL of water and 20 mL of 35% hydrochloric acid were added, and the obtained solid was filtered and washed with water to obtain 38.1 g of Synthetic Intermediate S (yield: 98%).

(Synthetic Intermediate S)

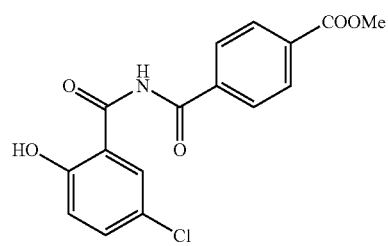

Acetonitrile (200 mL) and 9.0 g of sulfuric acid were added to 20.0 g of Synthetic Intermediate S, and the mixture was stirred at 90° C. for 4 hours. To the resulting reaction solution, 80 mL of triethylamine was added, and the mixture was cooled to room temperature. The obtained solid was filtered and washed with water to obtain 18.3 g of Synthetic Intermediate T (yield: 97%).

(Synthetic Intermediate T)

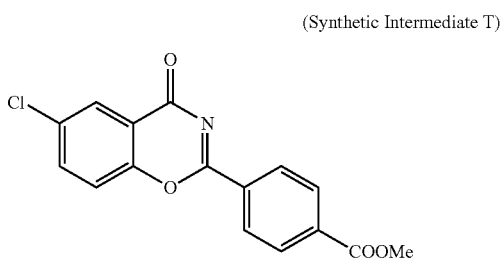 [SMILES: COC(=O)c1ccc(-c2nc(=O)c3cc(Cl)ccc3o2)cc1]

Methanol (100 mL) and 3.3 g of a 28% sodium methoxide methanol solution were added to 5.5 g of Compound (X-4). To this solution, 5.0 g of Synthetic Intermediate T was added, and the mixture was stirred at 60° C. for 3 hours. The resulting reaction solution was cooled to room temperature, and 0.2 mL of 35% hydrochloric acid was added thereto. The obtained solid was filtered and washed with water and methanol to obtain 6.1 g of Compound (84) (yield: 92%). MS:m/z 434 (M+).

Synthesis Example 13

Preparation of Compound (98)

Acetonitrile (80 mL) and 32.4 g of DBU were added to 20.0 g of 3-hydroxy-2-naphthamide and dissolved. To this solution, 21.2 g of methyl 4-(chloroformyl)benzoate was added, and the mixture was stirred at room temperature for 24 hours. To the resulting reaction solution, 100 mL of water and 20 mL of 35% hydrochloric acid were added, and the obtained solid was filtered and washed with water to obtain 35.1 g of Synthetic Intermediate U (yield: 94%).

(Synthetic Intermediate U)

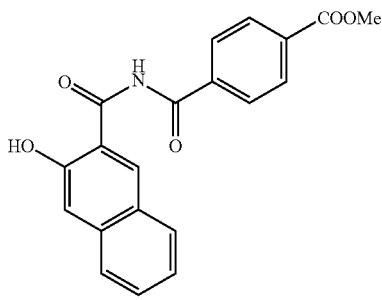

Acetonitrile (200 mL) and 9.1 g of sulfuric acid were added to 20.0 g of Synthetic Intermediate U, and the mixture was stirred at 90° C. for 4 hours. To the resulting reaction solution, 80 mL of triethylamine was added, and the mixture was cooled to room temperature. The obtained solid was filtered and washed with water to obtain 17.9 g of Synthetic Intermediate V (yield: 94%).

(Synthetic Intermediate V)

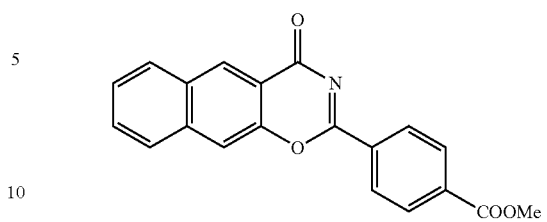

Methanol (100 mL) and 3.0 g of a 28% sodium methoxide methanol solution were added to 5.5 g of Compound (X-4). To this solution, 5.0 g of Synthetic Intermediate V was added, and the mixture was stirred at 60° C. for 3 hours. The resulting reaction solution was cooled to room temperature, and 0.2 mL of 35% hydrochloric acid was added thereto. The obtained solid was filtered and washed with water and methanol to obtain 6.1 g of Compound (98) (yield: 94%). MS:m/z 449 (M+).

Synthesis Example 14

Preparation of Compound (m-21)

3,5,5-Trimethylhexanol (250 mL) and 13 g of sulfuric acid were added to 25 g of Compound (m-2), and the mixture was stirred at 150° C. for 10 hours. The resulting reaction solution was cooled to 50° C., and 100 mL of toluene and 100 mL of water were added thereto. After stirring, the aqueous layer was removed, and 850 mL of methanol was added to the residue. The obtained solid was filtered and washed with water and methanol to obtain 31.4 g of Compound (m-21) (yield: 90%). MS:m/z 512 (M+). $^1$H NMR (CDCl$_3$): δ0.88-0.93 (9H), δ1.07-1.08 (3H), δ1.14-1.92 (1H), δ1.32-1.37 (1H), δ1.67-1.88 (3H), δ4.40-4.45 (2H), δ6.99-7.06 (4H), δ7.48-7.53 (2H), δ7.64-7.68 (1H), δ8.29-8.32 (1H), δ8.46-8.57 (3H), δ9.08 (1H), δ12.86 (2H). λmax=354 nm (EtOAc).

Synthesis Example 15

Preparation of Compound (120)

3,5,5-Trimethylhexanol (250 mL) and 13 g of sulfuric acid were added to 25 g of Compound (1), and the mixture was stirred at 150° C. for 10 hours. The resulting reaction solution was cooled to 50° C., and 100 mL of toluene and 100 mL of water were added thereto. After stirring, the aqueous layer was removed, and 850 mL of methanol was added to the residue. The obtained solid was filtered and washed with water and methanol to obtain 31.4 g of Compound (120) (yield: 90%). MS:m/z 512 (M+). $^1$H NMR (CDCl$_3$): δ0.94 (9H), δ1.03-1.05 (3H), δ1.14-1.19 (1H), δ1.31-1.35 (1H), δ1.62-1.88 (3H), δ4.41-4.44 (2H), δ7.05-7.13 (4H), δ7.54-7.58 (2H), δ8.24-8.27 (2H), δ8.53-8.57 (4H), δ12.93 (2H). λmax=354 nm (EtOAc).

<Method for Measuring pKa>

Compound (1) was dissolved in acetonitrile to give an absorbance of 1 and to this solution, 70% perchloric acid (solvent: acetic acid) was added dropwise, thereby varying the pH. At this time, the absorption spectrum of solution was measured and based on the absorbance at λmax, the proportions of a triazine-free form and a proton adduct were calculated at each pH. From the point at which these values became equal, the pKa value was determined. Here, the triazine-free form indicates Compound (1) itself, and the proton adduct indicates a compound resulting from addition of a proton to the nitrogen atom of triazine ring of Compound (1). The compounds of the present invention shown in the Table below and Comparative Compounds A and B were determined for the pKa value in the same manner. The absorption spectrum was measured using a spectrophotometer, UV-3600 (trade name), manufactured by Shimadzu Corporation, and the pH was measured using a pH meter, HM60G (trade name), manufactured by To a Denpa Kogyo. Incidentally, the absorbance is a value measured at the maximum absorption wavelength of each compound. The results are shown in Table 1.

TABLE 1

| Compound | pKa |
|---|---|
| (1) | −5.0 |
| (2) | −5.4 |
| (3) | −5.3 |
| (4) | −5.0 |
| (21) | −5.0 |
| (22) | −5.0 |
| (23) | −5.0 |
| (24) | −5.0 |
| (25) | −5.0 |
| (26) | −5.0 |
| (27) | −5.0 |
| (104) | −5.0 |
| (114) | −5.0 |
| (115) | −5.0 |
| (116) | −5.0 |
| (117) | −5.0 |
| (118) | −5.0 |
| (119) | −5.0 |
| (120) | −5.0 |
| (m-1) | −5.1 |
| (m-2) | −5.5 |
| (m-21) | −5.1 |
| (m-31) | −5.8 |
| Comparative Compound A | −4.9 |
| Comparative Compound B | −4.4 |

Examples 1 to 31 and Comparative Examples 1 to 4

Various additives in respective blending amounts shown in Table 2 were mixed by means of a blender with 100 parts by mass of a polycarbonate resin powder (Panlite L-1250WP, produced by Teijin Chemicals Ltd.) having a viscosity average molecular weight of 24,000 produced from bisphenol A and phosgene by the interfacial condensation polymerization method, and the mixture was melt-kneaded by a vented twin-screw extruder to obtain a pellet.

After a pre-mixture of the polycarbonate resin and the additives each in a concentration of 10 to 100 times the blending amount was prepared, this was totally mixed by the blender. The vented twin-screw extrude used was TEX30α (complete engagement, rotation in the same direction, double threaded screws) manufactured by Japan Steel Works, Ltd. The extruder was of a type having one kneading zone before the vent port. The extrusion conditions were a delivery rate of 30 kg/h, a screw revolution of 150 rpm, a vent vacuum degree of 3 Pka, and an extrusion temperature of 280° C. from the first feed port to the die portion.

The obtained pellet was dried by a hot air circulating drier at 120° C. for 5 hours and shaped into a 50 mm-square plate having a thickness of 2 mm by an injection molding machine at a cylinder temperature of 340° C. and a mold temperature of 80° C. The injection molding machine used was T-150D manufactured by FANUC Ltd. Light was irradiated on this shaped plate from a metal halide lamp (by cutting light at about 290 nm or less) (Eye Super UV Tester, trade name, manufactured by Iwasaki Electric Co., Ltd.) for 1,000 hours under the conditions of an illuminance of 90 mW/cm$^2$, a temperature of 63° C. and a humidity of 50%, and the change in color hue between before light irradiation and after light irradiation is shown in Table 2. A indicates no change in color hue, B indicates slight coloring, and C indicates serious coloring.

In Table 2, the denotations of additives and Comparative Compounds A and B are as follows.
(Phosphorus-Based Stabilizer)
P-1: Phosphonite-based heat stabilizer (Sandostab P-EPQ, produced by Sandoz)
P-2: Phosphite-based heat stabilizer (Irgafos 168, produced by Ciba Specialty Chemicals)
(Hindered Phenol-Based Stabilizer)
H-1: Hindered phenol-based antioxidant (Irganox 1076, produced by Ciba Specialty Chemicals)
H-2: Hindered phenol-based antioxidant (Irganox 1010, produced by Ciba Specialty Chemicals)

TABLE 2

| | Ultraviolet Absorber | | Phosphorus-Based Stabilizer | | Hindered Phenol-Based Stabilizer | | Change in | |
|---|---|---|---|---|---|---|---|---|
| | Compound | parts by mass | Compound | parts by mass | Compound | parts by mass | Color Hue of Molded Article | Bleed-Out |
| Example 1 | Compound (1) | 0.5 | P-1 | 0.05 | H-1 | 0.05 | A | none |
| Example 2 | Compound (2) | 0.5 | P-1 | 0.05 | H-1 | 0.05 | A | none |
| Example 3 | Compound (3) | 0.5 | P-1 | 0.05 | H-1 | 0.05 | A | none |
| Example 4 | Compound (4) | 0.5 | P-1 | 0.05 | H-1 | 0.05 | A | none |
| Example 5 | Compound (21) | 0.5 | P-1 | 0.05 | H-1 | 0.05 | A | none |
| Example 6 | Compound (22) | 0.5 | P-1 | 0.05 | H-1 | 0.05 | A | none |
| Example 7 | Compound (23) | 0.5 | P-1 | 0.05 | H-1 | 0.05 | A | none |
| Example 8 | Compound (24) | 0.5 | P-1 | 0.05 | H-1 | 0.05 | A | none |
| Example 9 | Compound (25) | 0.5 | P-1 | 0.05 | H-1 | 0.05 | A | none |
| Example 10 | Compound (26) | 0.5 | P-1 | 0.05 | H-1 | 0.05 | A | none |
| Example 11 | Compound (27) | 0.5 | P-1 | 0.05 | H-1 | 0.05 | A | none |
| Example 12 | Compound (104) | 0.5 | P-1 | 0.05 | H-1 | 0.05 | A | none |
| Example 13 | Compound (114) | 0.5 | P-1 | 0.05 | H-1 | 0.05 | A | none |
| Example 14 | Compound (115) | 0.5 | P-1 | 0.05 | H-1 | 0.05 | A | none |
| Example 15 | Compound (116) | 0.5 | P-1 | 0.05 | H-1 | 0.05 | A | none |
| Example 16 | Compound (117) | 0.5 | P-1 | 0.05 | H-1 | 0.05 | A | none |
| Example 17 | Compound (118) | 0.5 | P-1 | 0.05 | H-1 | 0.05 | A | none |

TABLE 2-continued

| | Ultraviolet Absorber | | Phosphorus-Based Stabilizer | | Hindered Phenol-Based Stabilizer | | Change in | |
|---|---|---|---|---|---|---|---|---|
| | Compound | parts by mass | Compound | parts by mass | Compound | parts by mass | Color Hue of Molded Article | Bleed-Out |
| Example 18 | Compound (119) | 0.5 | P-1 | 0.05 | H-1 | 0.05 | A | none |
| Example 19 | Compound (120) | 0.5 | P-1 | 0.05 | H-1 | 0.05 | A | none |
| Example 20 | Compound (m-1) | 0.5 | P-1 | 0.05 | H-1 | 0.05 | A | none |
| Example 21 | Compound (m-2) | 0.5 | P-1 | 0.05 | H-1 | 0.05 | A | none |
| Example 22 | Compound (m-21) | 0.5 | P-1 | 0.05 | H-1 | 0.05 | A | none |
| Example 23 | Compound (m-31) | 0.5 | P-1 | 0.05 | H-1 | 0.05 | A | none |
| Example 24 | Compound (m-21) | 0.5 | P-2 | 0.05 | H-1 | 0.05 | A | none |
| Example 25 | Compound (m-21) | 0.5 | P-1 | 0.05 | H-2 | 0.05 | A | none |
| Example 26 | Compound (m-21) | 0.5 | — | 0 | H-1 | 0.05 | B | none |
| Example 27 | Compound (m-21) | 0.5 | P-1 | 0.05 | — | 0 | B | none |
| Example 28 | Compound (120) | 0.5 | P-2 | 0.05 | H-1 | 0.05 | A | none |
| Example 29 | Compound (120) | 0.5 | P-1 | 0.05 | H-2 | 0.05 | A | none |
| Example 30 | Compound (120) | 0.5 | — | 0 | H-1 | 0.05 | B | none |
| Example 31 | Compound (120) | 0.5 | P-1 | 0.05 | — | 0 | B | none |
| Comparative Example 1 | Compound (m-21) | 0 | P-1 | 0.05 | H-1 | 0.05 | C | none |
| Comparative Example 2 | Compound (120) | 0 | P-1 | 0.05 | H-1 | 0.05 | C | none |
| Comparative Example 3 | Comparative Compound A | 0.5 | P-1 | 0.05 | H-1 | 0.05 | C | occurred |
| Comparative Example 4 | Comparative Compound B | 0.5 | P-1 | 0.05 | H-1 | 0.05 | C | occurred |

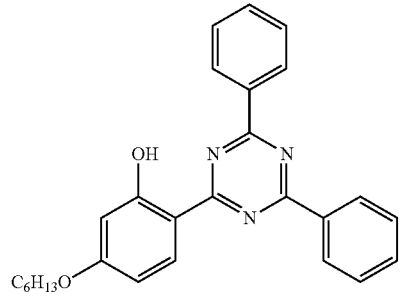

TINUVIN1577FF
Comparative Compound A

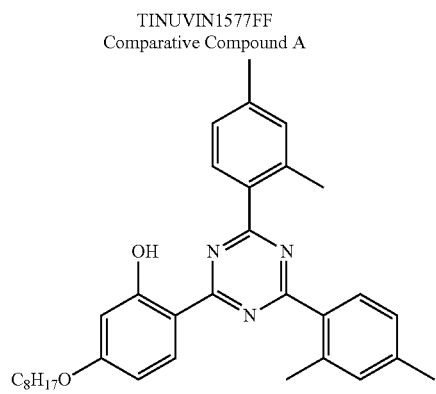

CYASORB UV-1164
Comparative Compound B

As apparent from the results in Table 2, the polycarbonate resin composition of the present invention is free from coloring of the molded article and excellent in the weather resistance and therefore, can be suitably used also for the outdoor application over a long period of time. Furthermore, the occurrence or non-occurrence of bleed-out was confirmed with an eye, as a result, thanks to excellent solvent solubility of the compound, bleed-out was not observed in the square plates of Examples.

Example 32

After each of the pellets obtained in Examples 1 to 31 and Comparative Examples 1 to 4 was dried in the same manner, a head lamp lens was produced using the dried pellet in an injection molding machine (SG260M-HP, manufactured by Sumitomo Heavy Industries, Ltd.) under the conditions of a cylinder temperature of 300° C. and a mold temperature of 80° C. The head lamp lenses of Examples had a good appearance in terms of color hue, transparency and the like. Also, light was irradiated on the head lamp lens from a metal halide lamp (by cutting light at about 290 nm or less) (Eye Super UV Tester, trade name, manufactured by Iwasaki Electric Co., Ltd.) for 1,000 hours under the conditions of an illuminance of 90 mW/cm², a temperature of 63° C. and a humidity of 50%, as a result, the color hue was not changed in the head lamp lenses of Examples, but coloring was observed in those of Comparative Examples.

Example 33

After each of the pellets obtained in Examples 1 to 31 and Comparative Examples 1 to 4 was dried to prepare a square plate in the same manner, a back sheet for solar cell of the present invention, in which a 125 μm-thick polycarbonate film was laminated and stacked, was produced using the plate. The back sheets of Examples had a good appearance in terms of color hue, transparency and the like. Also, the back sheets were stored under the environment of 85° C.-90% RH for 3,000 hours in accordance with JIS K7129 and then evaluated for the appearance and deterioration of physical properties. As a result, the change in color hue between before storage and after storage was not recognized in the back sheets of Examples, but coloring was observed in those of Comparative Examples.

Example 34

After each of the pellets obtained in Examples 1 to 31 and Comparative Examples 1 to 4 was dried in the same manner, a molded spectacle lens having a diameter of 70 mm and a rim thickness of 3.0 mm was produced using the dried pellet by injection press molding. The molded spectacle lenses of Examples had a good appearance in terms of color hue, transparency and the like. Also, light was irradiated on the molded spectacle lens from a metal halide lamp (by cutting light at about 290 nm or less) (Eye Super UV Tester, trade name, manufactured by Iwasaki Electric Co., Ltd.) for 1,000 hours under the conditions of an illuminance of 90 mW/cm², a temperature of 63° C. and a humidity of 50%, as a result, the change in color hue between before light irradiation and after light irradiation was not recognized in the molded spectacle lenses of Examples, but coloring was observed in those of Comparative Examples.

Example 35

Each of the pellets obtained in Examples 1 to 31 and Comparative Examples 1 to 4 was dried in the same manner and shaped using a T-die extruder of an injection molding machine such that the content per unit area of the flaked glass became 6 g/m², whereby a window member composed of a sheet of 10 cm×5 cm and 2.0 mm in thickness was obtained. The window members of Examples had a good appearance in terms of color hue, transparency and the like. Also, light was irradiated on the window member from a metal halide lamp (by cutting light at about 290 nm or less) (Eye Super UV Tester, trade name, manufactured by Iwasaki Electric Co., Ltd.) for 1,000 hours under the conditions of an illuminance of 90 mW/cm², a temperature of 63° C. and a humidity of 50%, as a result, the change in color hue between before light irradiation and after light irradiation was not recognized in the window members of Examples, but coloring was observed in those of Comparative Examples.

Example 36

After each of the pellets obtained in Examples 1 to 31 and Comparative Examples 1 to 4 was dried in the same manner, a light reflector for LED array-type backlight having a bottomed lattice shape of 6 cm in length and 4 cm in width was shaped using the dried pellet. The light reflectors of Examples had a good appearance in terms of color hue, transparency and the like. Also, light was irradiated on the light reflector from a metal halide lamp (by cutting light at about 290 nm or less) (Eye Super UV Tester, trade name, manufactured by Iwasaki Electric Co., Ltd.) for 1,000 hours under the conditions of an illuminance of 90 mW/cm², a temperature of 63° C. and a humidity of 50%, as a result, the change in color hue between before light irradiation and after light irradiation was not recognized in the light reflectors of Examples, but coloring was observed in those of Comparative Examples.

Example 37

Each of the pellets obtained in Examples 1 to 31 and Comparative Examples 1 to 4 was dried in the same manner and shaped using a T-die extruder of an injection molding machine such that the content per unit area of the flaked glass became 6 g/m², whereby an architectural material composed of a sheet of 10 cm×5 cm and 0.9 mm in thickness was obtained. The architectural materials of Examples had a good appearance in terms of color hue, transparency and the like. Also, light was irradiated on the architectural material from a metal halide lamp (by cutting light at about 290 nm or less) (Eye Super UV Tester, trade name, manufactured by Iwasaki Electric Co., Ltd.) for 1,000 hours under the conditions of an illuminance of 90 mW/cm², a temperature of 63° C. and a humidity of 50%, as a result, the change in color hue between before light irradiation and after light irradiation was not recognized in the architectural materials of Examples, but coloring was observed in those of Comparative Examples.

The entire disclosure of Japanese Patent Application No. 2009-223468 filed on Sep. 28, 2009 and Japanese Patent Application No. 2010-009539 filed on Jan. 19, 2010, from which the benefit of foreign priority has been claimed in the present application, is incorporated herein by reference, as if fully set forth.

What is claimed is:

1. A polycarbonate resin composition comprising a compound represented by the following formula (1), a phosphorous-based stabilizer and a hindered phenol-based stabilizer:

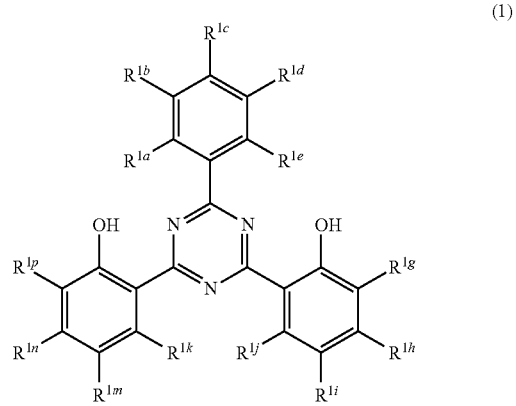

(1)

wherein each of $R^{1a}$, $R^{1b}$, $R^{1c}$, $R^{1d}$ and $R^{1e}$ independently represents a hydrogen atom or a monovalent substituent provided that OH is excluded, at least one of the substituents represents a substituent having a Hammett's σp value of 0.3 or more, and the substituents may be combined each other to form a ring; and each of $R^{1g}$, $R^{1h}$, $R^{1i}$, $R^{1h}$, $R^{1k}$, $R^{1m}$, $R^{1n}$ and $R^{1p}$, wherein the substituent having a Hammett's σp value of 0.3 or more is a group selected from the group consisting of COOR$^r$, CONR$^s{}_2$, a cyano group, CF$_3$, a nitro group and SO$_3$M wherein each of R$^r$ and R$^s$ represents a hydrogen atom or a monovalent substituent, and M represents a hydrogen atom or an alkali metal, and wherein said monovalent substituent is an alkyl group having a carbon number of 1 to 20, a cyano group, a carboxyl group, an alkoxycarbonyl group, a carbamoyl group, an alkylcarbonyl group, a nitro group, an amino group, a hydroxy group, an alkoxy group having a carbon number of 1 to 20, an aryloxy group, a sulfamoyl group, a thiocyanate group, or an alkylsulfonyl group, and in the case of having a substituent, the substituent is an alkyl group having a carbon number of 1 to 20, a cyano group, a carboxyl group, an alkoxycarbonyl group, a carbamoyl group, an alkylcarbonyl group, a nitro group, an amino group, a hydroxy group, an alkoxy group having a carbon number of 1 to 20, an aryloxy group, a sulfamoyl group, a thiocyanate group, or an alkylsulfonyl group.

2. The polycarbonate resin composition according to claim 1, wherein $R^{1c}$ is a substituent having a Hammett's σp value of 0.3 or more.

3. The polycarbonate resin composition according to claim 1, wherein each of $R^{1a}$, $R^{1c}$ and $R^{1e}$ represents a hydrogen atom, each of $R^{1b}$ and $R^{1d}$ independently represents a hydrogen atom or a substituent having a Hammett's σp value of 0.3 or more, and at least either one is a substituent having a Hammett's σp value of 0.3 or more.

4. The polycarbonate resin composition according to claim 1, wherein said Hammett's σp value is from 0.3 to 1.2.

5. The polycarbonate resin composition according to claim 1, wherein the substituent having a Hammett's σp value of 0.3 or more is COOR$^r$ wherein R$^r$ represents a hydrogen atom or a monovalent substituent.

6. The polycarbonate resin composition according to claim 1, wherein $R^{1c}$ is a cyano group.

7. The polycarbonate resin composition according to claim 1, wherein pKa of the compound represented by formula (I) is from −5.0 to −7.0.

8. The polycarbonate resin composition according to claim 1, wherein the content of the compound represented by formula (I) is from 0.05 to 3 parts by mass and the content of the phosphorus-based stabilizer is from 0.0005 to 0.3 parts by mass, per 100 parts by mass of the polycarbonate resin composition.

9. The polycarbonate resin composition according to claim 1, wherein the viscosity average molecular weight of the polycarbonate resin is from 10,000 to 50,000.

10. A molded article comprising the polycarbonate resin composition according to claim 1.

11. A cover for solar cells, comprising the polycarbonate resin composition according to claim 1.

12. A member for light sources, comprising the polycarbonate resin composition according to claim 1.

13. A window member comprising the polycarbonate resin composition according to claim 1.

14. An architectural material comprising the polycarbonate resin composition according to claim 1.

15. A lens comprising the polycarbonate resin composition according to claim 1.

16. The polycarbonate resin composition according to claim 1, wherein $R^{1d}$ represents a substituent having a Hammett's σp value of 0.3 or more.

* * * * *